(12) United States Patent
Huang et al.

(10) Patent No.: US 12,543,179 B2
(45) Date of Patent: Feb. 3, 2026

(54) COMMUNICATION APPARATUS AND COMMUNICATION METHOD FOR PERSISTENT ALLOCATION

(71) Applicant: Panasonic Intellectual Property Corporation of America, Torrance, CA (US)

(72) Inventors: Lei Huang, Singapore (SG); Yoshio Urabe, Nara (JP); Rojan Chitrakar, Singapore (SG); Yanyi Ding, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 453 days.

(21) Appl. No.: 17/420,363

(22) PCT Filed: Nov. 29, 2019

(86) PCT No.: PCT/SG2019/050590
§ 371 (c)(1),
(2) Date: Jul. 1, 2021

(87) PCT Pub. No.: WO2020/145890
PCT Pub. Date: Jul. 16, 2020

(65) Prior Publication Data
US 2022/0095347 A1  Mar. 24, 2022

(30) Foreign Application Priority Data

Jan. 10, 2019 (SG) ............................ 10201900237S
Apr. 12, 2019 (SG) ............................ 10201903322T
(Continued)

(51) Int. Cl.
*H04W 72/12* (2023.01)
*H04L 1/00* (2006.01)
(Continued)

(52) U.S. Cl.
CPC ........... *H04W 72/20* (2023.01); *H04L 1/0047* (2013.01); *H04L 5/0055* (2013.01); *H04W 84/12* (2013.01)

(58) Field of Classification Search
CPC ... H04B 7/0452; H04L 1/0047; H04L 5/0055; H04W 72/04; H04W 72/20; H04W 74/006; H04W 84/12
(Continued)

(56) References Cited

U.S. PATENT DOCUMENTS

2009/0070650 A1  3/2009  Bourlas et al.
2009/0075667 A1  3/2009  Bourlas
(Continued)

FOREIGN PATENT DOCUMENTS

JP  2013511238 A  3/2013
JP  2017055311 A  3/2017
(Continued)

OTHER PUBLICATIONS

David Xun Yang (Huawei): "Cascading Structure", IEEE Draft; 11-15-0841-01-00AX-CASCADING-STRUCTURE, IEEE-SA Mentor, Piscataway, NJ USA, vol. 802.11ax, No. 1, Jul. 16, 2015 (Jul. 16, 2015), pp. 1-21, XP068119976.
(Continued)

*Primary Examiner* — Robert J Lopata
(74) *Attorney, Agent, or Firm* — Seed Intellectual Property Law Group LLP

(57) ABSTRACT

The present disclosure provides communication apparatus and communication method for user-specific persistent allocation. A communication apparatus comprises circuitry which, in operation, generates a transmission signal comprising a common field, a user specific field and a data field, the common field including RU information for each of one or more allocations in the data field and the user specific
(Continued)

field including one or more user information, each indicating a user-specific allocation among the one or more allocations in the data field; and a transmitter, which, in operation, transmits the generated transmission signal; wherein the user specific field is free from at least one user information for a persistent allocation containing a recurring transmission among the one or more allocations.

17 Claims, 57 Drawing Sheets

(30) Foreign Application Priority Data

| | | | |
|---|---|---|---|
| May 9, 2019 | (SG) | ............................ | 10201904191Q |
| May 27, 2019 | (SG) | ............................ | 10201904787R |

(51) Int. Cl.
  *H04L 5/00* (2006.01)
  *H04W 72/20* (2023.01)
  *H04W 84/12* (2009.01)

(58) Field of Classification Search
  USPC ........................................................ 370/329
  See application file for complete search history.

(56) References Cited

U.S. PATENT DOCUMENTS

| | | | | |
|---|---|---|---|---|
| 2012/0155354 | A1 | 6/2012 | Kishigami et al. | |
| 2012/0218983 | A1 | 8/2012 | Noh et al. | |
| 2015/0365940 | A1 | 12/2015 | Chu et al. | |
| 2016/0345295 | A1 | 11/2016 | Yang et al. | |
| 2016/0360443 | A1 | 12/2016 | Hedayat | |
| 2017/0257888 | A1 | 9/2017 | Kneckt et al. | |
| 2017/0295560 | A1 | 10/2017 | Kim et al. | |
| 2018/0014325 | A1* | 1/2018 | Dvory | H04W 74/04 |
| 2018/0110076 | A1* | 4/2018 | Ko | H04L 5/0055 |
| 2018/0115947 | A1 | 4/2018 | Kim et al. | |
| 2018/0310338 | A1 | 10/2018 | Li et al. | |
| 2018/0317173 | A1* | 11/2018 | Kim | H04W 52/0216 |
| 2019/0124556 | A1* | 4/2019 | Verma | H04L 5/0044 |
| 2019/0124719 | A1* | 4/2019 | Park | H04B 7/0452 |
| 2019/0289633 | A1* | 9/2019 | Fang | H04L 27/2601 |
| 2019/0306685 | A1* | 10/2019 | Cariou | H04W 72/0446 |
| 2020/0107263 | A1* | 4/2020 | Boger | H04W 52/0216 |
| 2020/0137727 | A1* | 4/2020 | Min | H04W 72/04 |
| 2021/0028917 | A1* | 1/2021 | Park | H04W 72/23 |
| 2021/0111855 | A1* | 4/2021 | Verma | H04W 72/044 |
| 2021/0176763 | A1* | 6/2021 | Viger | H04W 72/0453 |
| 2021/0409165 | A1* | 12/2021 | Wang | H04L 1/1614 |
| 2022/0376833 | A1* | 11/2022 | Huang | H04L 1/1812 |

FOREIGN PATENT DOCUMENTS

| | | |
|---|---|---|
| JP | 2017525196 A | 8/2017 |
| JP | 2018516018 A | 6/2018 |
| JP | 2018523354 A | 8/2018 |
| WO | WO 2017107699 A1 | 6/2017 |

OTHER PUBLICATIONS

European Search Report, dated Feb. 11, 2022, for International Application No. 19909571.2-1215, 14 pages.

Po-Kai Huang (Intel): "NAV Consideration for UL MU Response Follow Up; 11-15-1326-02-00ax-nav-consideration-for-ul-mu-response-follow-up", IEEE Draft; 11-15-1326-02-00AX-NAV-CONSIDERATION-FOR-UL-MU-RESPONSE-FOLLOW-UP, IEEE-SA Mentor, Piscataway, NJ USA, vol. 802.11ax, No. 2, Nov. 11, 2015 (Nov. 11, 2015), pp. 1-23, XP068099286.

John Son (Wilus): "Recovery Procedures in Cascading Sequences; 11-15-1096-00-00ax-recovery-procedures-in-cascading-sequences", IEEE Draft; 11-15-1096-00-00AX-RECOVERY-PROCEDURES-IN-CASCADING-SEQUENCES, IEEE-SA Mentor, Piscataway, NJ USA, vol. 802. 11ax, Sep. 14, 2015 (Sep. 14, 2015), pp. 1-11, XP068098329.

International Search Report, mailed Feb. 7, 2020, for corresponding International Application No. PCT/SG2019/050590, 5 pages.

Office Action, dispatched Jan. 27, 2023, for Indian Patent Application No. 202127029472. (6 pages).

* cited by examiner

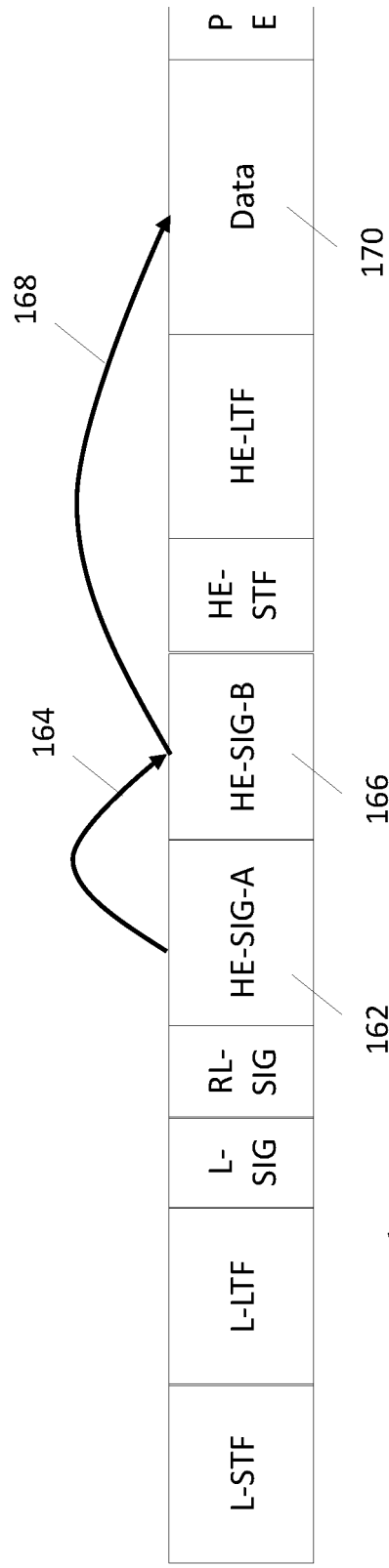
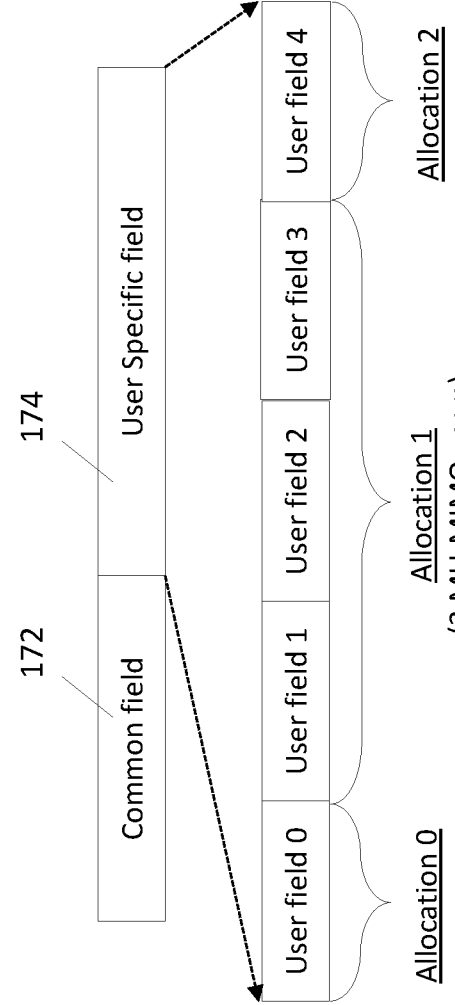

| L-STF | L-LTF | L-SIG | RL-SIG | HE-SIG-A | HE-STF | HE-LTF | Data | PE |

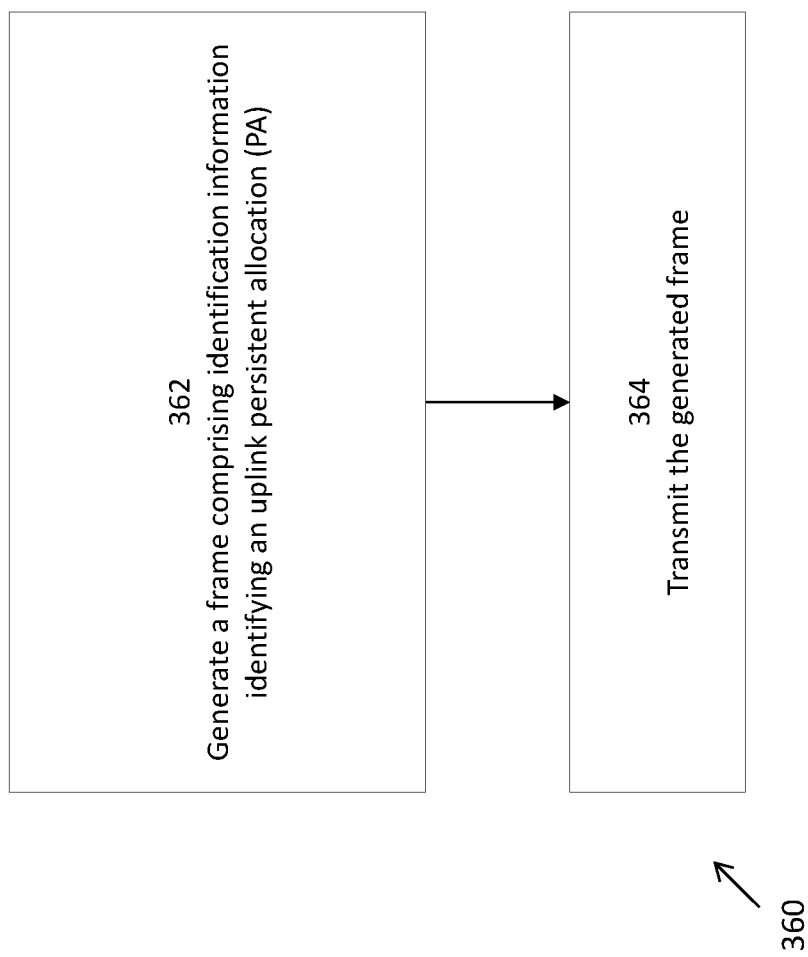

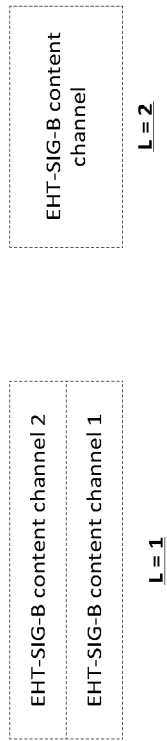
Fig. 16A
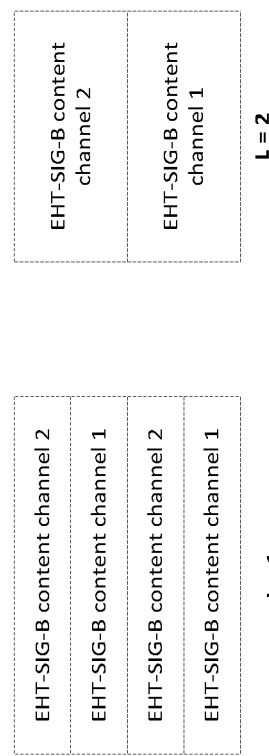
Fig. 16B
Fig. 16C

Fig. 16E
Fig. 16D

COMMUNICATION APPARATUS AND COMMUNICATION METHOD FOR PERSISTENT ALLOCATION

TECHNICAL FIELD

The present disclosure relates to communication apparatuses and methods for persistent allocation (PA), and more particularly to communication apparatuses and methods for PA in EHT WLAN (extremely high throughput wireless local area network).

BACKGROUND

In the standardization of next generation wireless local area network (WLAN), a new radio access technology having backward compatibilities with IEEE 802.11a/b/g/n/adax technologies has been discussed in the IEEE 802.11 Working Group and is named Extremely High Throughput (EHT) WLAN.

In EHT WLAN, in order to provide significant peak throughput and capacity increase beyond 802.11ax high efficiency (HE) WLAN, it is desired to increase the maximum channel bandwidth from 160 MHz to 320 MHz, increase the maximum number of spatial streams from 8 to 16 and to support multi-band operation.

However, there has been no discussion on communication apparatuses and methods for persistent allocation (PA) in the context of EHT WLAN.

There is thus a need for communication apparatuses and methods that provide feasible technical solutions for PA in the context of EHT WLAN. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for persistent allocation in context of EHT WLAN.

According to an embodiment of the present disclosure, there is provided a communication apparatus, comprising: circuitry, which, in operation, a first transmission signal including user information of a plurality of users for a downlink MU-MIMO allocation, each indicating a user-specific allocation, and further generates a second transmission signal comprising a common field, a user-specific field and a data field, the data field containing a transmission of the downlink MU-MIMO allocation and a transmitter, which, in operation, transmits the first transmission signal and the second transmission signal, wherein the user-specific allocation of the downlink MU-MIMO allocation is determined to be persistent or not.

According to another embodiment of the present disclosure, there is provided a communication method comprising generating a first transmission signal including user information of a plurality of users for a downlink MU-MIMO allocation, each indicating a user-specific allocation; generating a second transmission signal comprising a common field, a user-specific field and a data field, the data field containing a transmission of the downlink MU-MIMO allocation and transmitting the first transmission signal and the second transmission signal, wherein the user-specific allocation of the downlink MU-MIMO allocation is determined to be persistent or not.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 1D shows a format of a PPDU (physical layer protocol data unit) used for downlink multiuser communications between an AP and multiple STAs in an HE WLAN.

FIG. 1E depicts the HE-SIG-B (HE SIGNAL B) field in more detail.

FIG. 1F shows a format of a PPDU used for uplink multiuser communications between an AP and multiple STAs in an HE WLAN.

FIG. 16A shows a table of how the number of EHT-SIG-B content channels depends on channel bandwidth (CBW) and the value of L.

FIG. 16B shows a diagram of mapping of the one or two EHT-SIG-B content channels in a 40 MHz EHT MU PPDU.

FIG. 16C shows a diagram of mapping of the two EHT-SIG-B content channels in an 80 MHz EHT MU PPDU.

FIG. 16D shows a diagram of mapping of the two EHT-SIG-B content channels in an 80+80 MHz or 160 MHz EHT MU PPDU.

FIG. 16E shows a diagram of mapping of the two EHT-SIG-B content channels in a 160+160 MHz or 320 MHz EHT MU PPDU.

Figure 1A:
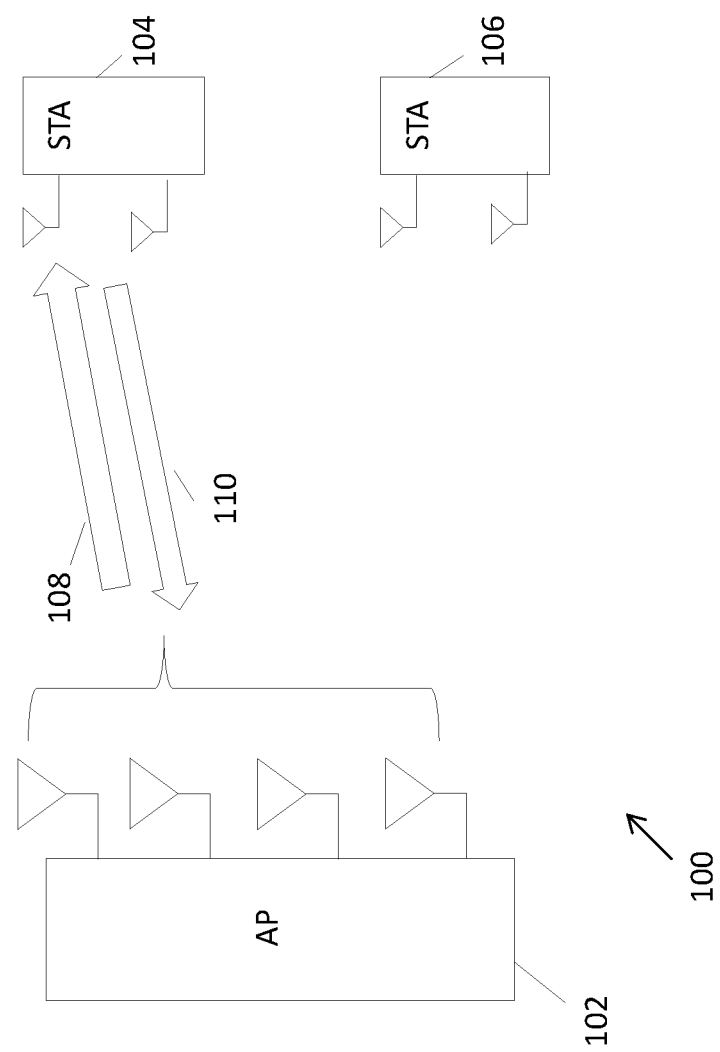
FIG. 1A depicts a schematic diagram of uplink and downlink single-user multiple input multiple output (MIMO) communications between an access point (AP) and a station (STA) in a MIMO wireless network.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for uplink or downlink persistent allocation (PA), especially in a multiple-input multiple-output (MIMO) wireless network.

In the context of IEEE 802.11 (Wi-Fi) technologies, a station, which is interchangeably referred to as an STA, is a communication apparatus that has the capability to use the 802.11 protocol. Based on the IEEE 802.11-2016 definition, an STA can be any device that contains an IEEE 802.11-conformant media access control (MAC) and physical layer (PHY) interface to the wireless medium (WM).

For example, an STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, an STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between an STA mode and an AP mode, based on actual WLAN conditions and/or requirements.

In a MIMO wireless network, "multiple" refers to multiple antennas used simultaneously for transmission and multiple antennas used simultaneously for reception, over a radio channel. In this regard, "multiple-input" refers to multiple transmitter antennas, which input a radio signal into the channel, and "multiple-output" refers to multiple receiver antennas, which receive the radio signal from the channel and into the receiver. For example, in a N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure.

In a MIMO wireless network, single-user communications and multiuser communications can be deployed for communications between communication apparatuses such as APs and STAs.

FIG. 1A depicts a schematic diagram of single-user MIMO communications 100 between an AP 102 and an STA 104 in a MIMO wireless network. As shown, the MIMO wireless network may include one or more STAs (e.g. STA 104, STA 106, etc.). In the single-user MIMO communications 100, the AP 102 transmits multiple spatial streams using multiple antennas (e.g. 4 antennas as shown in FIG. 1A) with all the spatial streams directed to a single communication apparatus, i.e. the STA 104. For the sake of simplicity, the multiple spatial streams directed to the STA 104 are illustrated as a grouped data transmission arrow 108 directed to the STA 104.

The single-user MIMO communications 100 can be configured for bi-directional transmissions. As shown in FIG. 1A, in the single-user MIMO communications 100, the STA 104 may transmit multiple spatial streams using multiple antennas (e.g. 2 antennas as shown in FIG. 1A) with all the spatial streams directed to the AP 102. For the sake of simplicity, the multiple spatial streams directed to the AP 102 are illustrated as a grouped data transmission arrow 110 directed to the AP 102.

As such, the single-user MIMO communications 100 depicted in FIG. 1A enables both uplink single-user transmissions and downlink single-user transmissions in a MIMO wireless network.

Figure 1B:
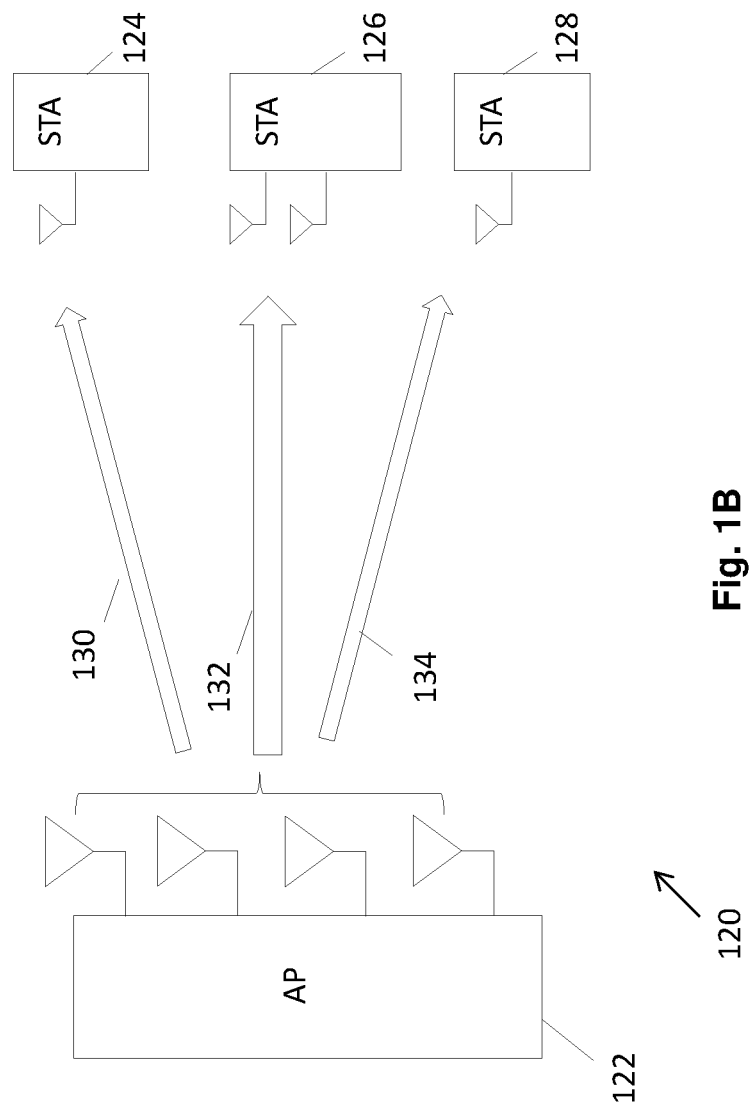
FIG. 1B depicts a schematic diagram of downlink multiuser MIMO (MU-MIMO) communications between an AP and multiple STAs in a MIMO wireless network.

FIG. 1B depicts a schematic diagram of downlink multiuser MIMO (MU-MIMO) communications 120 between an AP 122 and multiple STAs 124, 126, 128 in a MIMO wireless network.

The MIMO wireless network may include one or more STAs (e.g. STA 124, STA 126, STA 128, etc.). In the downlink MU-MIMO communications 120, the AP 122 transmits multiple streams simultaneously to the STAs 124, 126, 128 in the network using multiple antennas via spatial mapping or precoding techniques. For example, two spatial streams may be directed to the STA 126, another spatial stream may be directed to the STA 124, and yet another spatial stream may be directed to the STA 128. For the sake of simplicity, the two spatial streams directed to the STA 126 are illustrated as a grouped data transmission arrow 132, the spatial stream directed to the STA 124 is illustrated as a data transmission arrow 130, and the spatial stream directed to the STA 128 is illustrated as a data transmission arrow 134.

Figure 1C:
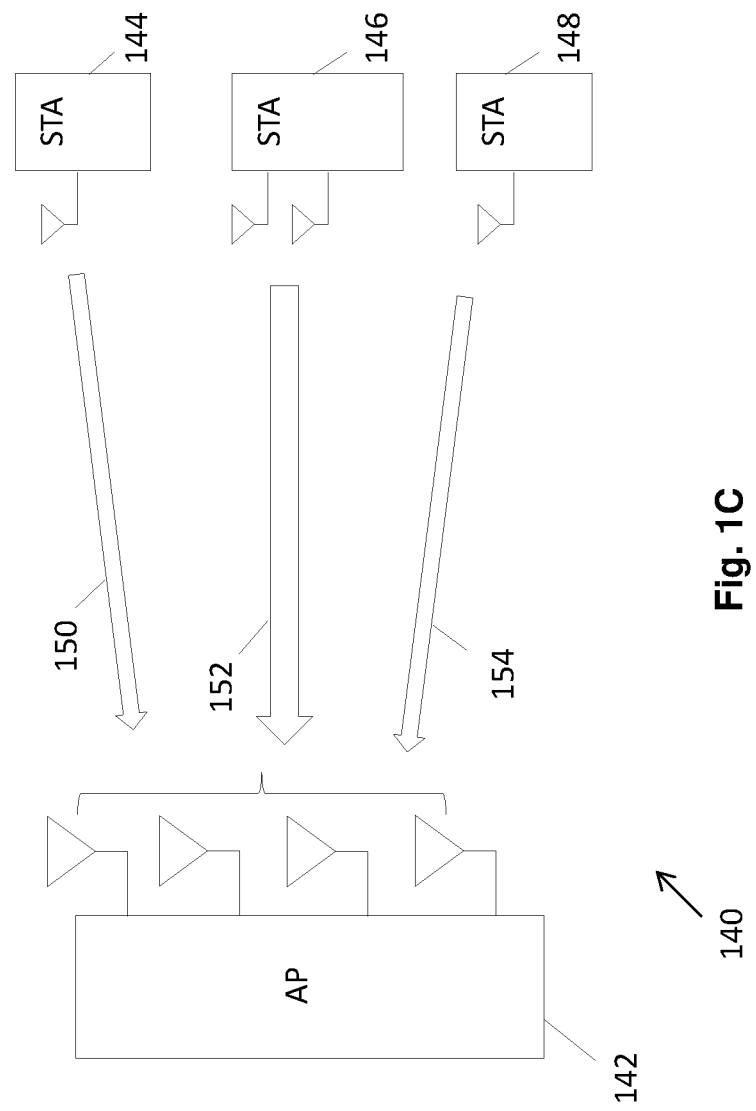
FIG. 1C depicts a schematic diagram of uplink MU-MIMO communications between an AP and multiple STAs in a MIMO wireless network

FIG. 1C depicts a schematic diagram of uplink MU-MIMO communications 140 between an AP 142 and multiple STAs 144, 146, 148 in a MIMO wireless network.

The MIMO wireless network may include one or more STAs (e.g. STA 144, STA 146, STA 148, etc.). In the uplink MU-MIMO communications 140, the STAs 144, 146, 148 transmits respective streams simultaneously to the AP 142 in the network using respective antennas via spatial mapping or precoding techniques. For example, two spatial streams may be directed to the AP 142 from STA 146, another spatial stream may be directed to the AP 142 from STA 144, and yet another spatial stream may be directed to the AP 142 from STA 148. For the sake of simplicity, the two spatial streams directed to the AP 142 from STA 146 are illustrated as a grouped data transmission arrow 152, the spatial stream directed to the AP 142 from STA 144 is illustrated as a data transmission arrow 150, and the spatial stream directed to the AP 142 from STA 148 is illustrated as a data transmission arrow 154.

Due to packet/PPDU (Physical Layer Protocol Data Unit) based transmission and distributed MAC scheme in 802.11 WLAN, time scheduling (e.g. TDMA (time division multiple access)-like periodic time slot assignment for data transmission) does not exist in 802.11 WLAN. Frequency and spatial resource scheduling is performed on a packet basis. In other words, resource allocation information is on a PPDU basis.

FIG. 1D shows a format of a PPDU 160 used for downlink multiuser communications between an AP and multiple STAs in a HE WLAN, e.g. OFDMA (Orthogonal Frequency Division Multiple Access) transmission including MU-MIMO transmission in a single RU (Resource Unit) and full-bandwidth MU-MIMO transmission. Such a PPDU 160 is referred to as an HE MU PPDU 160.

The HE MU PPDU 160 may include a non-High Throughput Short Training Field (L-STF), a non-High Throughput Long Training Field (L-LTF), a non-High Throughput SIGNAL Field (L-SIG), a Repeated L-SIG (RL-SIG), a HE SIGNAL A (HE-SIG-A) field 162, a HE SIGNAL B (HE-SIG-B) field 166, a HE Short Training Field (HE-STF), a HE Long Training Field (HE-LTF), a Data field 170 and a Packet Extension (PE) field.

In the HE MU PPDU 160, the HE-SIG-B field 166 provides OFDMA and MU-MIMO resource allocation information to allow STAs to look up the corresponding resources to be used in the Data field 170, like indicated by arrow 168. The HE-SIG-A field 162 contains the necessary information for decoding the HE-SIG-B field 166, e.g. MCS for HE-SIG-B, number of HE-SIG-B symbols, like indicated by arrow 164.

FIG. 1E depicts the HE-SIG-B field 166 in more detail. The HE-SIG-B field 166 includes (or consists of) a Common field 172, if present, followed by a User Specific field 174 which together are referred to as the HE-SIG-B content channel.

The HE-SIG-B field 166 contains a RU Allocation subfield which indicates the RU information for each of the allocations. The RU information includes a RU position in the frequency domain, an indication of the RU allocated for a non-MU-MIMO or MU-MIMO allocation, and the number of users in the MU-MIMO allocation. The Common field 172 is not present in the case of a full-bandwidth MU-MIMO transmission. In this case, the RU information (e.g. the number of users in the MU-MIMO allocation) is signalled in the HE-SIG-A field 162.

The User Specific field 174 includes (or consists of) one or more User field(s) for non-MU-MIMO allocation(s) and/or MU-MIMO allocation(s). A User field contains user information indicating a user-specific allocation (i.e. user-specific allocation information). In the example shown in FIG. 1E, the User Specific field 174 includes five user fields (User field 0, . . . , User field 4), wherein user-specific allocation information for an allocation (Allocation 0) is provided by User field 0, user-specific allocation information for a further allocation (Allocation 1 with 3 MU-MIMO users) is provided by User field 1, User field 2, and User field 3, and user-specific allocation information for yet a further allocation (Allocation 2) is provided by User field 4. Notice that the MU-MIMO allocation (Allocation 1) comprises three user-specific allocations, which are indicated by User field 1, User field 2 and User field 3, respectively.

FIG. 1F shows a format of a PPDU 180 used for uplink multiuser communications between an AP and multiple STAs in a HE WLAN. Such a PPDU 180 is referred to as an HE TB (trigger based) PPDU 180.

The HE TB PPDU 180 may include a L-STF, a L-LTF, a L-SIG, a RL-SIG, a HE-SIG-A field 182, a HE-STF, a HE-LTF, a Data field and a PE field.

The HE TB PPDU 180 is used for uplink multiuser transmission that is in response to a frame carrying trigger information. Instead of using the HE-SIG-B field, the information required for the uplink multiuser transmission from one or more STAs is carried by the frame that solicits this transmission. In a typical transmission of the HE TB PPDU 180, HE-SIG-A related information is copied from the previous frame carrying trigger information into the HE-SIG-A field 182 of the HE TB PPDU 180.

Figure 2A:
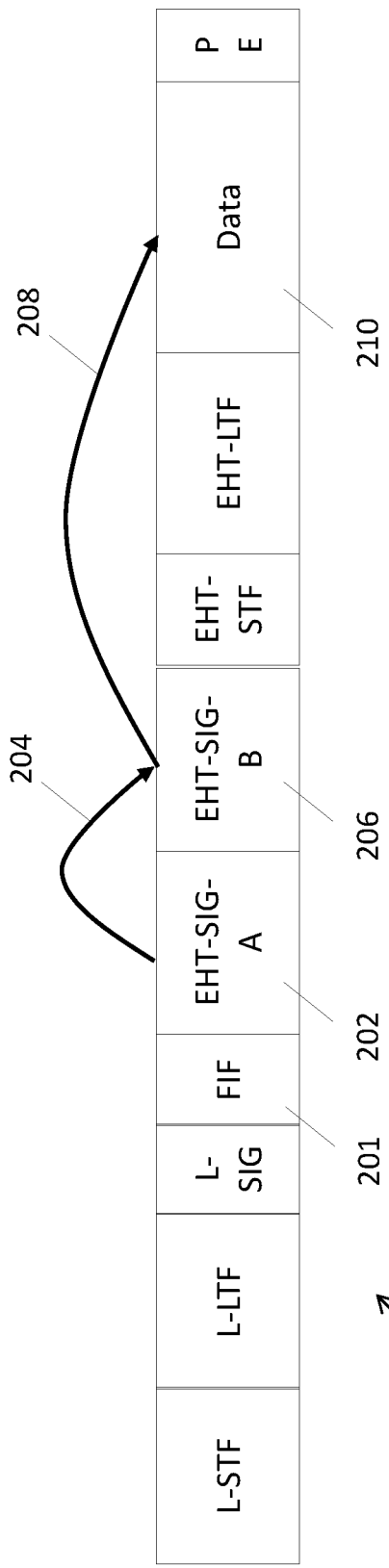
FIG. 2A depicts an EHT MU PPDU.
Figure 2B:
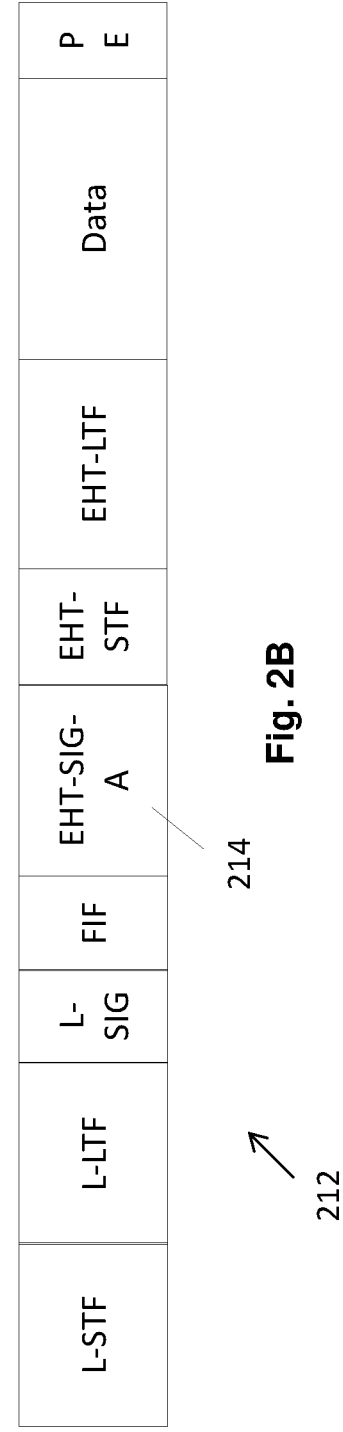
FIG. 2B depicts an EHT TB (trigger based) PPDU.

If the MIMO wireless network is with an extremely high throughput, such as an EHT WLAN, the multiuser PPDU used for downlink multiuser transmission may be referred to as EHT MU PPDU 200 like illustrated in FIG. 2A; and the multiuser PPDU used for uplink multiuser transmission may be referred to as EHT TB PPDU like illustrated in FIG. 2B.

FIG. 2A depicts an EHT MU PPDU 200. The EHT MU PPDU 200 may include a L-STF, a L-LTF, a L-SIG, a Format Identification field (FIF) 201, an EHT SIGNAL A (EHT-SIG-A) field 202, an EHT SIGNAL B (EHT-SIG-B) field 206, an EHT-STF, an EHT-LTF, a Data field 210 and a PE field. It is appreciable that if the IEEE 802.11 Working Group may use a new name instead of "EHT WLAN" for the next generation WLAN with an extremely high throughput, the prefix "EHT" in the above fields may change accordingly. The FIF 201 is mainly used for identifying the format of an EHT PPDU. The EHT-SIG-A field 202 contains the necessary information for decoding the EHT-SIG-B field 206, e.g. MCS for EHT-SIG-B, number of EHT-SIG-B symbols, like indicated by arrow 204. The EHT-SIG-B field 206 provides OFDMA and MU-MIMO resource allocation information to allow STAs to look up the corresponding resources to be used in the Data field 210, like indicated by arrow 208. Like FIG. 1D, the EHT-SIG-B field 206 includes (or consists of) a Common field, if present, followed by a User Specific field which together are referred to as the EHT-SIG-B content channel.

Due to the maximum number of spatial streams of 16, the maximum channel bandwidth (CBW) of 320 MHz and multi-band operation in EHT WLAN, the number of allocations and/or the number of users supported in an EHT MU PPDU may be significantly increased. As a result, an EHT MU PPDU may have much larger signaling overhead than a HE MU PPDU. The devices and methods according to various embodiments may advantageously reduce the signaling overhead, especially when the CBW is more than 20 MHz.

FIG. 2B shows a format of an EHT TB PPDU 212. The EHT TB PPDU 212 may include a L-STF, a L-LTF, a L-SIG, a FIF, an EHT-SIG-A field 214, an EHT-STF, an EHT-LTF, a Data field and a PE field.

The EHT TB PPDU 212 is used in an EHT WLAN for uplink multiuser transmission that is in response to a frame carrying trigger information. Instead of using the EHT-SIG-B field, the information required for the uplink multiuser transmission from one or more STAs is carried by the frame that solicits this transmission. In a typical transmission of the EHT TB PPDU 212, EHT-SIG-A related information is copied from the previous frame carrying trigger information into the EHT-SIG-A field 214 of the EHT TB PPDU 212.

Due to the maximum number of spatial streams of 16, the maximum CBW of 320 MHz and multi-band operation in an EHT WLAN, the number of allocations and/or the number of users supported in an EHT TB PPDU may be significantly increased. As a result, a frame for soliciting an EHT TB PPDU transmission may have much larger signaling overhead than that for soliciting a HE TB PPDU transmission. The devices and methods according to various embodiments may advantageously reduce the signaling overhead, especially when the CBW is more than 20 MHz.

According to various embodiments, in addition to dynamic allocation, EHT WLAN supports user-specific persistent allocation (PA) as well. A user-specific PA enables recurring transmissions within a time period with the reduced control signaling requirement. User-specific PAs are especially suited for VoIP (Voice over Internet Protocol)-like traffic.

Figure 3A:
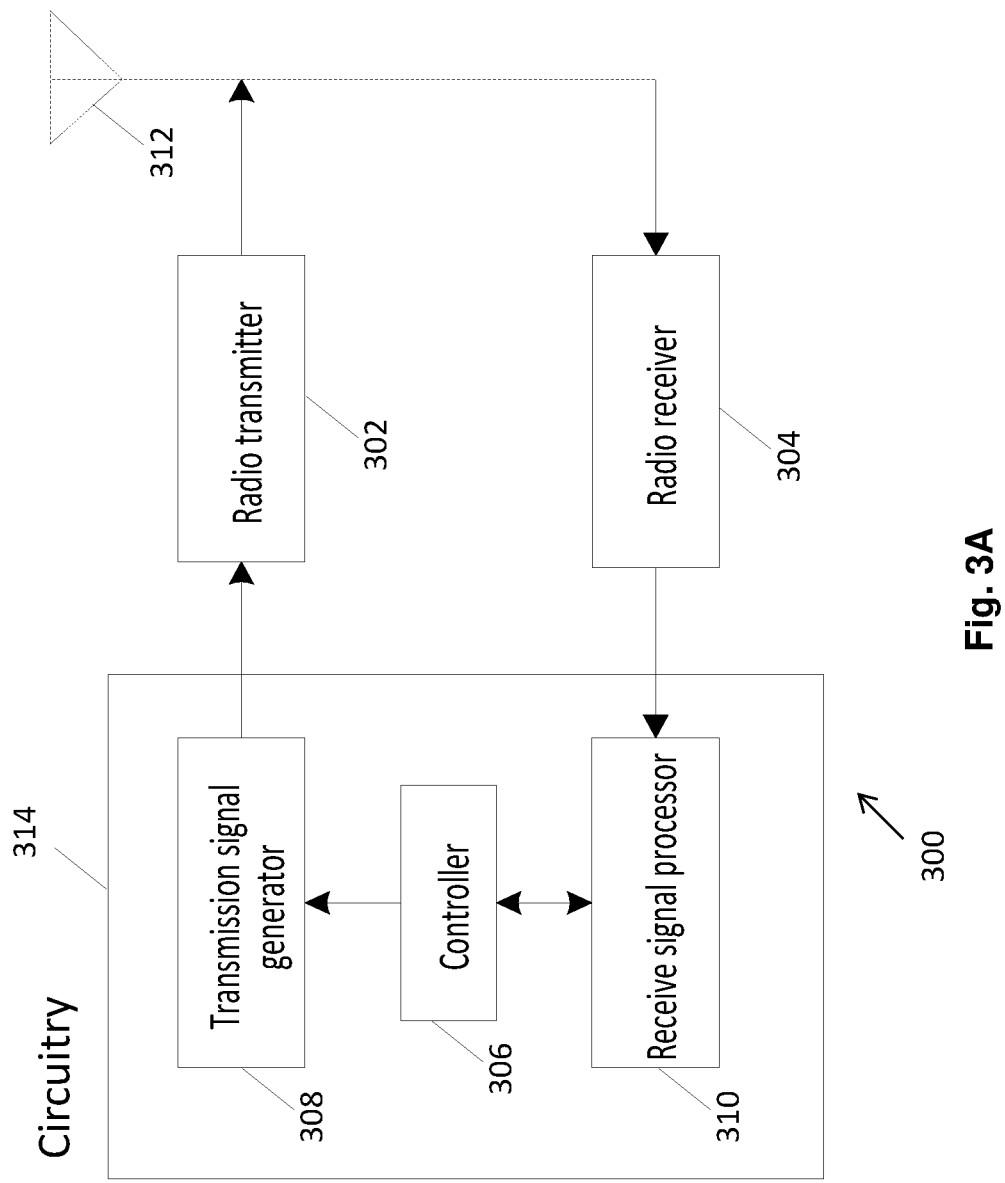
FIG. 3A shows a schematic example of communication apparatus in accordance with various embodiments. The communication apparatus may be implemented as an AP or an STA and configured for user-specific persistent allocation (PA) in accordance with various embodiments of the present disclosure.

FIG. 3A shows a schematic, partially sectioned view of a communication apparatus 300 according to various embodiments. The communication apparatus 300 may be implemented as an AP or an STA according to various embodiments.

As shown in FIG. 3A, the communication apparatus 300 may include circuitry 314, at least one radio transmitter 302, at least one radio receiver 304, and at least one antenna 312 (for the sake of simplicity, only one antenna is depicted in FIG. 3A for illustration purposes). The circuitry 314 may include at least one controller 306 for use in software and hardware aided execution of tasks that the at least one controller 306 is designed to perform, including control of communications with one or more other communication apparatuses in a MIMO wireless network. The circuitry 314 may furthermore include at least one transmission signal generator 308 and at least one receive signal processor 310. The at least one controller 306 may control the at least one transmission signal generator 308 for generating PPDUs (for example EHT MU PPDUs or PPDUs containing PA Announcement frames, EHT Basic Trigger frames, PA Trigger frames, frames carrying PA Control subfields or Multi-STA BlockAck frames if the communication apparatus 300 is an AP, and for example EHT TB PPDUs or PPDUs containing BlockAck frames if the communication apparatus 300 is a STA) to be sent through the at least one radio transmitter 302 to one or more other communication apparatuses and the at least one receive signal processor 310 for processing PPDUs (for example EHT TB PPDUs or PPDUs containing BlockAck frames if the communication apparatus 300 is an AP, and for example EHT MU PPDUs or PPDUs containing PA Announcement frames, EHT Basic Trigger frames, PA Trigger frames, frames carrying PA Control subfields or Multi-STA BlockAck frames if the communication apparatus 300 is a STA) received through the at least one radio receiver 304 from the one or more other communication apparatuses under the control of the at least one controller 306. The at least one transmission signal generator 308 and the at least one receive signal processor 310 may be stand-alone modules of the communication apparatus 300 that communicate with the at least one controller 306 for the above-mentioned functions, as shown in FIG. 3A. Alternatively, the at least one transmission signal generator 308 and the at least one receive signal processor 310 may be included in the at least one controller 306. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 302, at least one radio receiver 304, and at least one antenna 312 may be controlled by the at least one controller 306.

The communication apparatus 300, when in operation, provides functions required for downlink user-specific PA. For example, the communication apparatus 300 may be an AP, and the circuitry 314 (for example the at least one transmission signal generator 308 of the circuitry 314) may, in operation, generate a transmission signal comprising a Common field (for example in the EHT-SIG-B field of an EHT MU PPDU), a User Specific field (for example in the EHT-SIG-B field of an EHT MU PPDU) and a Data field (for example in an EHT MU PPDU), the Common field including RU information for one or more user-specific allocation in the Data field and the User Specific field including one or more user information, each indicating a user-specific allocation among the one or more user-specific allocation in the Data field. The radio transmitter 302 may, in operation, transmit the generated transmission signal. The User Specific field may be free from user information for a downlink user-specific PA containing an initial or recurring transmission among the one or more user-specific allocation. In other words, user information for a downlink user-specific PA containing an initial or recurring transmission among the one or more user-specific allocation may not be included in the User Specific field. For example, only the user information for downlink non-user-specific PAs may be included in the User Specific field. This may advantageously decrease the communication overhead.

The communication apparatus 300 may be an STA, and the radio receiver 304 may, in operation, receive a transmission signal (e.g. EHT MU PPDU) comprising a Common field, a User Specific field and a Data field, the common field including RU information for one or more user-specific allocation in the Data field and the User Specific field including one or more user information, each indicating a user-specific allocation among the one or more user-specific allocation in the Data field. The circuitry 314 may, in operation, process the received transmission signal. The User Specific field may be free from user information for a downlink user-specific PA containing an initial or recurring transmission among the one or more user-specific allocation.

The communication apparatus 300, when in operation, provides functions required for uplink user-specific PA. For example, the communication apparatus 300 may be an AP, and the circuitry 314 (for example the at least one transmission signal generator 308 of the circuitry 314) may, in operation, generate a transmission signal comprising a frame for soliciting an EHT TB PPDU transmission from one or more STA, the frame including one or more user-specific resource allocation information, each indicating a user-specific allocation in the Data field of the solicited EHT TB PPDU. The radio transmitter 302 may, in operation, transmits the generated transmission signal. The frame may be free from user-specific resource allocation information for an uplink user-specific PA containing an initial or recurring transmission. In other words, user-specific resource allocation information for an uplink user-specific PA containing an initial or recurring transmission may not be included in the frame. For example, only the user-specific resource allocation information for uplink non-user-specific PAs may be included in the frame. This may advantageously decrease the communication overhead.

For example, the communication apparatus 300 may be an STA, and the radio receiver 304 may, in operation, receive a transmission signal (e.g. a frame for soliciting an EHT TB PPDU transmission from one or more STA). The transmission signal includes one or more user specific resource allocation information, each indicating a user-specific allocation in the Data field of the solicited EHT TB PPDU. The circuitry 314 may, in operation, process the received transmission signal. The frame may be free from user-specific resource allocation information for an uplink user-specific PA containing an initial or recurring transmission. In other words, user-specific resource allocation information for an uplink user-specific PA containing an initial or recurring transmission may not be included in the frame. For example, only the user-specific resource allocation information for uplink non-user-specific PAs may be included in the frame. This may advantageously decrease the communication overhead.

For example, the communication apparatus 300 may be an AP, and the circuitry 314 (for example the at least one transmission signal generator 308 of the circuitry 314) may, in operation, generate a first transmission signal including user information of a plurality of users for a downlink MU-MIMO allocation, each indicating a user-specific allocation, and further generates a second transmission signal comprising a common field, a user-specific field and a data field, the data field containing a transmission of the downlink MU-MIMO allocation. The radio transmitter 302 may, in operation, transmit the first transmission signal and the second transmission signal, wherein the user-specific allocation of the downlink MU-MIMO allocation is determined to be persistent or not.

Figure 3B:
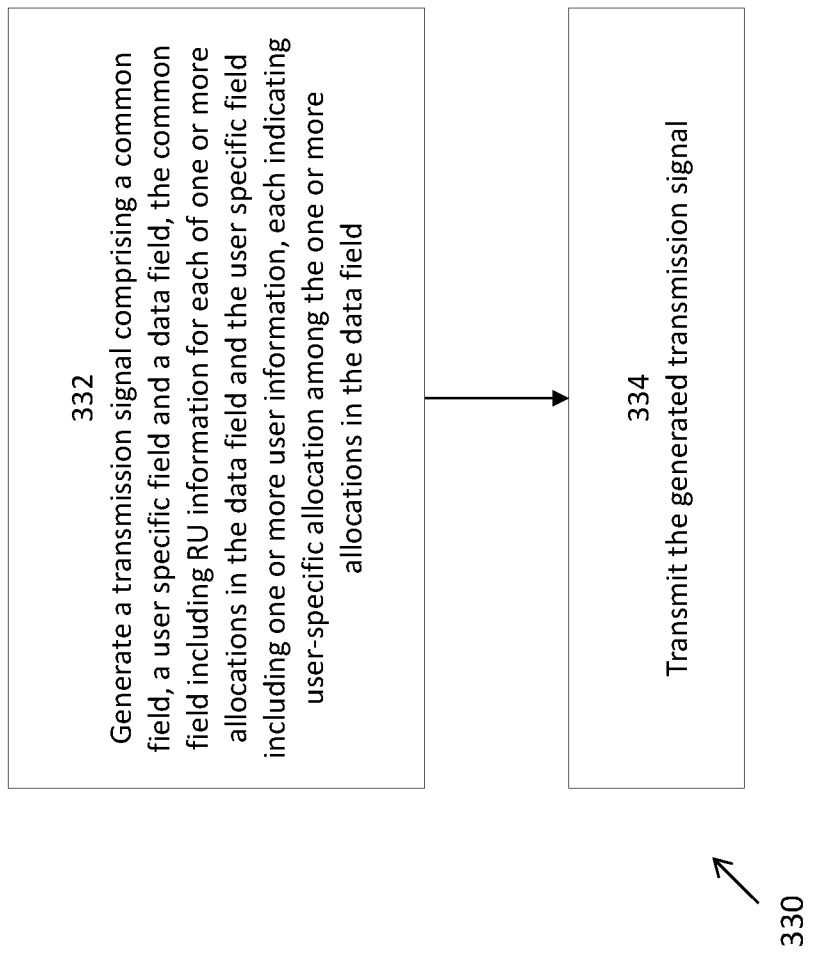
FIG. 3B-3E shows a flow diagram illustrating a communication method according to various embodiments.

FIG. 3B shows a flow diagram 330 illustrating a communication method according to various embodiments. In 332, a transmission signal may be generated. The transmission signal may include a common field, a user specific signal field and a data field, the common field including RU information for each of one or more allocations in the data field and the user specific field including one or more user information, each indicating a user-specific allocation among the one or more allocations in the data field. In 334, the generated transmission signal may be transmitted. The user specific field may be free from at least one user information for a persistent allocation containing a recurring transmission among the one or more allocations.

According to various embodiments, a communication method may include receiving a transmission signal comprising a common field, a user specific field and a data field, the common field including RU information for each of one or more allocations in the data field and the user specific field including one or more user information, each indicating a user-specific allocation among the one or more allocations in the data field; wherein the user specific field may be free from at least one user information for a persistent allocation containing a recurring transmission among the one or more allocations.

Figure 3C:
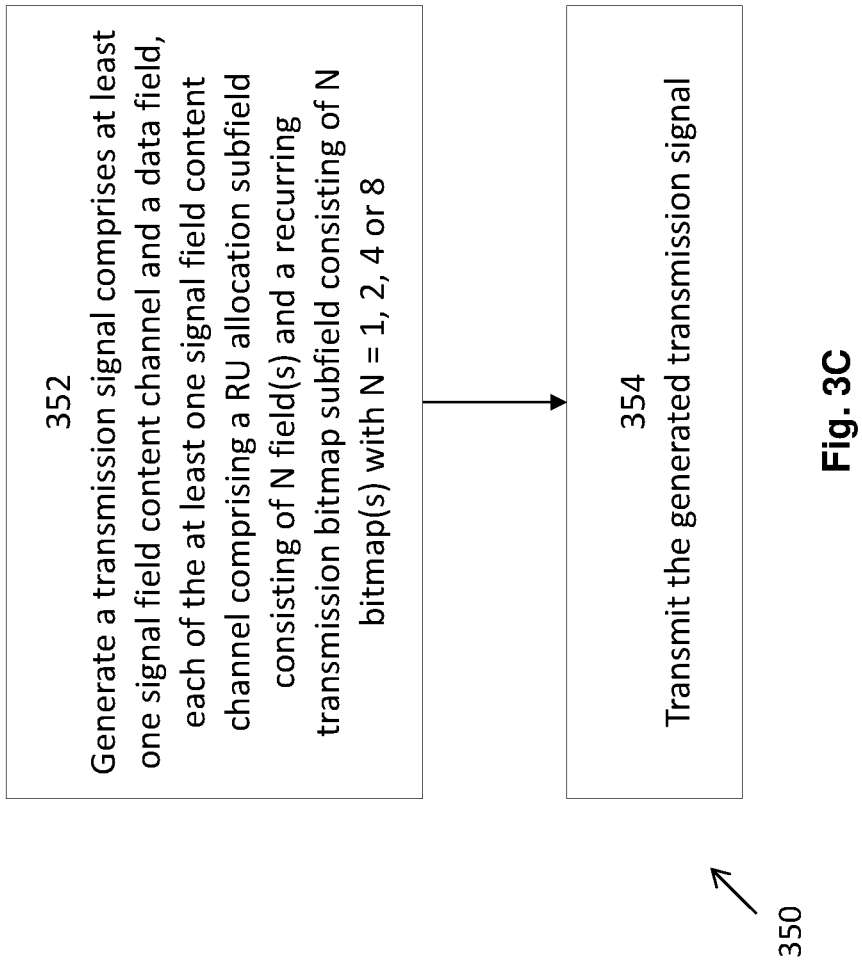
Figure 3:
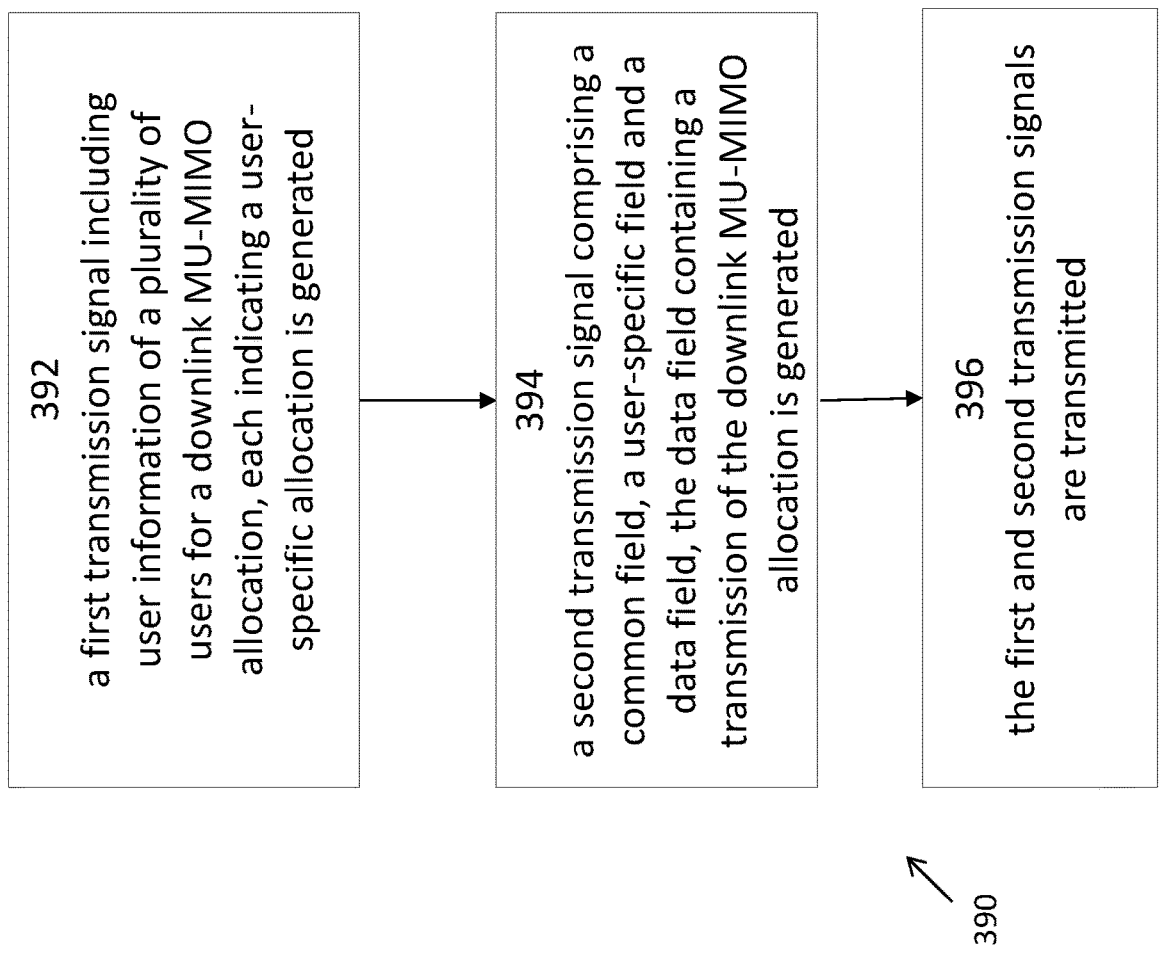

FIG. 3C shows a flow diagram 350 illustrating a communication method according to various embodiments. In step 352, a transmission signal may be generated. The transmission signal may include at least one signal field content channel and a data field, each of the at least one signal field content channel comprising a RU allocation subfield consisting of N field(s) and a recurring transmission bitmap subfield consisting of N bitmap(s) with N=1, 2, 4 or 8, wherein each of the N field(s) of the RU allocation subfield indicates RU information for one or more allocation within a corresponding tone range in the data field, and the n-th (n=1, 2, ..., N) bitmap of the recurring transmission bitmap subfield indicates whether or not each of the one or more allocation indicated by the n-th field of the RU allocation subfield contains a recurring transmission. In step 354, the generated transmission signal is transmitted.

FIG. 3D shows a flow diagram 360 illustrating a communication method according to various embodiments. In step 362, a frame comprising identification information identifying an uplink PA may be generated. In step 364, the generated frame is transmitted.

FIG. 3E shows a flow diagram 390 illustrating a communication method according to various embodiments. In step 392, a first transmission signal including user information of a plurality of users for a downlink MU-MIMO allocation, each indicating a user-specific allocation is generated. In step 394, a second transmission signal comprising a common field, a user-specific field and a data field, the data field containing a transmission of the downlink MU-MIMO allocation is generated. In step 396, the first and second transmission signals are transmitted, wherein the user-specific allocation of the downlink MU-MIMO allocation is determined to be persistent or not.

Figure 4A:
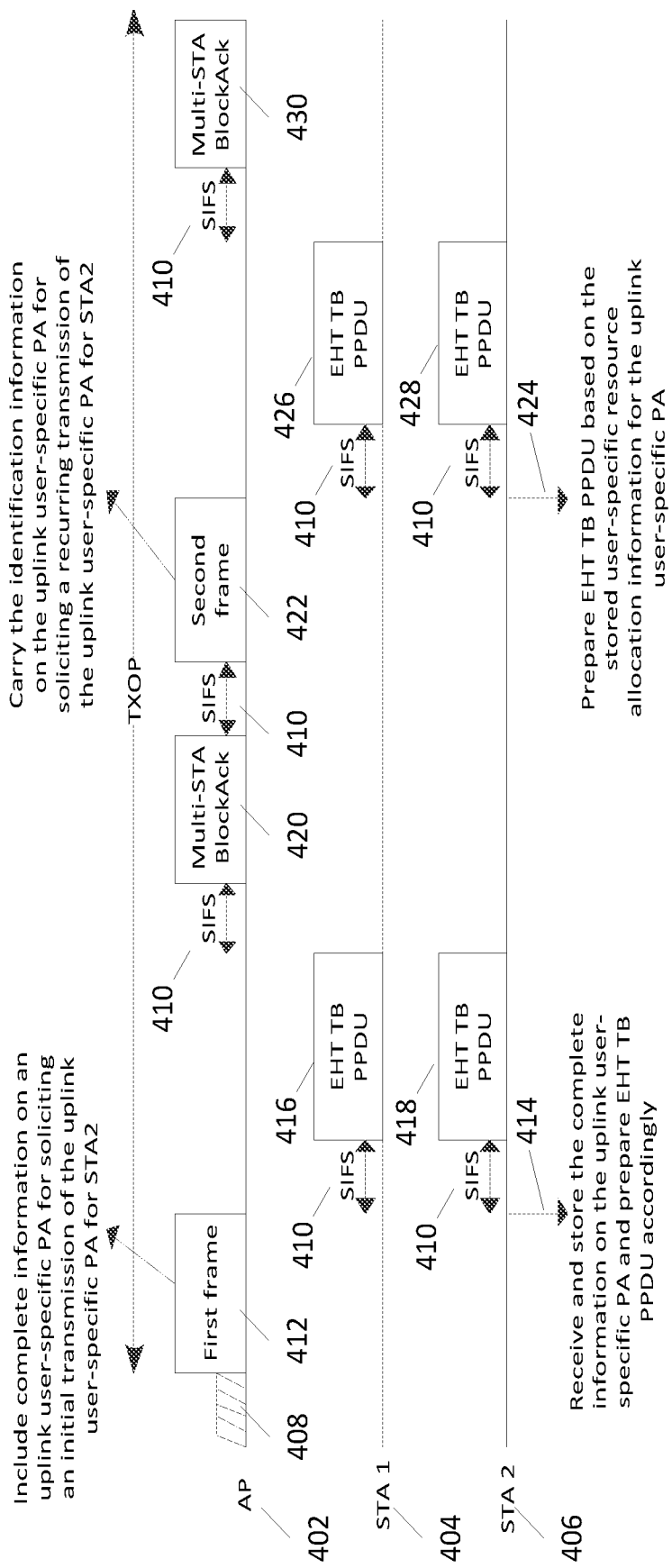
FIG. 4A depicts a flow chart illustrating a communication between an AP and multiple STAs with uplink user-specific PA over a TXOP (transmission opportunity) according to various embodiments.

FIG. 4A depicts a flow chart 400 illustrating a communication between an AP 402 and multiple STAs (404, 406) with uplink user-specific PA over a TXOP (transmission opportunity) according to various embodiments. Contention based channel access procedures, e.g. Enhanced Distributed Channel Access (EDCA) procedures, are illustrated by blocks 408, and Short Interframe Spacings (SIFS) 410 are illustrated. The AP 402 may generate a first frame 412, which include complete information of an uplink user-specific PA for soliciting an initial transmission of the uplink user-specific PA for STA 406. The complete PA information may comprise identification information and user specific resource allocation information. In an embodiment, the identification information may be a PA identifier (PAID) of the uplink user-specific PA. In another embodiment, the identification information may be RU allocation information and user identification information for the uplink user-specific PA. In another further embodiment, the identification information may be RU allocation information and spatial stream (SS) allocation information for the uplink user-specific PA. The first frame 412 may also include complete information of an uplink user-specific PA for soliciting an initial transmission of the uplink user-specific PA for STA 404. The AP 402 may transmit the generated first frame 412 to the STAs 404 and 406.

At 414, the STA 406 may receive the first frame 412 and store the complete information of the uplink user-specific PA (i.e. the identification information and user specific resource allocation information of the uplink user-specific PA intended for STA 406) and transmit an EHT TB PPDU 418 to the AP 402 accordingly. The STA 404 may also receive and store the complete information on the uplink user-specific PA (i.e. the identification information and user specific resource allocation information of the uplink user-specific PA intended for STA 404) and transmit an EHT TB PPDU 416 to the AP 402 accordingly. The EHT TB PPDU 416 and 418 may be in the same format as EHT TB PPDU 212 illustrated in FIG. 2B. The AP 402 may receive the EHT TB PPDUs 416 and 418 and then transmit a Multi-STA BlockAck (block acknowledgement) frame 420 to the STAs 404 and 406. Thereafter, the AP 402 may solicit a recurring transmission of the uplink user-specific PA for STA 404 and a recurring transmission of the uplink user-specific PA for STA 406 by transmitting a second frame 422. The second frame 422 may carry the identification information on the uplink user-specific PA for the STA 404 and the identification information on the uplink user-specific PA for the STA 406. In various embodiments, identification information for an uplink user-specific PA is included in a frame body of the second frame 422 to solicit a recurring transmission of the uplink user-specific PA and the second frame 422 is free from user specific resource allocation information for the uplink user-specific PA. In various embodiments, the identification information is included in a MAC header of the second frame 422 to solicit a recurring transmission of the uplink user-specific PA and the second frame 422 is free from user specific resource allocation information for the uplink user-specific PA.

Figure 4B:
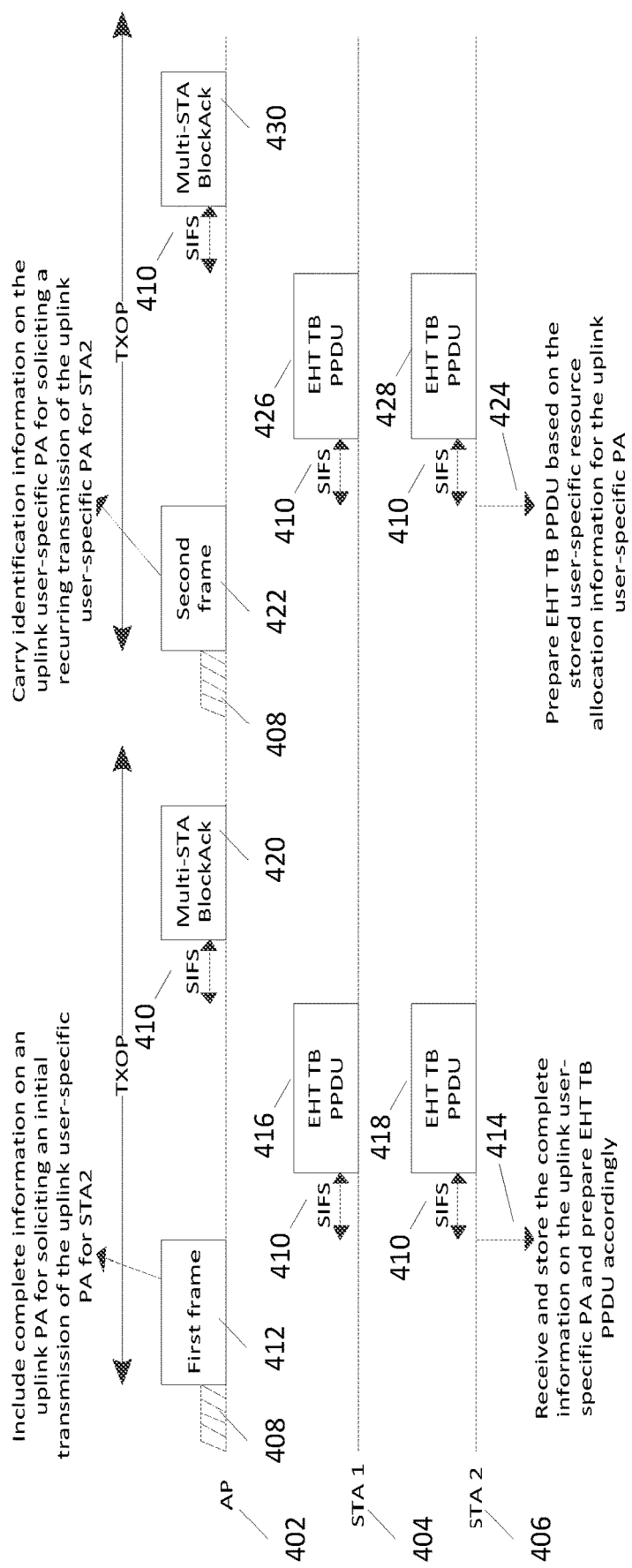
FIG. 4B depicts a flow chart illustrating a communication between an AP and multiple STAs with uplink user-specific PA over two TXOPs according to various embodiments.

At 424, STA 406 may prepare an EHT TB PPDU 428 based on the stored user-specific resource allocation information for the uplink user-specific PA and transmit the EHT TB PPDU 428 to the AP 402. The EHT TB PPDU 428 contains a recurring transmission of the uplink user-specific PA for STA 406. The STA 404 may also prepare an EHT TB PPDU 426 based on the stored user-specific resource allocation information for the uplink user-specific PA and transmit the EHT TB PPDU 426 to the AP 402. The EHT PPDU 426 contains a recurring transmission of the uplink user-specific PA for STA 404. The EHT TB PPDUs 426 and 428 may be in the same format as EHT TB PPDU 212 illustrated in FIG. 2B. The AP 402 may receive the EHT TB PPDUs 426 and 428 and then transmit a Multi-STA BlockAck frame 430 to the STAs 404 and 406. A recurring transmission of an uplink user-specific PA may occur within a same TXOP as an initial transmission of the uplink user-specific PA, as shown in FIG. 4A. The recurring transmission may also occur in a different TXOP from the initial transmission of the uplink user-specific PA, as shown in FIG. 4B. That is, in an example, an uplink user-specific PA may exist till the end of a current TXOP. In another example, an uplink user-specific PA may exist for a determined number of service periods or Beacon intervals. In FIG. 4B, the second frame 422 is transmitted by the AP 402 in a different TXOP from the first frame 412, and therefore the recurring transmissions that are solicited by the second frame 422 (e.g. the uplink user-specific PA transmissions contained in EHT TB PPDUs 426 and 428) also occur in a different TXOP from the first frame 412. It can be appreciated that transmission of the second frame 422 occurs within a time duration in which the uplink user-specific PAs for STAs 404 and 406 are existing.

Figure 5A:
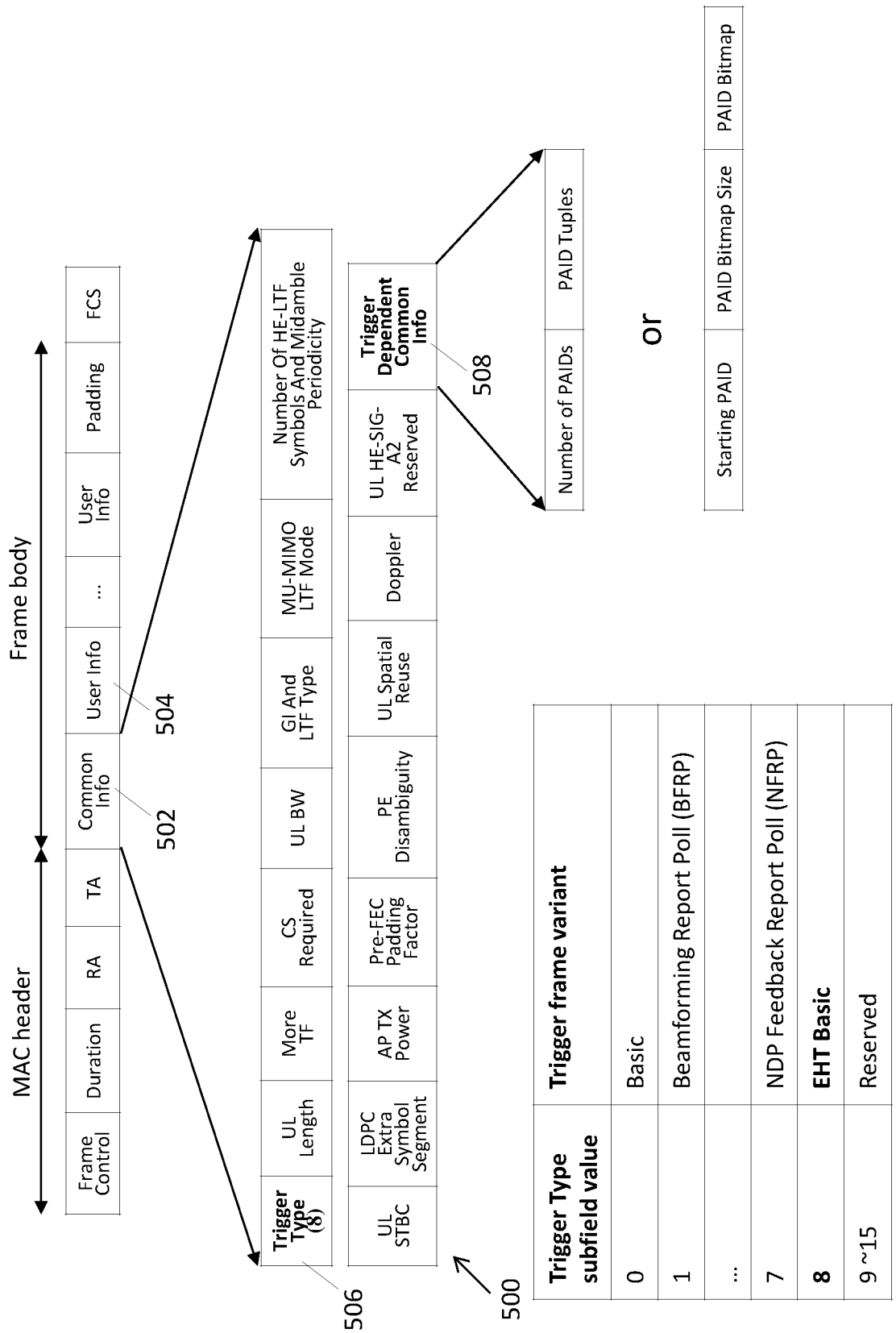
FIGS. 5A and 5B show a format of an EHT Basic Trigger frame used for uplink multiuser communications between an AP and multiple STAs in an EHT WLAN according to a first embodiment.
Figure 5B:
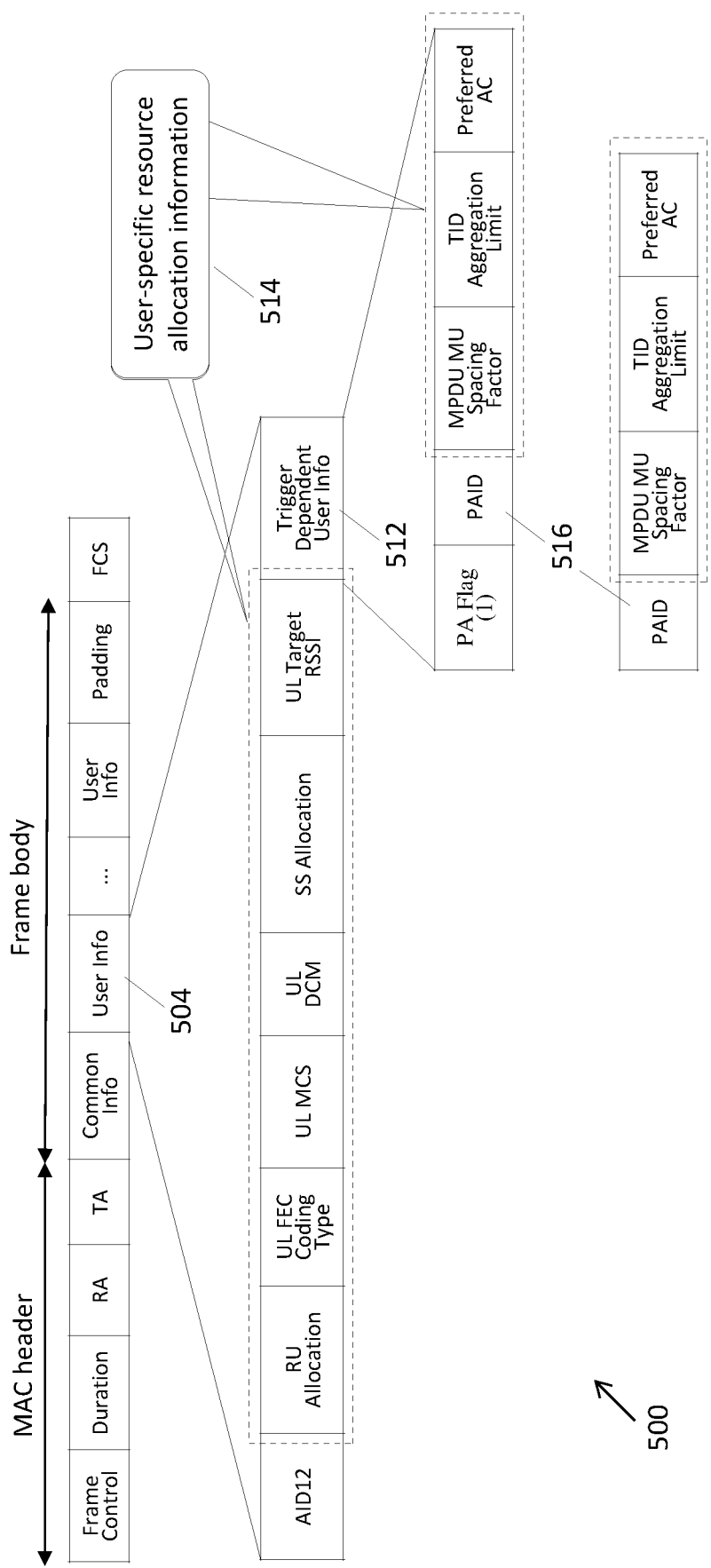

FIGS. 5A and 5B show a format of an EHT Basic Trigger frame 500 used for uplink multiuser communications between an AP and multiple STAs in an EHT WLAN according to a first embodiment. The EHT Basic Trigger frame 500 is a variant of the existing Trigger frame and may be used as the first frame 412 in FIGS. 4A and 4B. The EHT Basic Trigger frame 500 uses the PAID of an uplink user-specific PA to identify the uplink user-specific PA. The EHT Basic Trigger frame 500 may include a Frame Control field, a Duration field, a RA (recipient STA address) field, a TA (transmitting STA address) field, a Common Info field 502, one or more User Info fields such as User Info field 504, a Padding field and a FCS (frame check sequence) field. The Frame Control field, Duration field, RA field and TA field may be grouped in a MAC header of the EHT Basic Trigger frame 500. The Common Info field 502, one or more User Info fields 504 and Padding field may be grouped in a frame body of the EHT Basic Trigger frame 500.

FIG. 5A also depicts the Common Info field 502 in more detail. The Common Info field 502 contains common parameters for all STAs that are engaged in EHT TB PPDU transmissions solicited by the EHT Basic Trigger frame 500. The Common Info field 502 includes (or consists of) a Trigger Type field 506, a UL (uplink) Length field, a More TF (trigger frame) field, a CS (carrier sense) Required field, an UL BW (bandwidth) field, a GI (guard interval) and LTF Type field, an MU-MIMO LTF Mode field, a Number of HE-LTF Symbols and Midamble Periodicity field, an UL STBC (space time block coding) field, a LDPC (low density parity check) Extra Symbol Segment field, an AP TX (transmission) Power field, a Pre-FEC (forward error correction) Padding Factor field, a PE Disambiguity field, an UL Spatial Reuse field, a Doppler field, an UL HE-SIG-A2 Reserved field and a Trigger Dependent Common Info field 508. The Trigger Dependent Common Info field 508 may include (or consist of) a Number of PAIDs field and a PAID Tuples field. The Number of PAIDs field indicates the number of PAID subfields contained in the PAID Tuples field. Alternatively, the Trigger Dependent Common Info field 508 may comprise a Starting PAID field, a PAID Bitmap Size field and a PAID Bitmap field. The PAID Bitmap Size field indicates the bitwidth of the PAID Bitmap field. The Starting PAID field contains the starting PAID of the PAID Bitmap field. The PAID Bitmap field, together with the Starting PAID field, indicates the PAID(s). The EHT Basic Trigger frame 500 solicits a recurring transmission of an uplink user-specific PA using its PAID contained in the Trigger Dependent Common Info field 508. The Trigger Type field 506 may be assigned with an arbitrary value to indicate that the Trigger frame 500 is an EHT Basic Trigger frame. In various embodiments below, the Trigger Type field 506 is assigned with an arbitrary value of 8 to indicate that the Trigger frame 500 is an EHT Basic Trigger frame.

FIG. 5B depicts the User Info field 504 in more detail. The User Info field 504 includes an AID12 field, a RU Allocation field, an UL FEC Coding Type field, an UL MCS (modulation and coding scheme) field, an UL DCM (dual carrier modulation) field, an SS Allocation field, an UL Target RSSI (receive signal strength indicator) field and a Trigger Dependent User Info field 512. The Trigger Dependent User Info field 512 may include (or consist of) a 1-bit PA Flag subfield, a PAID subfield 516, an MPDU MU Spacing Factor subfield, a TID (traffic identifier) Aggregation Limit subfield and a Preferred AC (access category) subfield. Alternatively, the Trigger Dependent User Info field 512 may include (or consist of) a PAID subfield 516, an MPDU MU Spacing Factor subfield, a TID Aggregation Limit subfield and a Preferred AC subfield. The RU Allocation field, UL FEC Coding Type field, UL MCS field, UL DCM field, SS Allocation field, UL Target RSSI field, MPDU MU Spacing Factor subfield, TID Aggregation Limit subfield and Preferred AC subfield make up a user specific resource allocation information 514 of the User Info field 504. The user specific resource allocation information 514 may be obtained and stored by an STA for an initial or recurring uplink user-specific PA transmission, where an EHT TB PPDU based on the stored user specific resource allocation information 514 is transmitted to an AP soliciting the uplink user-specific PA transmission.

As mentioned above, the User Info field 504 may include a PA Flag subfield and a PAID subfield 516. The PA Flag subfield (e.g. 1 bit) indicates whether the User Info field 504 corresponds to an uplink user-specific PA and the PAID subfield 516 (e.g. 7 bits) indicates the PAID of an uplink user-specific PA. A User Info field with the PA Flag subfield set to 0 indicates that the User Info field does not correspond to an uplink user-specific PA. In this case, the PAID subfield 516 is reserved. On the other hand, a User Info field with the PA Flag subfield set to 1 indicates the User Info field correspond to an uplink user-specific PA. In this case, the PAID subfield 516 indicates the PAID of the uplink user-specific PA. Further, the PA Flag subfield of a User info field for random access shall be set to 0. That is, uplink user-specific PA for random access is disallowed.

Alternatively, the User Info field 504 may include a PAID subfield 516 (e.g. 8 bits) which indicates whether the User Info field 504 corresponds to an uplink user-specific PA or indicate the PAID of an uplink user-specific PA corresponding to the User Info field. A User Info field with the PAID subfield 516 set to 0 indicates that the User Info field does not correspond to an uplink user-specific PA. A User Info field with the PAID subfield 516 set to any other value (e.g. 1 to 255) indicates the PAID of the uplink user-specific PA. Further, the PAID subfield of a User Info field for random access shall be set to 0. That is, uplink user-specific PA for random access is disallowed.

In an EHT Basic Trigger frame, no more than one User Info fields that are not for random access shall be addressed to a single STA. User Info field(s) that are for random access shall be located after User Info field(s) that are not for random access. A STA having an uplink user-specific PA indicated in the Common Info field shall not be addressed by a User Info field that is not for random access. Further, no more than one uplink user-specific PA assigned to a single STA shall be indicated in the Common Info field. Advantageously, this reduces the complexity in processing of a received EHT Basic Trigger frame at a STA.

The first frame 412 may be in a format of the EHT Basic Trigger frame 500. For example, at 414, the STA 406 may receive the first frame 412 in a form of the EHT Basic Trigger frame 500. The STA 406 may store identification information and user specific resource allocation information of an uplink user-specific PA intended for STA 406. The identification information (e.g. PAID) may be retrieved from the PAID subfield 516 of a User Info field whose AID12 subfield value matches the AID (association identifier) of the STA 406. The user specific resource allocation information may also be retrieved from said User Info field. The STA 406 may then transmit an EHT TB PPDU 418 to the AP 402 accordingly, wherein the EHT TB PPDU 418 is based on the stored user specific resource allocation information.

Likewise, the STA 404 may also receive the first frame 412 in a form of the EHT Basic Trigger frame 500. The STA 404 may store identification information and user specific resource allocation information of an uplink user-specific PA intended for STA 404. The identification information (e.g. PAID) may be retrieved from the PAID subfield of a User Info field whose AID12 subfield value matches the AID of the STA 404. The user specific resource allocation information may also be retrieved from said User Info field. The STA 404 may then transmit an EHT TB PPDU 416 to the AP 402 accordingly, wherein the EHT TB PPDU 416 is based on the stored user specific resource allocation information.

The second frame 422 may also be in a format of the EHT Basic Trigger frame 500. For example, the STA 406 may receive the second frame 422 in a format of the EHT Basic Trigger frame 500. The STA 406 may obtain common parameters from the Common Info field 502 of the EHT Basic Trigger frame 500 and determine whether the PAID stored by the STA 406 at 414 match any PAID subfield value in the Trigger Dependent Common Info field 508 of the Common Info field 502. If so, the STA 406 may, at 424, prepare the EHT TB PPDU 428 based on the user specific resource allocation information stored by the STA 406 at 414, and transmit the prepared EHT TB PPDU 428 to the AP 402.

Likewise, the STA 404 may receive the second frame 422 in a format of the EHT Basic Trigger frame 500. The STA 404 may obtain common parameters from the Common Info field 502 of the EHT Basic Trigger frame 500 and determine whether the PAID stored by the STA 404 at 414 match any PAID subfield value in the Trigger Dependent Common Info field 508 of the Common Info field 502. If so, the STA 404 may prepare the EHT TB PPDU 426 based on the user specific resource allocation information stored by the STA 404 at 414, and transmit the prepared EHT TB PPDU 426 to the AP 402.

Figure 5C:
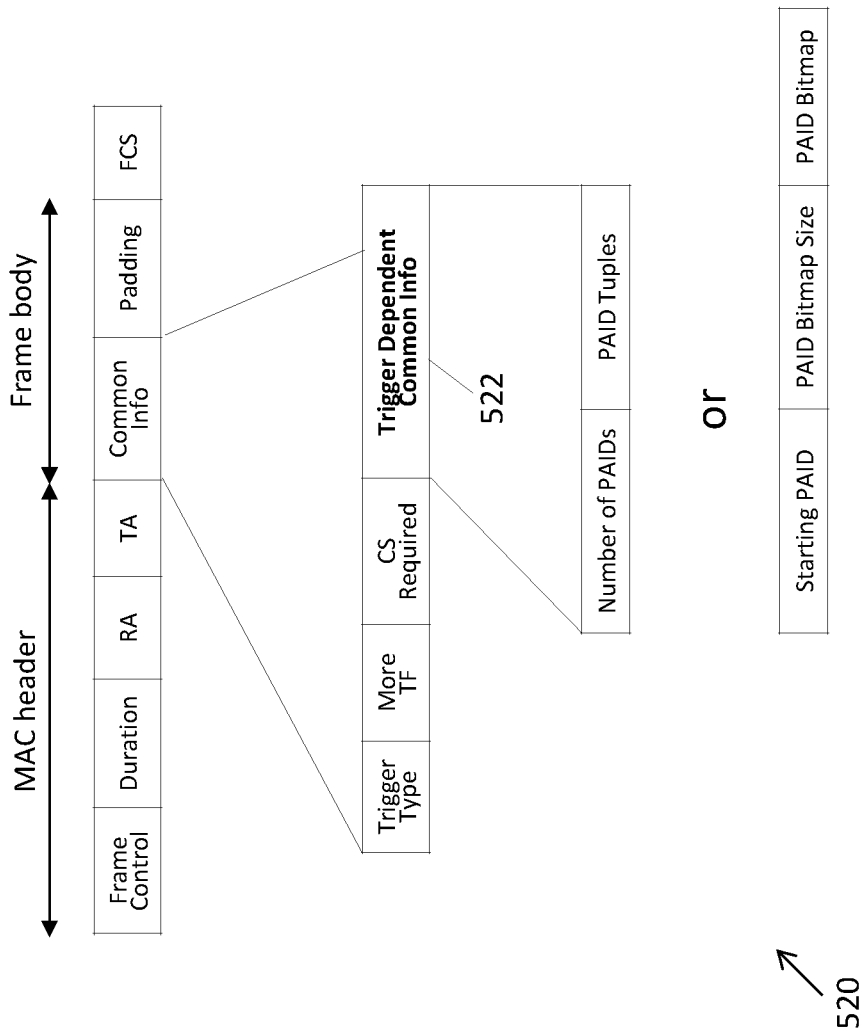
FIG. 5C shows a PA Trigger frame used for uplink multiuser communications according to the first or a third embodiment.

The second frame 422 may also be in a form of a PA Trigger frame 520 according to the first embodiment as shown in FIG. 5C. The PA Trigger frame 520 may include (or consist of) a Frame Control field, a Duration field, a RA field, a TA field, a Common Info field, a Padding field and a FCS field. The Common Info field may include (or consist of) a Trigger Type field, a More TF field, a CS Required field and a Trigger Dependent Common Info field 522. The Trigger Dependent Common Info field 522 The Trigger Dependent Common Info field 522 may include (or consist of) a Number of PAIDs field and a PAID Tuples field. The Number of PAIDs field indicates the number of PAID subfields contained in the PAID Tuples field. Alternatively, the Trigger Dependent Common Info field 522 may comprise a Starting PAID field, a PAID Bitmap Size field and a PAID Bitmap field. The PAID Bitmap Size field indicates the bitwidth of the PAID Bitmap field. The Starting PAID field contains the starting PAID of the PAID Bitmap field. The PAID Bitmap field, together with the Starting PAID field, indicates the PAID(s) of uplink user-specific PA(s). The PA Trigger frame 520 solicits a recurring transmission of an uplink user-specific PA using its PAID contained in the Trigger Dependent Common Info field 522. In a PA Trigger frame, no more than one uplink user-specific PA assigned to a single STA shall be indicated in the Common Info field. Advantageously, this reduces the complexity in processing of a received PA Trigger frame at a STA.

The PA Trigger frame 520 is only used to solicit a recurring transmission of one or more uplink user-specific PA, such as the EHT TB PPDU 426 and 428. Only some common parameters (e.g. More TF subfield and CS Required subfield) are present in the Common Info field of a PA Trigger frame 520, because other common parameters may be unchanged before the one or more uplink user-specific PA expires and can be obtained from the first frame 412. Further, no user specific resource allocation information required for the one or more uplink user-specific PA is included in a PA Trigger frame, because it may be obtained from the first frame 412. Advantageously, this reduces channel overhead for a recurring transmission of the one or more uplink user-specific PA.

Figure 5D:
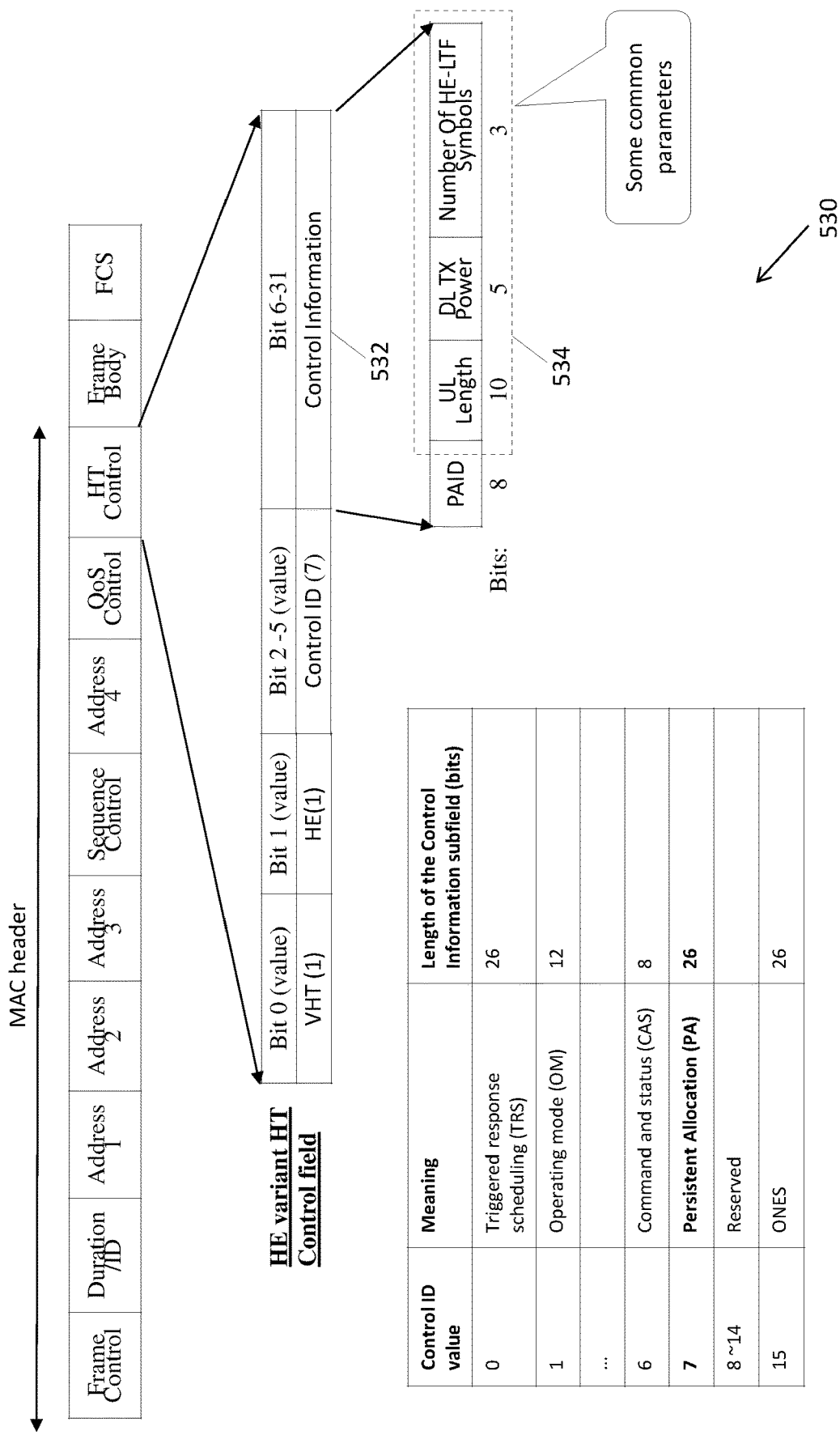
FIG. 5D shows a data or management frame carrying a PA Control subfield used for uplink multiuser communications according to the first or third embodiment.

The second frame 422 may also be in a form of a data or management frame 530 carrying a PA Control subfield according to the first embodiment as shown in FIG. 5D. The data or management frame 530 may include (or consist of) a Frame Control field, a Duration/ID field, four Address fields, a Sequence Control field, a QoS (quality of service) field, an HT Control field, a Frame Body field and a FCS field. The HT Control field may be a 32-bit HE variant HT Control field including (or consisting of) a VHT field (set to 1), a HE field (set to 1), a Control ID field (set to a determined value, e.g. 7, to indicate that the HT Control field of the data or management frame 530 contains a PA Control subfield) and a Control Information field 532. The 26-bit Control Information field may include (or consist of) an 8-bit PAID subfield and some common parameters 534 such as a 10-bit UL Length subfield, a 5-bit DL TX Power subfield and a 3-bit Number of HE-LTF Symbols subfield. It can be appreciated that other common parameters can be predetermined or implicitly signalled. The data or management frame 530 solicits a recurring transmission of an uplink user-specific PA using its PAID contained in the Control Information field 532. Similar to the PA Trigger frame 520, no user specific resource allocation information required for the uplink user-specific PA is included in the data or management frame 530, because it may be obtained from the first frame 412. Advantageously, this reduces channel overhead for a recurring transmission of the uplink user-specific PA.

It is possible to further reduce channel overhead for the first embodiment as described above. In a first frame, two or more user-specific PAs of an MU-MIMO allocation may include a same PAID, which can be indicated in a second frame to solicit a recurring transmission from the two or more STAs engaged in the MU-MIMO allocation. In an example, a first frame may be used to assign a same PAID, a same RU and respective spatial streams to the two or more user-specific PAs of an MU-MIMO allocation. In another example, more than one first frames may be used to assign a same PAID, a same RU and respective spatial streams to the two or more user-specific PAs of the MU-MIMO allocation. Alternatively, in a first frame, a group of user-specific PAs may be assigned a same PAID, which can be indicated in a second frame to solicit a recurring transmission of each user-specific PA in the group of user-specific PAs. However, assigning a same PAID to two or more user-specific PAs may reduce scheduling flexibility since a second frame indicating the same PAID will solicit a recurring transmission for all user-specific PAs with the same PAID.

In the first embodiment as described above, an uplink user-specific PA may exist for a time period after a first frame soliciting an initial transmission of the uplink user-specific PA is transmitted. In an example, an uplink user-specific PA may exist till the end of a current TXOP. In another example, an uplink user-specific PA may exist for a determined number of service periods or Beacon intervals. In another further example, the Common Info field in the first frame may comprise a signalling to indicate a time period for which the uplink user-specific PAs whose initial transmissions solicited by the first frame exist after the first frame is transmitted. For such examples, the uplink user-specific PAs whose initial transmissions solicited by the first frame have the same expiry time. Alternatively, the User Info field corresponding to an uplink user-specific PA in a first frame may comprise a signalling to indicate a time period for which the uplink user-specific PA exists after the first frame is transmitted. In the alternate examples, the uplink user-specific PAs whose initial transmissions solicited by the first frame may have different expiry times.

In the first embodiment as described above, AP may send a first frame to update user-specific resource allocation information for an uplink user-specific PA before it expires. If the user-specific resource allocation information for an uplink user-specific PA are updated before it expires and the intended STA fails to receive the update information, there will be a mismatch on the information of the uplink user-specific PA between the AP and the intended STA. The AP may be able to identify such a mismatch if no EHT TB PPDU is received as a response to a transmitted first frame. When a STA receives a first frame that includes complete information on an uplink user-specific PA for which it is one of the intended STAs, it shall start or reset a timer for the uplink user-specific PA and store or update information on the uplink user-specific PA. Similarly, the STA may also store or update the common parameters in the Common Info field with this process. Advantageously, this enables the AP to perform error recovery from information mismatch.

In the above examples, a RU allocation is addressed to one or more STA. The RU allocation is a non-MU-MIMO allocation if it is addressed to a single STA and is an MU-MIMO allocation if it is addressed to a group of STAs. A RU allocation (i.e. non-MU-MIMO allocation or MU-MIMO allocation) comprises one or more user-specific allocation. A non-MU-MIMO allocation comprises a single user-specific allocation. A MU-MIMO allocation comprises two or more user-specific allocations.

As mentioned in the above, individual user-specific allocations of an MU-MIMO allocation can be persistent or non-persistent. Individual user-specific PAs of an MU-MIMO allocation may have different expiry times and can be independently updated. Advantageously, in comparison to RU based PA wherein all user-specific allocations of an MU-MIMO allocation are either persistent or non-persistent, user-specific PA increases scheduling flexibility.

Figure 5E:
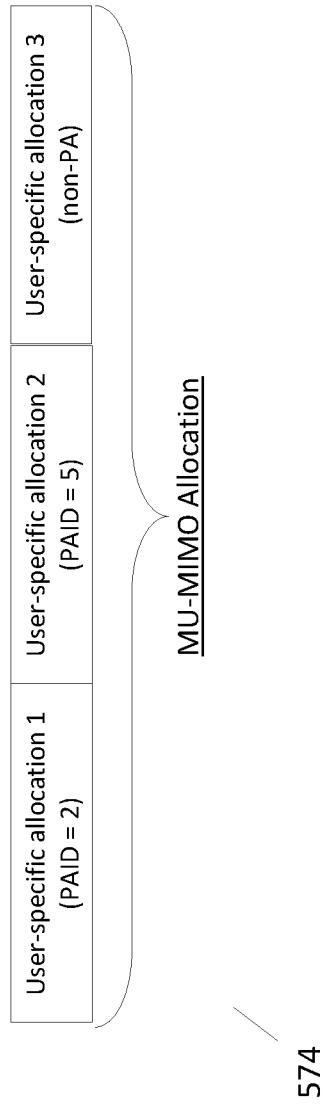
FIG. 5E shows an MU-MIMO allocation comprising three user-specific allocations according to various embodiments.

In the example shown in FIG. 5E, an MU-MIMO allocation comprises three user-specific allocations 574 (user-specific allocation 1, . . . , user-specific allocation 3), wherein user-specific allocation 1 is a user-specific PA with PAID=2, user-specific allocation 2 is a user-specific PA with PAID=5, and user-specific allocation 3 is not a user-specific PA.

Figure 6A:
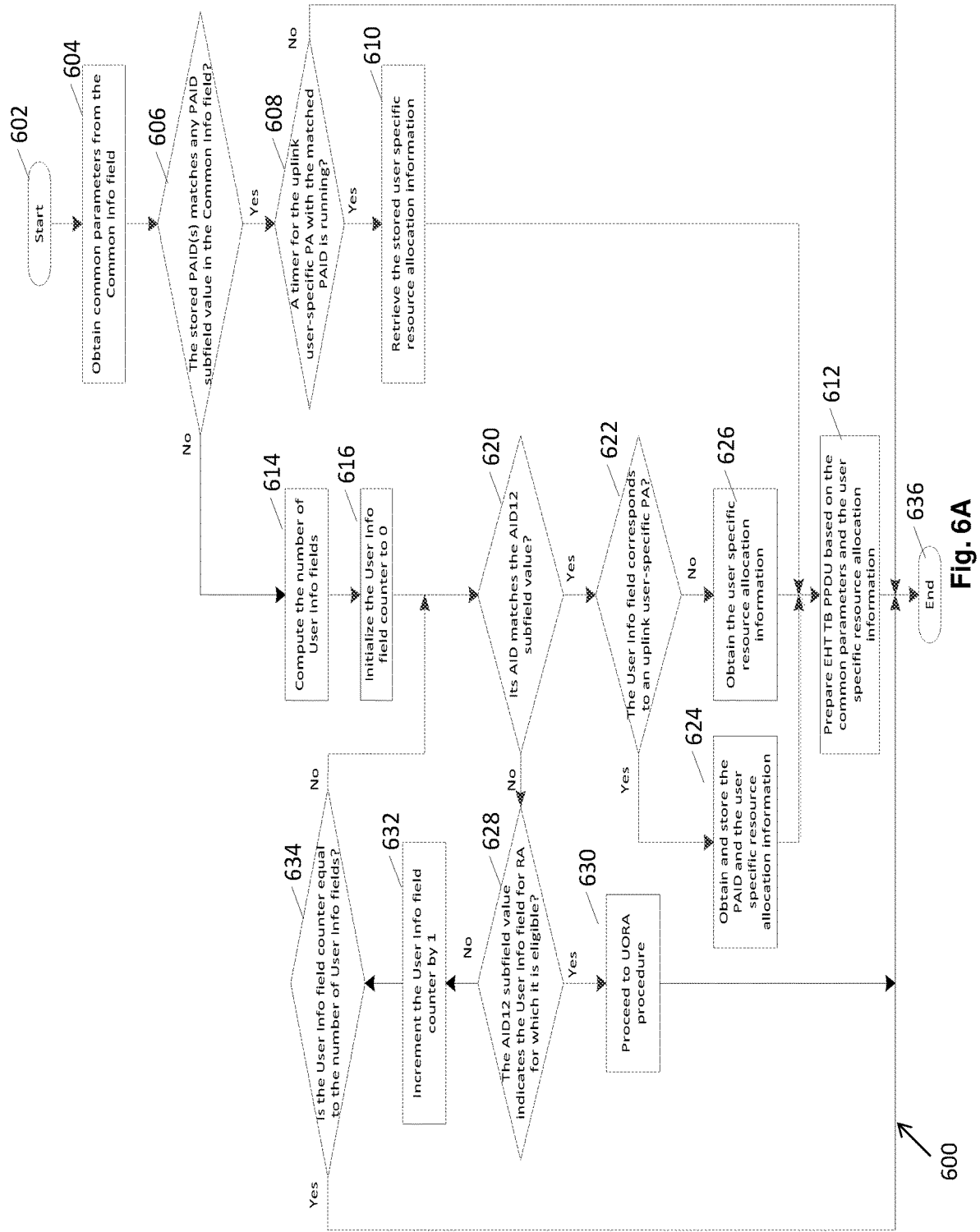
FIG. 6A shows a flow chart illustrating processing of a received EHT Basic Trigger frame at an STA according to the first embodiment.

FIG. 6A shows a flow chart 600 illustrating processing of a received EHT Basic Trigger frame 500 at an STA according to the first embodiment. Processing may start at 602. At 604, common parameters from the Common Info field 502 are obtained. At 606, it is determined whether the stored PAID(s) matches any PAID subfield value in the Common Info field 502. If the stored PAID(s) matches a PAID subfield value in the Common Info field 502, processing may proceed with step 608. If the stored PAID(s) does not match any PAID subfield value in the Common Info field 502, processing may proceed to step 614. At 608, it is determined if a timer for the uplink user-specific PA with the matched PAID is running. If a timer for the uplink user-specific PA is running, processing may proceed to step 610. Otherwise, processing may end at step 636. At 610, the user specific resource allocation information stored by the STA is retrieved. At 614, the number of User Info fields are computed. At 616, the User Info field counter is initialised to zero. At 620, it is determined whether the AID of the STA matches the AID12 subfield value of a User Info field in the EHT Basic Trigger frame 500. If the AID of the STA matches the AID12 subfield value, processing may proceed to step 622. If the AID of the STA does not match the AID12 subfield value, processing may proceed to step 628. At 622, it is determined whether the User Info field corresponds to an uplink user-specific PA by checking the PA Flag subfield or PAID subfield. If the User Info field does not correspond to an uplink user-specific PA, processing may proceed to step 626. If the User Info field corresponds to an uplink user-specific PA, processing may proceed to 624. At 626, the user specific resource allocation information 514 is obtained from the User Info field whose AID12 subfield value matches the AID of the STA for preparing the EHT TB PPDU. At 624, the PAID 516 and the user specific resource allocation information 514 are obtained and stored by the STA. At 628, it is determined whether the AID12 subfield value of the User Info field indicates the User Info field for random access (RA) for which it is eligible. If this is so, processing may proceed to step 630. Otherwise, processing may proceed to 632. At 630, UORA (UL OFDMA-based random access) procedure is executed. At 632, the User Info field counter is incremented by 1. At 634, it is determined whether the User Info field counter is equal to the number of User Info fields in the EHT Basic Trigger frame 500. If the User Info field counter is not equal to the number of User Info fields in the EHT Basic Trigger frame 500, processing may proceed back to step 620 again. If the User Info field counter is equal to the number of User Info fields in the EHT Basic Trigger frame 500, processing may end at 636. It can be appreciated that steps 620, 628, 632 and 634 form a loop for the STA to cycle through and read all the user info fields that are present in the EHT Basic Trigger frame 500. At 612, an EHT TB PPDU is prepared based on the common parameters (e.g. common parameters from the Common Info field 502) and the user specific resource allocation information (e.g. the user specific resource allocation information stored by the STA if processing is from step 610 or 624, or the user specific resource allocation information 514 obtained from the User Info field whose AID12 subfield value matches the AID of the STA if processing is from step 626). At 636, processing ends.

Figure 6B:
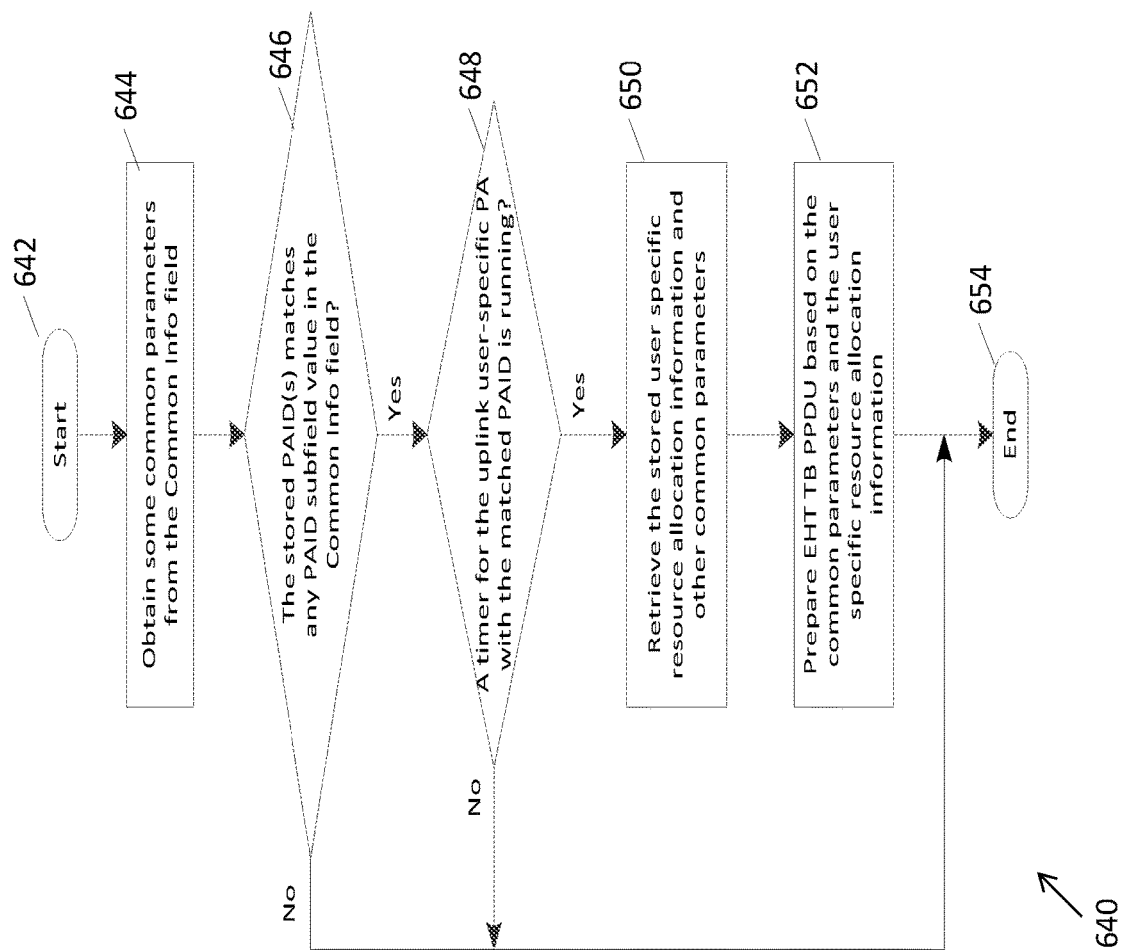
FIG. 6B shows a flow chart illustrating processing of a received PA Trigger frame at an STA according to the first embodiment.

FIG. 6B shows a flow chart 640 illustrating processing of a received PA Trigger frame 520 at a STA according to the first embodiment. Processing may start at step 642. At 644, some common parameters are obtained from the Common Info field of the PA Trigger frame 520. At 646, it is determined whether the stored PAID(s) matches any PAID subfield value in the Trigger Dependent Common Info field 522 of the PA Trigger frame 520. If the stored PAID(s) matches a PAID subfield value contained in the Trigger Dependent Common Info field 522 of the PA Trigger frame 520, processing may proceed to step 648. If the stored PAID(s) does not match any PAID subfield value, processing may end at step 654. At 648, it is determined whether a timer for the uplink user-specific PA with the matched PAID is running. If it is determined that the timer is running, processing may proceed to step 650. If it is determined that the timer is not running, processing may end at step 654. At 650, the user specific resource allocation information and other common parameters stored by the STA are retrieved. At 652, an EHT TB PPDU based on the common parameters and the user specific resource allocation information is prepared.

Figure 6C:
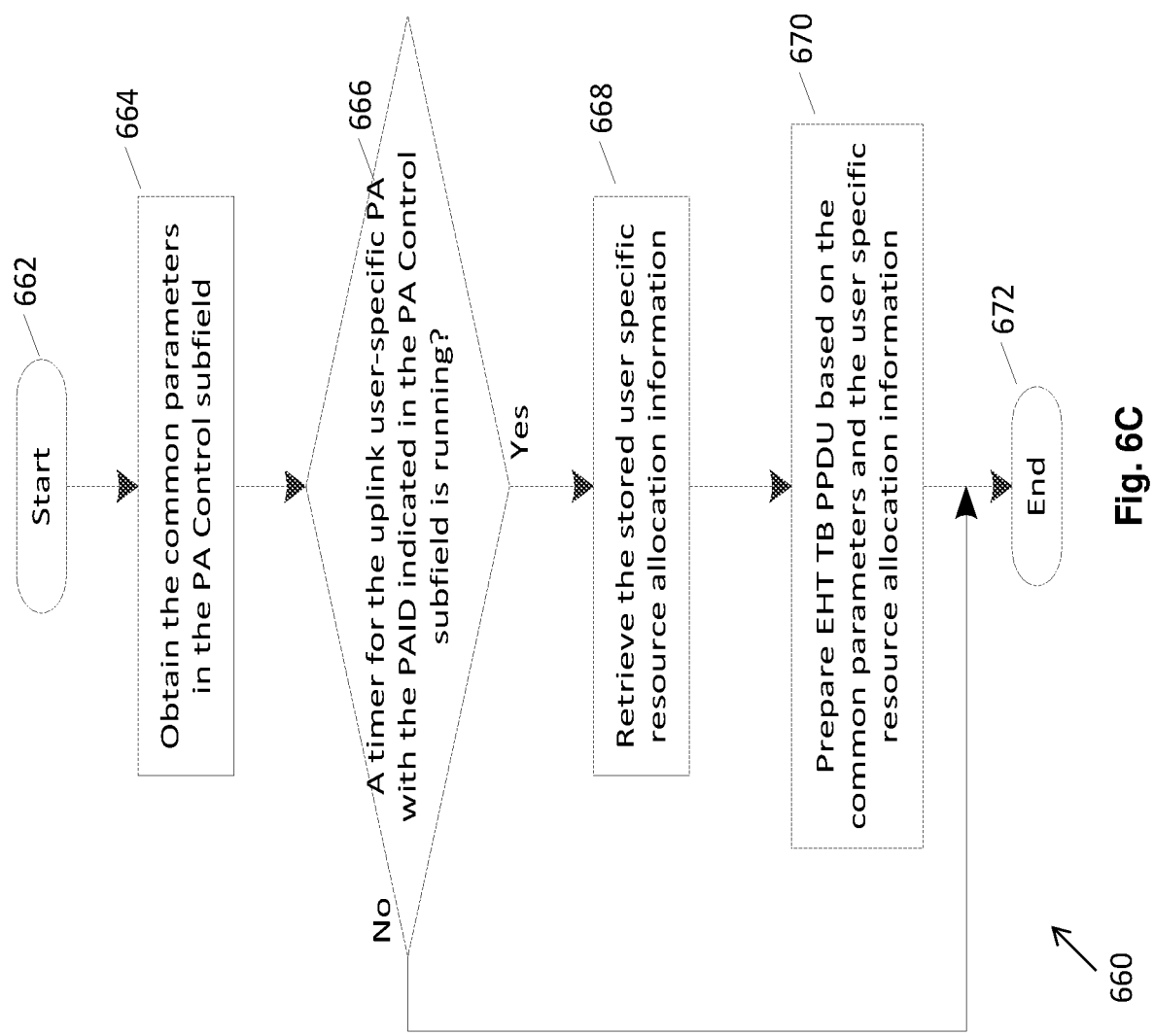
FIG. 6C shows a flow chart illustrating processing of a received data or management frame carrying a PA Control subfield at an STA according to the first embodiment.

FIG. 6C shows a flow chart 660 illustrating processing of a received data or management frame 530 carrying a PA Control subfield at a STA which is an intended recipient of the frame 530 according to the first embodiment. Processing may start at step 662. At 664, common parameters 534 are obtained from the PA Control subfield of the data or management frame 530. At 666, it is determined whether a timer for the uplink user-specific PA with the PAID indicated in the PA Control subfield is running. If it is determined that the timer is running, processing may proceed to step 668. If it is determined that the timer is not running, processing may end at step 672. At 668, the user specific resource allocation information stored by the STA is retrieved. At 670, an EHT TB PPDU based on the common parameters 534 obtained from the PA Control subfield of the data or management frame 530 and the retrieved user specific resource allocation information is prepared.

Figure 7A:
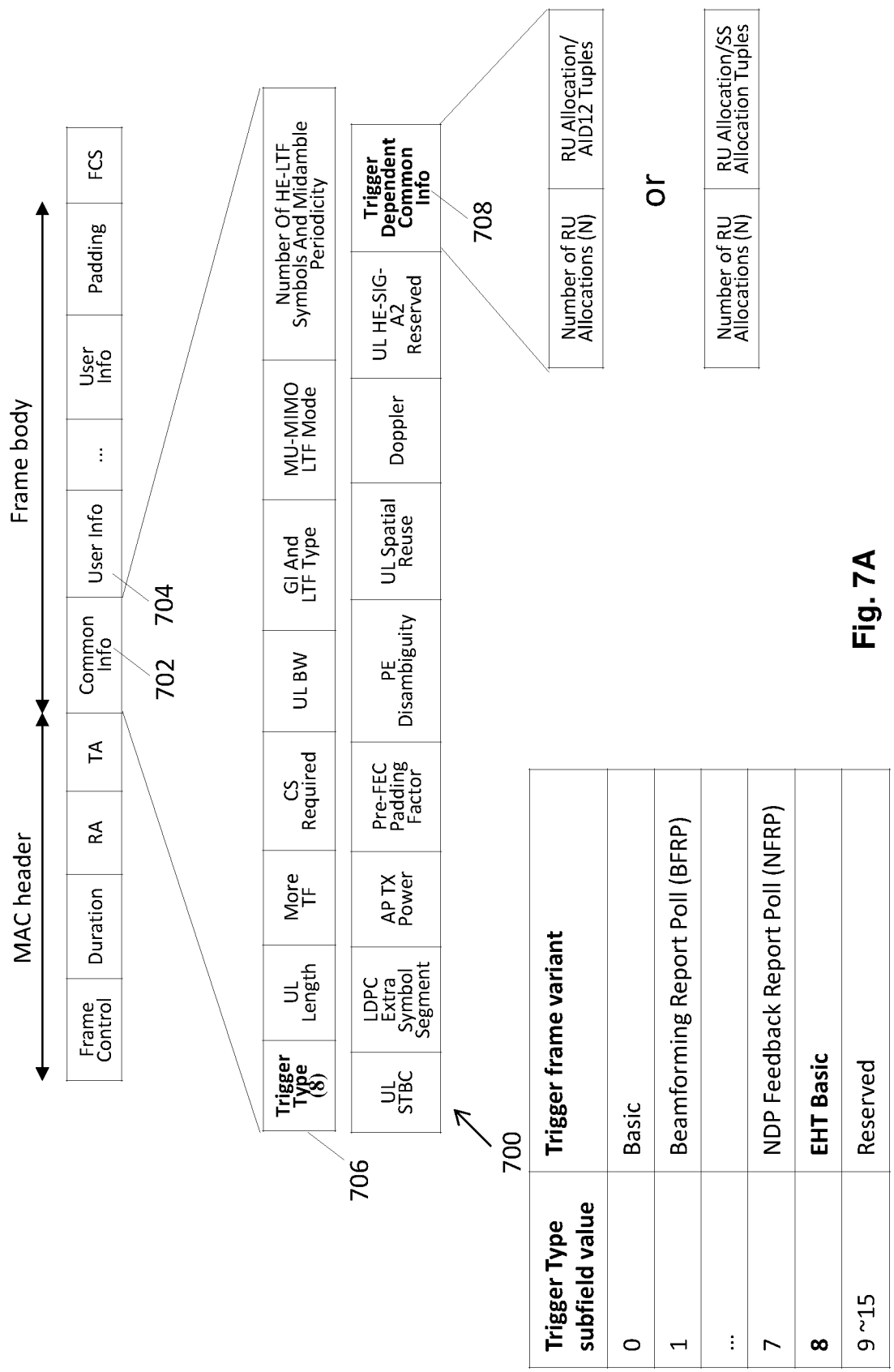
FIGS. 7A and 7B show a format of an EHT Basic Trigger frame used for uplink multiuser communications between an AP and multiple STAs in an EHT WLAN according to a second embodiment.
Figure 7B:
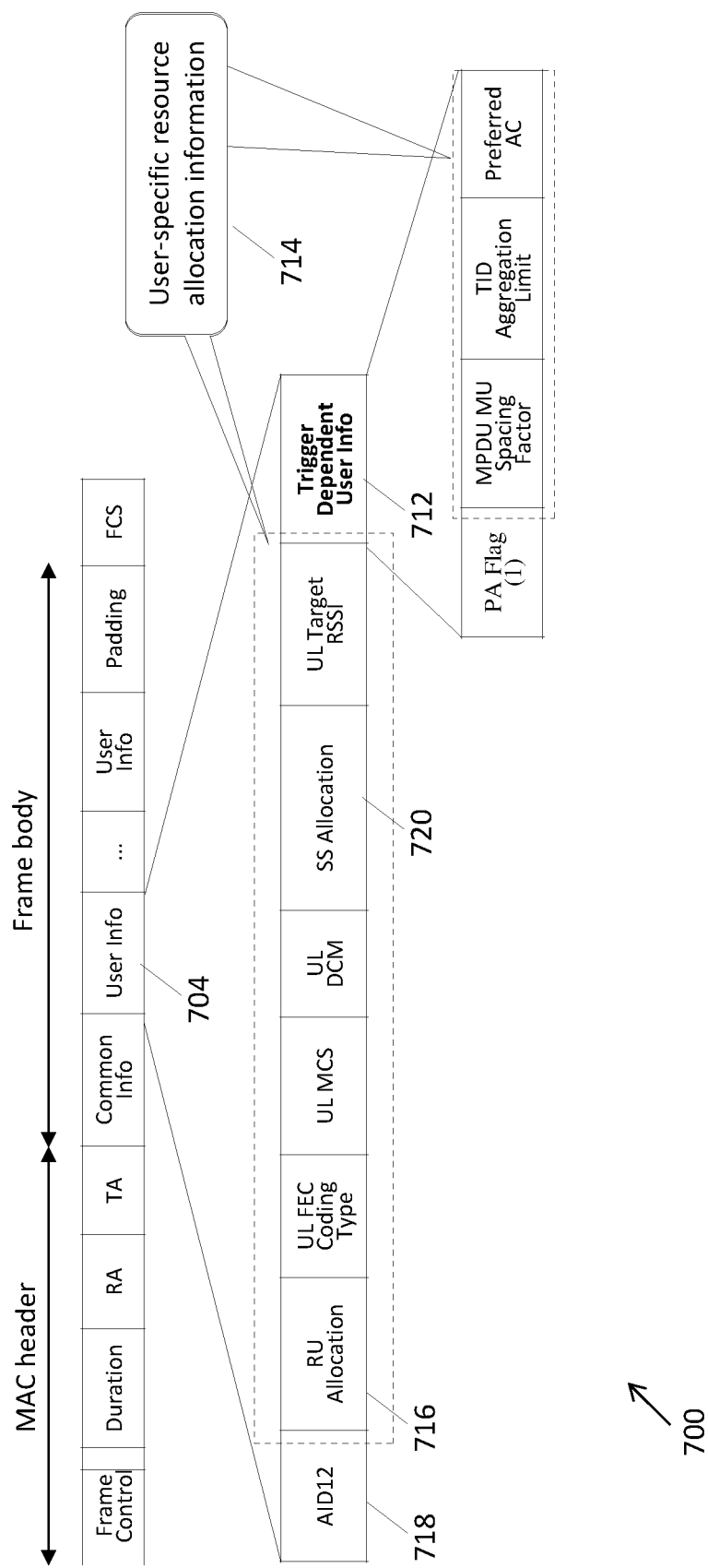

FIGS. 7A and 7B show a format of an EHT Basic Trigger frame 700 used for uplink multiuser communications between an AP and multiple STAs in an EHT WLAN according to a second embodiment. The EHT Basic Trigger frame 700 is a variant of the existing Trigger frame and may be used as the first frame 412 in FIGS. 4A and 4B. Unlike the EHT Basic Trigger frame 500 which uses the PAID of an uplink user-specific PA to identify the uplink user-specific PA, the EHT Basic Trigger frame 700 uses RU allocation information of an uplink user-specific PA as a part of identification information to identify the uplink user-specific PA. In one example, RU allocation information of an uplink user-specific PA, together with user identification information (e.g. user's AID) of an STA addressed by the uplink user-specific PA, is used to identify the uplink user-specific PA. In another example, RU allocation information of an uplink user-specific PA, together with SS allocation information (e.g. starting spatial stream) of the uplink user-specific PA, is used to identify the uplink user-specific PA. RU allocation information includes RU position in frequency domain. The EHT Basic Trigger frame 700 may include a Frame Control field, a Duration field, a RA field, a TA field, a Common Info field 702, one or more User Info fields such as User Info field 704, a Padding field and a FCS field. The Frame Control field, Duration field, RA field and TA field may be grouped in a MAC header of the EHT Basic Trigger frame 700. The Common Info field 702, one or more User Info fields 704 and Padding field may be grouped in a frame body of the EHT Basic Trigger frame 700.

FIG. 7A also depicts the Common Info field 702 in more detail. The Common Info field 702 contains common parameters for all STAs that are engaged in the EHT TB PPDU transmission solicited by the EHT Basic Trigger frame 700. The Common Info field 702 includes (or consists of) a Trigger Type field 706, a UL Length field, a More TF field, a CS Required field, an UL BW field, a GI and LTF Type field, an MU-MIMO LTF Mode field, a Number of HE-LTF Symbols and Midamble Periodicity field, an UL STBC field, a LDPC Extra Symbol Segment field, an AP TX Power field, a Pre-FEC Padding Factor field, a PE Disambiguity field, an UL Spatial Reuse field, a Doppler field, an UL HE-SIG-A2 Reserved field and a Trigger Dependent Common Info field 708. Unlike the Trigger Dependent Common Info field 508 of the EHT Basic Trigger frame 500, the Trigger Dependent Common Info field 708 of the EHT Basic Trigger frame 700 may include (or consist of) a Number of RU Allocations field and a RU Allocation/AID12 Tuples field. The Number of RU Allocations field indicates the number of RU Allocation/AID12 subfields in the RU Allocation/AID12 Tuples field. The EHT Basic Trigger frame 700 may then use RU allocation information and user identification information of an uplink user-specific PA indicated in the Trigger Dependent Common Info field 708 to solicit a recurring transmission of the uplink user-specific PA. Alternatively, the Trigger Dependent Common Info field 708 of the EHT Basic Trigger frame 700 may include (or consist of) a Number of RU Allocations field and a RU Allocation/SS Allocation Tuples field. The Number of RU Allocations field indicates the number of RU Allocation/SS Allocation subfields in the RU Allocation/SS Allocation Tuples field. The EHT Basic Trigger frame 700 may then use RU allocation information and SS allocation information of an uplink user-specific PA indicated in the Trigger Dependent Common Info field 708 to solicit a recurring transmission of the uplink user-specific PA. The Trigger Type field 706 may be assigned with an arbitrary value to indicate that the Trigger frame 700 is an EHT Basic Trigger frame. In various embodiments below, the Trigger Type field 706 is assigned with an arbitrary value of 8 to indicate that the Trigger frame 700 is an EHT Basic Trigger frame.

FIG. 7B depicts the User Info field 704 in more detail. The User Info field 704 includes an AID12 field, a RU Allocation field 716, an UL FEC Coding Type field, an UL MCS field, an UL DCM field, an SS Allocation field, an UL Target RSSI field and a Trigger Dependent User Info field 712. Unlike the EHT Basic Trigger frame 500, the Trigger Dependent User Info field 712 may include (or consist of) a 1-bit PA Flag subfield, an MPDU MU Spacing Factor subfield, a TID Aggregation Limit subfield and a Preferred AC subfield. The RU Allocation field 716, UL FEC Coding Type field, UL MCS field, UL DCM field, SS Allocation field, UL Target RSSI field, MPDU MU Spacing Factor subfield, TID Aggregation Limit subfield and Preferred AC subfield make up a user specific resource allocation information 714 of the User Info field 704. The user specific resource allocation information 714 may be obtained and stored by a STA for an initial or a recurring uplink user-specific PA transmission, where an EHT TB PPDU based on the stored user specific resource allocation information 714 is transmitted to an AP soliciting the uplink user-specific PA transmission. Unlike the Trigger Dependent User Info field 512 of the EHT Basic Trigger frame 500, the Trigger Dependent User Info field 712 of the EHT Basic Trigger frame 700 does not include a PAID subfield.

As mentioned above, the User Info field 704 may include a PA Flag subfield. The PA Flag subfield (e.g. 1 bit) indicates whether the User Info field 704 corresponds to an uplink user-specific PA. A User Info field with the PA Flag subfield set to 0 indicates that the User Info field does not correspond to an uplink user-specific PA. On the other hand, a User Info field with the PA Flag subfield set to 1 indicates that the User Info field corresponds to an uplink user-specific PA. In this case, the RU allocation information contained in the RU Allocation field of the User Info field (e.g. the RU Allocation field 716 of the User Info field 704), together with the user identification information contained in the AID12 field of the User Info field (e.g. the AID12 field 718 of the User Info field 704) or the SS allocation information contained in the SS Allocation field of the User Info field (e.g. the SS Allocation field 720 of the User Info field 704), identifies the uplink user-specific PA. Further, the PA Flag subfield of a User Info field for random access shall be set to 0. That is, uplink user-specific PA for random access is disallowed.

In an EHT Basic Trigger frame, no more than one User Info fields that are not for random access shall be addressed to a single STA. User Info field(s) that are for random access shall be located after User Info field(s) that are not for random access. A STA having an uplink user-specific PA indicated in the Common Info field shall not be addressed by a User Info field that is not for random access. Further, no more than one uplink user-specific PA assigned to a single STA shall be indicated in the Common Info field. Advantageously, this reduces the complexity in processing of a received EHT Basic Trigger frame at a STA.

The first frame 412 may be in a format of the EHT Basic Trigger frame 700. For example, at 414, the STA 406 may receive the first frame 412 in the form of the EHT Basic Trigger frame 700. The STA 406 may store user specific resource allocation information of an uplink user-specific PA intended for STA 406. Notice that the identification information of an uplink user-specific PA such as RU allocation information and SS allocation information is a part of the user specific resource allocation information of the uplink user-specific PA. The user specific resource allocation information may be retrieved from a User Info field whose AID12 subfield value matches the AID of the STA 406. The STA 406 may then transmit an EHT TB PPDU 418 to the AP 402 accordingly, wherein the EHT TB PPDU 418 is based on the stored user specific resource allocation information.

Likewise, the STA 404 may also receive the first frame 412 in a form of the EHT Basic Trigger frame 700. The STA 404 may store user specific resource allocation information of an uplink user-specific PA intended for STA 404. Notice that the identification information of an uplink user-specific PA such as RU allocation information and SS allocation information is a part of the user specific resource allocation information of the uplink user-specific PA. The user specific resource allocation information may be retrieved from a User Info field whose AID12 subfield value matches the AID of the STA 404. The STA 404 may then transmit an EHT TB PPDU 416 to the AP 402 accordingly, wherein the EHT TB PPDU 416 is based on the stored user specific resource allocation information.

The second frame 422 may also be in a format of the EHT Basic Trigger frame 700. For example, the STA 406 may receive the second frame 422 in a format of the EHT Basic Trigger frame 700. The STA 406 may obtain common parameters from the Common Info field 702 of the EHT Basic Trigger frame 700 and determine whether the RU allocation information stored by the STA 406 at 414 and the user identification information of the STA 406 matches any RU Allocation/AID12 field value in the Trigger Dependent Common Info field 708 of the Common Info field 702 or whether the RU allocation information and SS allocation information stored by the STA 406 at 414 matches any RU Allocation/SS allocation field value in the Trigger Dependent Common Info field 708 of the Common Info field 702. If so, the STA 406 may, at 424, prepare the EHT TB PPDU 428 based on the user specific resource allocation information stored by the STA 406 at 414, and transmit the prepared EHT TB PPDU 428 to the AP 402.

Likewise, the STA 404 may receive the second frame 422 in a format of the EHT Basic Trigger frame 700. The STA 404 may obtain common parameters from the Common Info field 702 of the EHT Basic Trigger frame 700 and determine whether the RU allocation information stored by the STA 404 at 414 and the user identification information of the STA 404 matches any RU Allocation/AID12 field value in the Trigger Dependent Common Info field 708 of the Common Info field 702 or whether the RU allocation information and SS allocation information stored by the STA 404 at 414 matches any RU Allocation/SS allocation field value in the Trigger Dependent Common Info field 708 of the Common Info field 702. If so, the STA 404 may prepare the EHT TB PPDU 426 based on the user specific resource allocation information stored by the STA 404 at 414 and transmit the prepared EHT TB PPDU 426 to the AP 402.

Figure 7C:
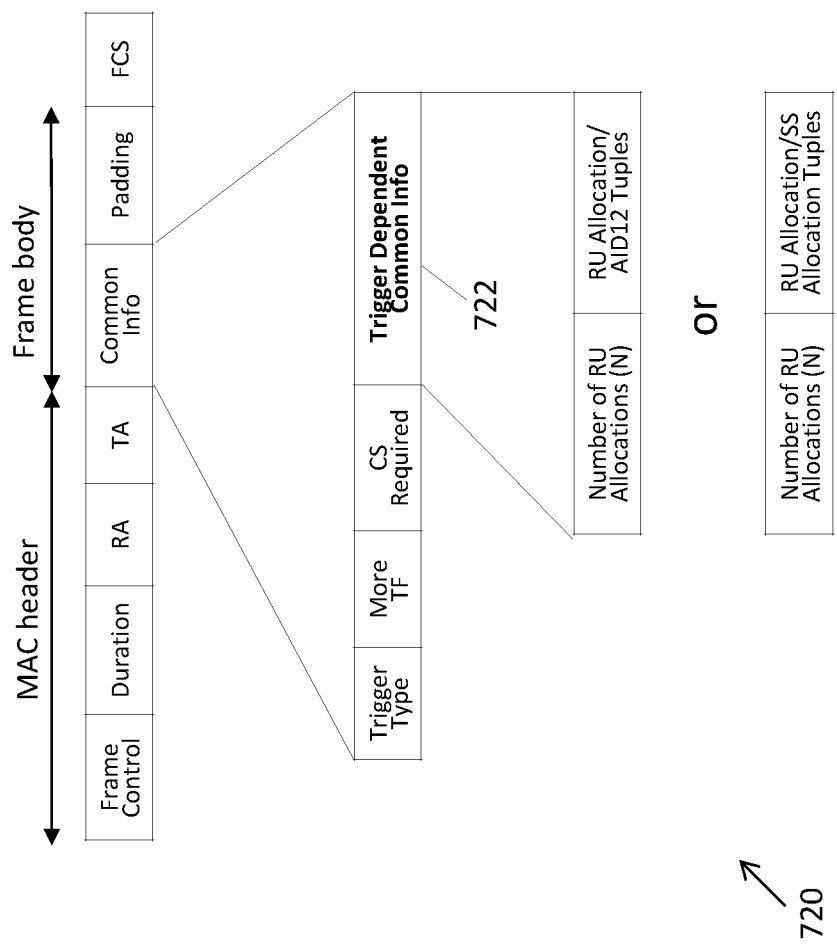
FIG. 7C shows a PA Trigger frame used for uplink multiuser communications according to the second or a fourth embodiment.

The second frame 422 may also be in a form of a PA Trigger frame 720 according to the second embodiment as shown in FIG. 7C. The PA Trigger frame 720 may include (or consist of) a Frame Control field, a Duration field, a RA field, a TA field, a Common Info field, a Padding field and a FCS field. The Common Info field may include (or consist of) a Trigger Type field, a More TF field, a CS Required field and a Trigger Dependent Common Info field 722. The Trigger Dependent Common Info field 722 may include (or consist of) a Number of RU Allocations field and a RU Allocation/AID12 Tuples field. The Number of RU Allocations field indicates the number of RU Allocation/AID12 subfields in the RU Allocation/AID12 Tuples field. Unlike the PA Trigger frame 520 which solicits a recurring transmission of an uplink user-specific PA using its PAID contained in the Trigger Dependent Common Info field 522, the PA Trigger frame 720 may then solicit a recurring transmission of an uplink user-specific PA using its RU allocation information and user identification information contained in the Trigger Dependent Common Info field 722. Alternatively, the Trigger Dependent Common Info field 722 may include (or consist of) a Number of RU Allocations field and a RU Allocation/SS Allocation Tuples field. The Number of RU Allocations field indicates the number of RU Allocation/SS Allocation subfields in the RU Allocation/SS Allocation Tuples field. The PA Trigger frame 720 may then use RU allocation information and SS allocation information of an uplink user-specific PA indicated in the Trigger Dependent Common Info field 722 to solicit a recurring transmission of the uplink user-specific PA. In a PA Trigger frame, no more than one uplink user-specific PA assigned to a single STA shall be indicated in the Common Info field. Advantageously, this reduces the complexity in processing of a received PA Trigger frame at a STA.

The PA Trigger frame 720 is only used to solicit a recurring transmission of one or more PA, such as the EHT TB PPDU 426 and 428. Only some common parameters are present in the Common Info field of a PA Trigger frame 720 and other common parameters may be unchanged before the one or more PA expires and can be obtained from the first frame 412. Further, except the identification information for the one or more PA, no other user specific resource allocation information required for the one or more PA is included in a PA Trigger frame, because it may be obtained from the first frame 412. Advantageously, this reduces channel overhead for a recurring transmission of the one or more uplink user-specific PA.

Figure 7D:
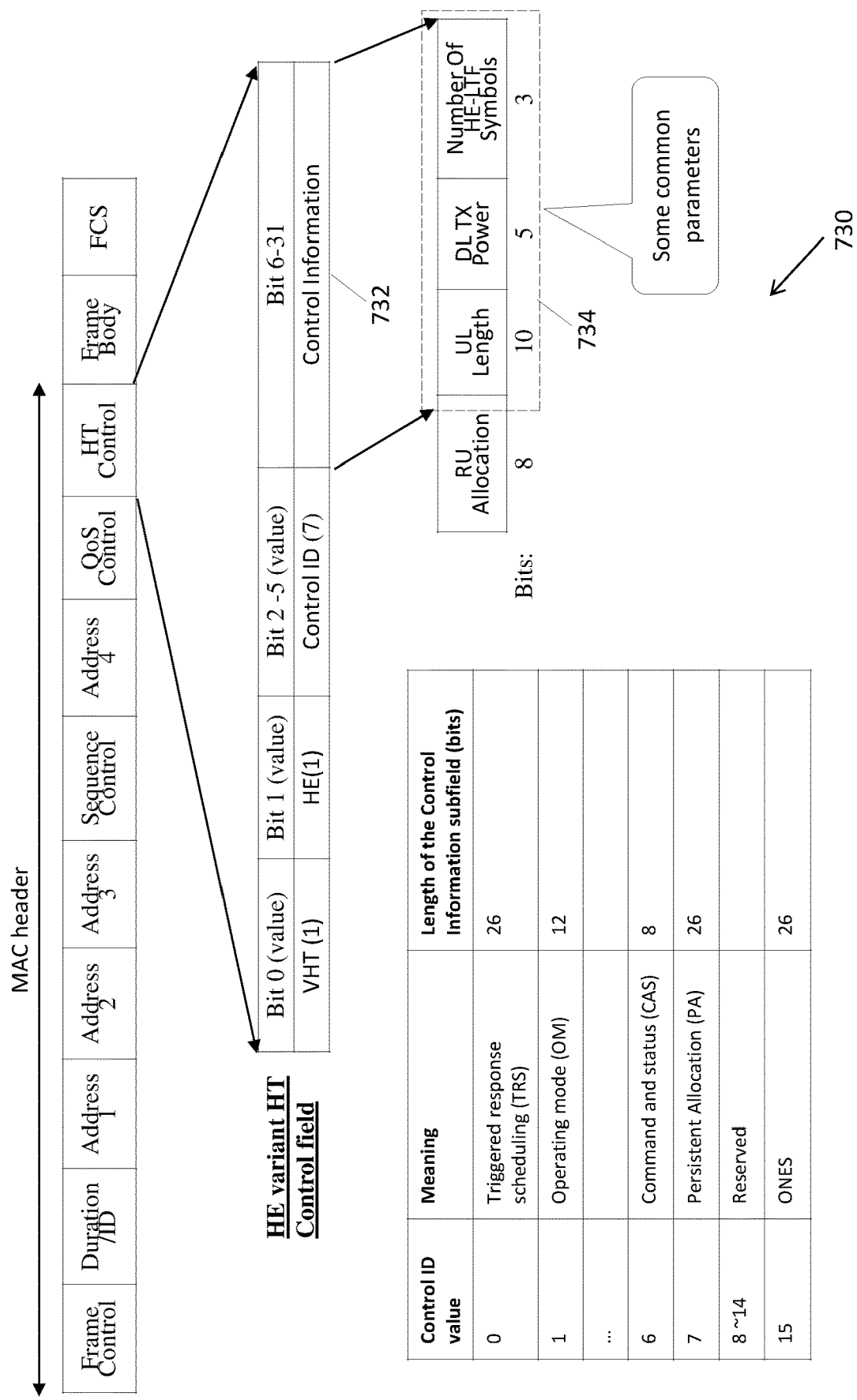
FIG. 7D shows a data or management frame carrying a PA Control subfield used for uplink multiuser communications according to the second or fourth embodiment.

The second frame 422 may also be in a form of a data or management frame 730 carrying a PA Control subfield according to the second embodiment as shown in FIG. 7D. The data or management frame 730 may include (or consist of) a Frame Control field, a Duration/ID field, four Address fields, a Sequence Control field, a QoS Control field, a HT Control field, a Frame Body field and a FCS field. The HT Control field may be a 32-bit HE variant HT Control field including (or consisting of) a VHT field (set to 1), a HE field (set to 1), a Control ID field (set to a determined value, e.g. 7, to indicate that the HT Control field of the data or management frame 730 contains a PA Control subfield) and a Control Information field. The 26-bit Control Information field may include (or consist of) an 8-bit RU Allocation subfield and some common parameters 734 such as a 10-bit UL Length subfield, a 5-bit DL TX Power subfield and a 3-bit Number of HE-LTF Symbols subfield. It can be appreciated that other common parameters can be predetermined or implicitly signalled. Unlike the data or management frame 530 which solicits a recurring transmission of an uplink user-specific PA using its PAID contained in the Control Information field 532, the data or management frame 730 may solicit a recurring transmission of an uplink user-specific PA using its RU allocation information contained in the Control Information field 732 and user identification information (e.g. MAC address) of the intended STA contained in one of the four Address fields. Similar to the PA Trigger frame 720, no other user specific resource allocation information required for the uplink user-specific PA is included in the data or management frame 530, because it may be obtained from the first frame 412. Advantageously, this reduces channel overhead for a recurring transmission of the uplink user-specific PA.

In the second embodiment as described above, an uplink user-specific PA may exist for a time period after a first frame soliciting an initial transmission of the uplink user-specific PA is transmitted. In an example, an uplink user-specific PA may exist till the end of a current TXOP. In another example, an uplink user-specific PA may exist for a determined number of service periods or Beacon intervals. In yet another example, the Common Info field in the first frame may comprise a signalling to indicate a time period for which the uplink user-specific PAs whose initial transmissions solicited by the first frame exist after the first frame is transmitted. For such examples, the uplink user-specific PAs whose initial transmissions solicited by the first frame have the same expiry time. Alternatively, the User Info field corresponding to an uplink user-specific PA in a first frame may comprise a signalling to indicate a time period for which the uplink user-specific PA exists after the first frame is transmitted. In the alternate examples, the uplink user-specific PAs whose initial transmissions solicited by the first frame may have different expiry times.

In the second embodiment as described above, AP may send a first frame to update user-specific resource allocation information excluding identification information (e.g. RU allocation information and SS allocation information) for an uplink user-specific PA before it expires. If the user-specific resource allocation information for an uplink user-specific PA are updated before it expires and the intended STA fails to receive the update information, there will be a mismatch on the information of the uplink user-specific PA between the AP and the intended STA. The AP may be able to identify such a mismatch if no EHT TB PPDU is received as a response to a transmitted first frame. When a STA receives a first frame that includes complete information on an uplink user-specific PA for which it is intended STA, it shall start or reset a timer for the uplink user-specific PA and store or update information on the uplink user-specific PA. Similarly, the STA may also store or update the common parameters in the Common Info field with this process. Advantageously, this enables the AP to perform error recovery from information mismatch.

Figure 8A:
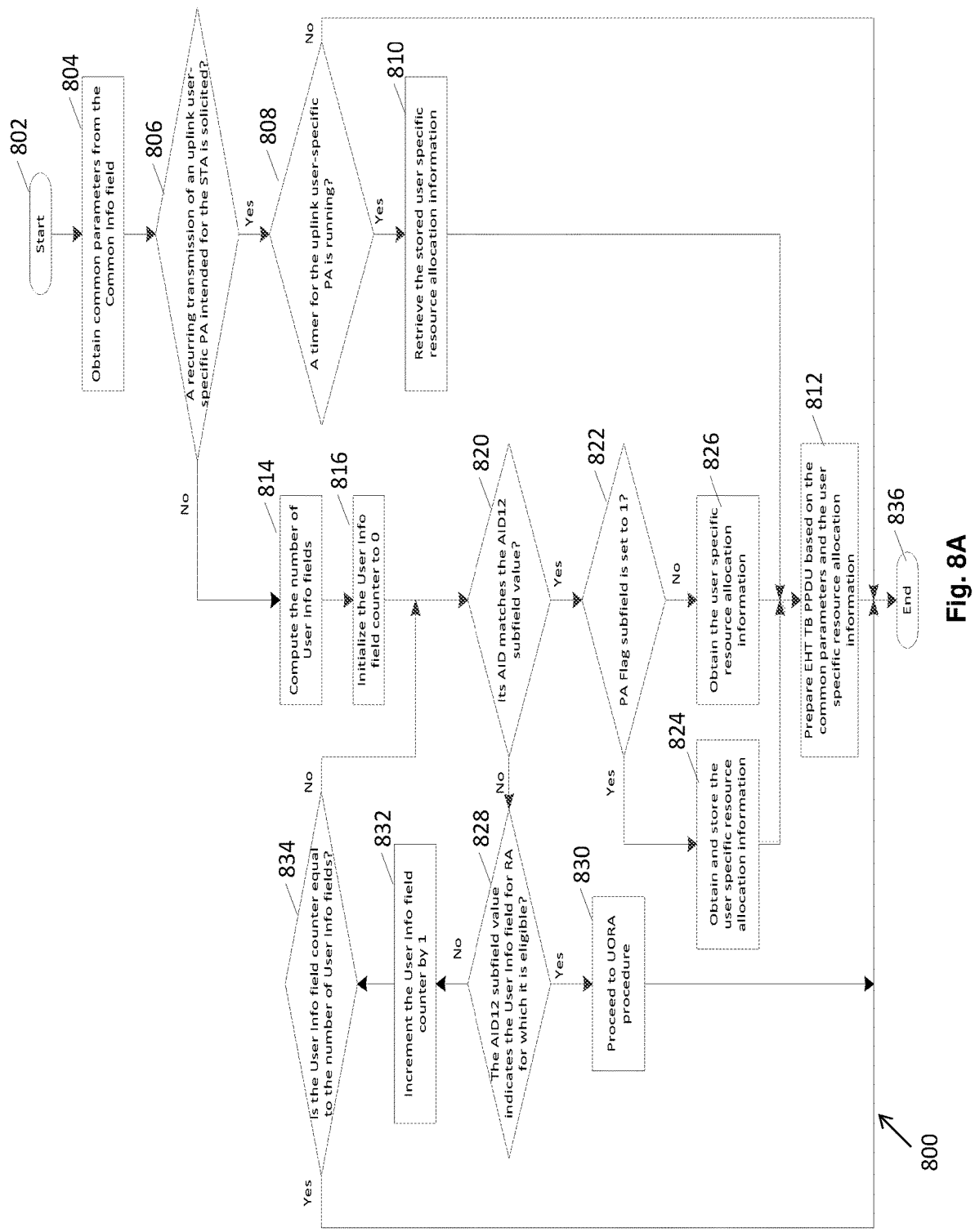
FIG. 8A shows a flow chart illustrating processing of a received EHT Basic Trigger frame at an STA according to the second embodiment.

FIG. 8A shows a flow chart 800 illustrating processing of a received EHT Basic Trigger frame 700 at an STA according to the second embodiment. Processing may start at 802. At 804, common parameters from the Common Info field 702 are obtained. At 806, it is determined whether a recurring transmission of an uplink user-specific PA intended for the STA is solicited. This can be done by checking whether the stored RU allocation information and the user identification information of the STA match any RU Allocation/AID12 subfield value in the Common Info field 702 or whether the stored RU allocation information and SS allocation information match any RU Allocation/SS Allocation subfield value in the Common Info field 702. If a recurring transmission of an uplink user-specific PA intended for the STA is solicited, processing may proceed with step 808. Otherwise, processing may proceed to step 814. At 808, it is determined if a timer for the uplink user-specific PA is running. If a timer for the uplink user-specific PA is running, processing may proceed to step 810. Otherwise, processing may end at step 836. At 810, the user specific resource allocation information stored by the STA is retrieved. At 814, the number of User Info fields are computed. At 816, the User Info field counter is initialised to zero. At 820, it is determined whether the AID of the STA matches the AID12 subfield value of a User Info field in the EHT Basic Trigger frame 700. If the AID of the STA matches the AID12 subfield value, processing may proceed to step 822. If the AID of the STA does not match the AID12 subfield value, processing may proceed to step 828. At 822, it is determined whether the PA Flag subfield is set to 1. If the PA Flag subfield is not set to 1, meaning that the User Info field does not correspond to an uplink user-specific PA, processing may proceed to step 826. If the PA flag subfield is set to 1, meaning that the User Info field corresponds to an uplink user-specific PA, processing may proceed to 824. At 826, the user specific resource allocation information 714 is obtained from the User Info field. At 824, the user specific resource allocation information 714 are obtained from the User Info field and stored by the STA. At 828, it is determined whether the AID12 subfield value of the User Info field indicates the User Info field for RA for which it is eligible. If this is so, processing may proceed to step 830. Otherwise, processing may proceed to step 832. At 830, UORA procedure is executed. At 832, the User Info field counter is incremented by 1. At 834, it is determined whether the User Info field counter is equal to the number of User Info fields in the EHT Basic Trigger frame 700. If the User Info field counter is not equal to the number of User Info fields in the EHT Basic Trigger frame 700, processing may proceed back to step 820 again. If the User Info field counter is equal to the number of User Info fields in the EHT Basic Trigger frame 700, processing may end at 836. It can be appreciated that steps 820, 828, 832 and 834 form a loop for the STA to cycle through and read all the User Info fields that are present in the EHT Basic Trigger frame 700. At 812, an EHT TB PPDU is prepared based on the common parameters (e.g. common parameters from the Common Info field 702) and the user specific resource allocation information (e.g. the user specific resource allocation information stored by the STA if processing is from step 810 or 824, or the user specific resource allocation information 714 obtained from the User Info field if processing is from step 826). At 836, processing ends.

Figure 8B:
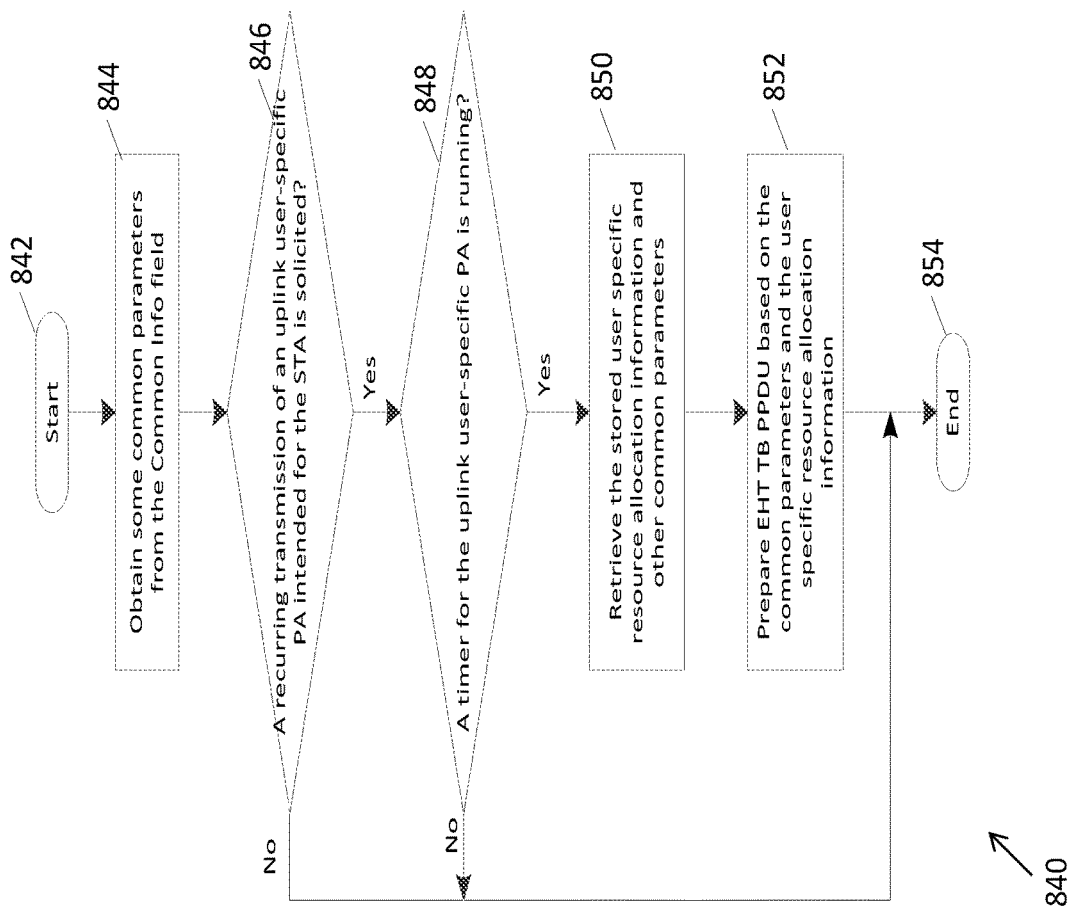
FIG. 8B shows a flow chart illustrating processing of a received PA Trigger frame at an STA according to the second or fourth embodiment.

FIG. 8B shows a flow chart 840 illustrating processing of a received PA Trigger frame 720 at a STA according to the second embodiment. Processing may start at step 842. At 844, some common parameters are obtained from the Common Info field of the PA Trigger frame 720. At 846, it is determined whether a recurring transmission of an uplink user-specific PA intended for the STA is solicited. This can be done by checking whether the stored RU allocation information and the user identification information of the STA match any RU Allocation/AID12 subfield value in the Trigger Dependent Common Info field 722 or whether the stored RU allocation information and SS allocation information match any RU Allocation/SS Allocation subfield value in the Trigger Dependent Common Info field 722. If a recurring transmission of an uplink user-specific PA intended for the STA is solicited, processing may proceed to step 848. Otherwise, processing may end at step 854. At 848, it is determined whether a timer for the uplink user-specific PA is running. If it is determined that the timer is running, processing may proceed to step 850. If it is determined that the timer is not running, processing may end at step 854. At 850, the stored user specific resource allocation information and other common parameters are retrieved. At 852, an EHT TB PPDU based on the common parameters and the user specific resource allocation information is prepared. At 854, processing ends.

Figure 8C:
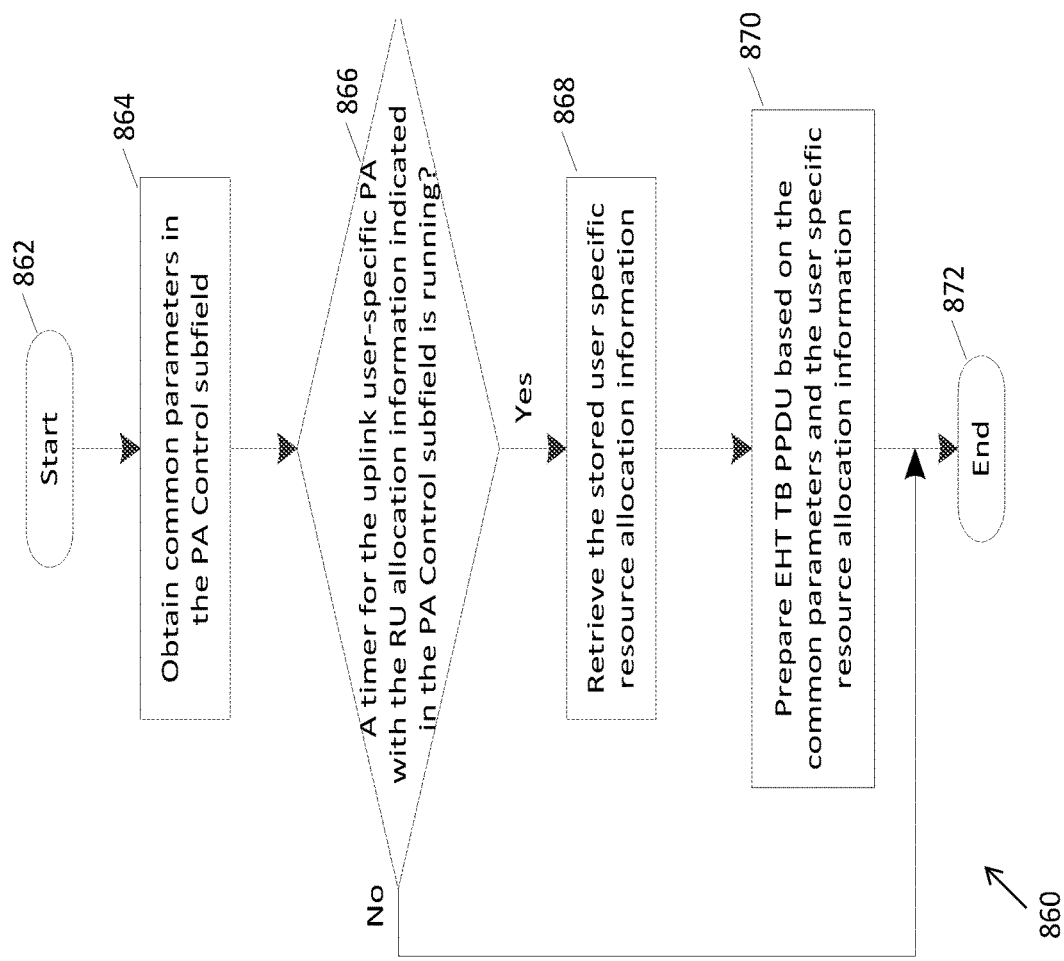
FIG. 8C shows a flow chart illustrating processing of a received data or management frame carrying a PA Control field at an STA according to the second or fourth embodiment.

FIG. 8C shows a flow chart 860 illustrating processing of a received data or management frame 730 carrying a PA Control subfield at an STA which is an intended recipient of the frame 730 according to the second embodiment. Processing may start at step 862. At 864, common parameters 734 are obtained from the PA Control subfield of the data or management frame 730. At 866, it is determined whether a timer for the uplink user-specific PA with the RU allocation information indicated in the PA Control subfield is running. If it is determined that the timer is running, processing may proceed to step 868. If it is determined that the timer is not running, processing may end at step 872. At 868, the user specific resource allocation information stored by the STA is retrieved. At 870, an EHT TB PPDU based on the common parameters 734 obtained from the PA Control subfield of the data or management frame 730 and the retrieved user specific resource allocation information is prepared. At 872, processing ends.

Figure 9A:
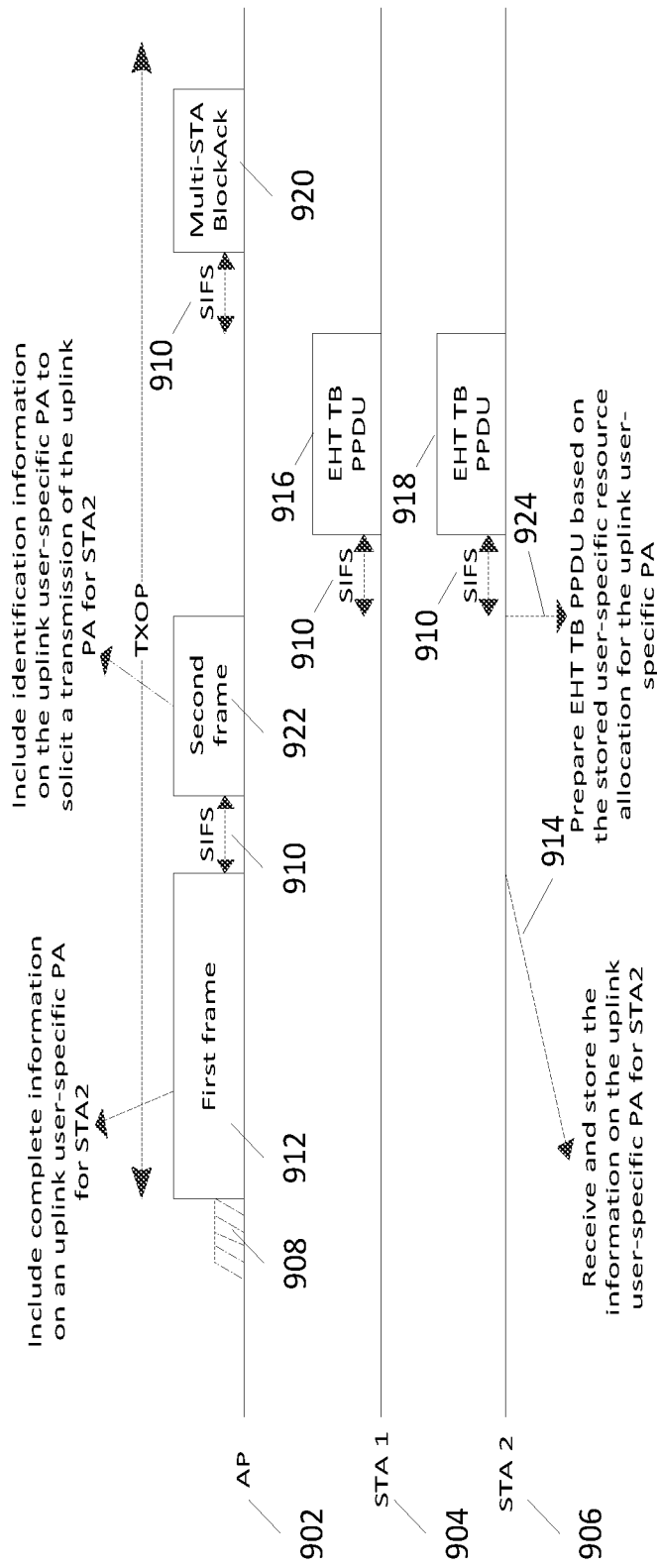
FIG. 9A depicts a flow chart illustrating a communication between an AP and multiple STAs with uplink user-specific PA over a TXOP according to various embodiments.

FIG. 9A depicts a flow chart 900 illustrating a communication between an AP 902 and multiple STAs (904, 906) with uplink user-specific PA over a TXOP according to various embodiments. Contention based channel access procedures, e.g. EDCA procedures, are illustrated by blocks 908, and SIFS 910 are illustrated. The AP 902 may generate a first frame 912. Complete information for an uplink user-specific PA is announced in the first frame 912. The complete PA information may comprise identification information and user specific resource allocation information. In an embodiment, the identification information may be the PAID of the uplink user-specific PA. In another embodiment, the identification information may be RU allocation information and user identification information for the uplink user-specific PA. In yet another embodiment, the identification information may be RU allocation information and SS allocation information for the uplink user-specific PA. In various embodiments, the identification information together with the user specific resource allocation information is included in a frame body of the frame to identify the uplink user-specific PA. Unlike the first frame 412 in FIG. 4A, the first frame 912 does not solicit an initial transmission of the uplink user-specific PA. The AP 902 may transmit the generated first frame 912 to the STA 404 and 906.

At 914, the STA 906 may receive the first frame 912 and store the complete information of the uplink user-specific PA (i.e. the identification information and user specific resource allocation information of the uplink user-specific PA intended for STA 906). Unlike the embodiment as shown in FIG. 4A, the STA 906 does not transmit an EHT TB PPDU to the AP 902 because an initial transmission is not solicited by the first frame 912. The STA 904 may also receive and store the complete information on the uplink user-specific PA (i.e. the identification information and user specific resource allocation information of the uplink user-specific PA intended for STA 904).

Thereafter, the AP 902 may solicit a transmission of the uplink user-specific PA for STA 904 and a transmission of the uplink user-specific PA for STA 906 by transmitting a second frame 922. The second frame 922 may carry the identification information for the uplink user-specific PA for the STA 904 to solicit an initial or recurring transmission of the uplink user-specific PA for the STA 904 and the identification information for the uplink user-specific PA for the STA 906 to solicit an initial or recurring transmission of the uplink user-specific PA for the STA 906. In various embodiments, identification information for an uplink user-specific PA is included in a frame body of the second frame 922 to solicit a transmission of the uplink user-specific PA and the frame is free from user specific resource allocation information for the uplink user-specific PA. In various embodiments, the identification information is included in a MAC header of the second frame 922 to solicit a transmission of the uplink user-specific PA and the frame is free from user specific resource allocation information for the uplink user-specific PA. Advantageously, channel overhead for a transmission of uplink user-specific PA may be reduced since the second frame is free from user specific resource allocation information for the uplink user-specific PA.

Figure 9B:
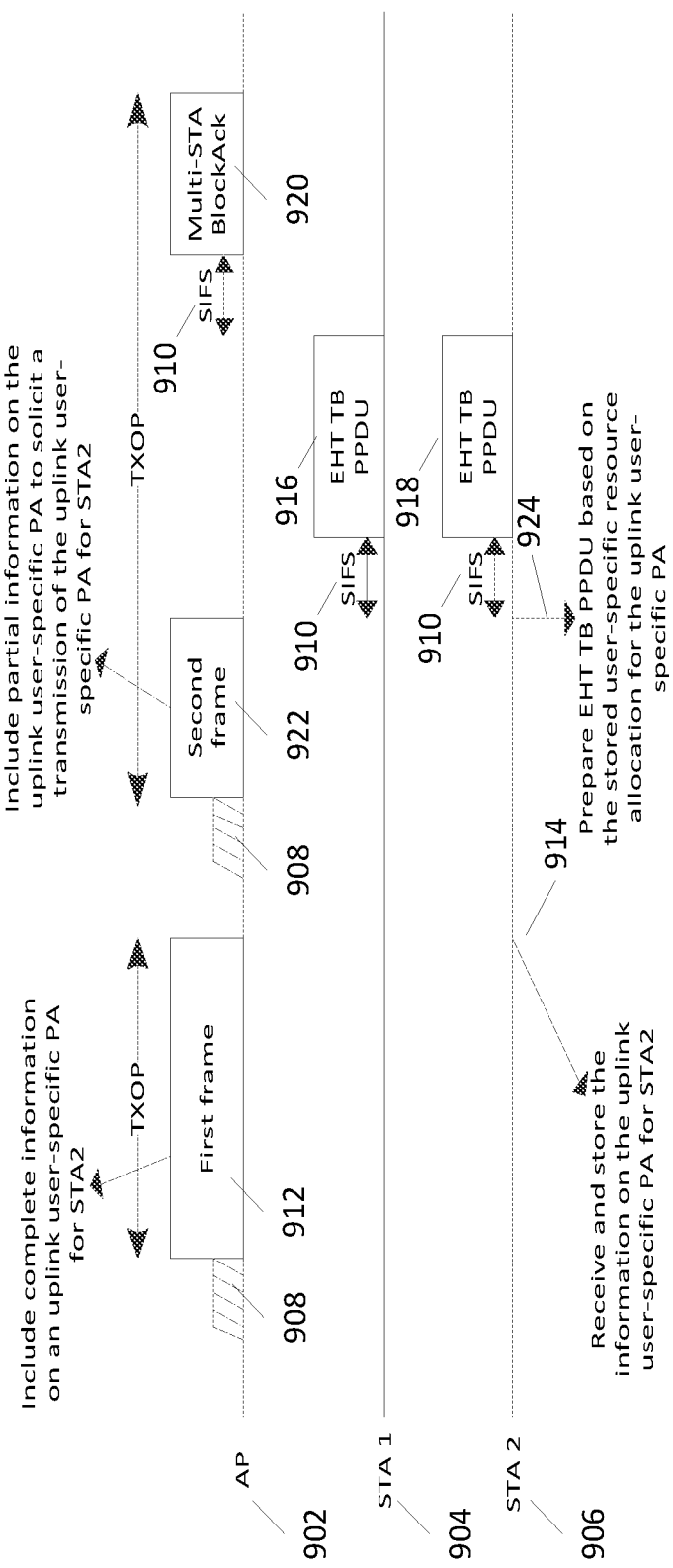
FIG. 9B depicts a flow chart illustrating a communication between an AP and multiple STAs with uplink user-specific PA over two TXOPs according to various embodiments.

At 924, STA 406 may prepare an EHT TB PPDU 918 based on the stored user-specific resource allocation information for the uplink user-specific PA and transmit the EHT TB PPDU 918 to the AP 902. The EHT TB PPDU 918 is a transmission of the uplink user-specific PA for STA 906. The STA 904 may also prepare an EHT TB PPDU 916 based on the stored user-specific resource allocation information for the uplink user-specific PA and transmit the EHT TB PPDU 916 to the AP 902. The EHT TB PPDU 916 is a transmission of the uplink user-specific PA for STA 904. The EHT TB PPDU 916 and 918 may be in the same format as EHT TB PPDU 212 illustrated in FIG. 2B. The AP 902 may receive the transmission of the EHT PPDU 916 and 918 and then transmit a Multi-STA BlockAck frame 920 to the STAs 904 and 906. The initial or recurring transmission of an uplink user-specific PA may occur within a same TXOP as the first frame transmission, as shown in FIG. 9A. The initial or recurring transmission may also occur in a different TXOP from the first frame transmission, as shown in FIG. 9B. That is, in an example, an uplink user-specific PA may exist till the end of a current TXOP. In another example, an uplink user-specific PA may exist for a determined number of service periods or Beacon intervals. In FIG. 9B, the second frame 922 is transmitted by the AP 902 in a different TXOP from the first frame 912, and therefore the transmissions that are solicited by the second frame 922 (e.g. the uplink user-specific PA transmissions of EHT TB PPDU 916 and 918) also occur in a different TXOP from the first frame 912. It can be appreciated that transmission of the second frame 922 occurs within a time duration in which the uplink user-specific PAs for STAs 904 and 906 are existing.

Figure 10A:
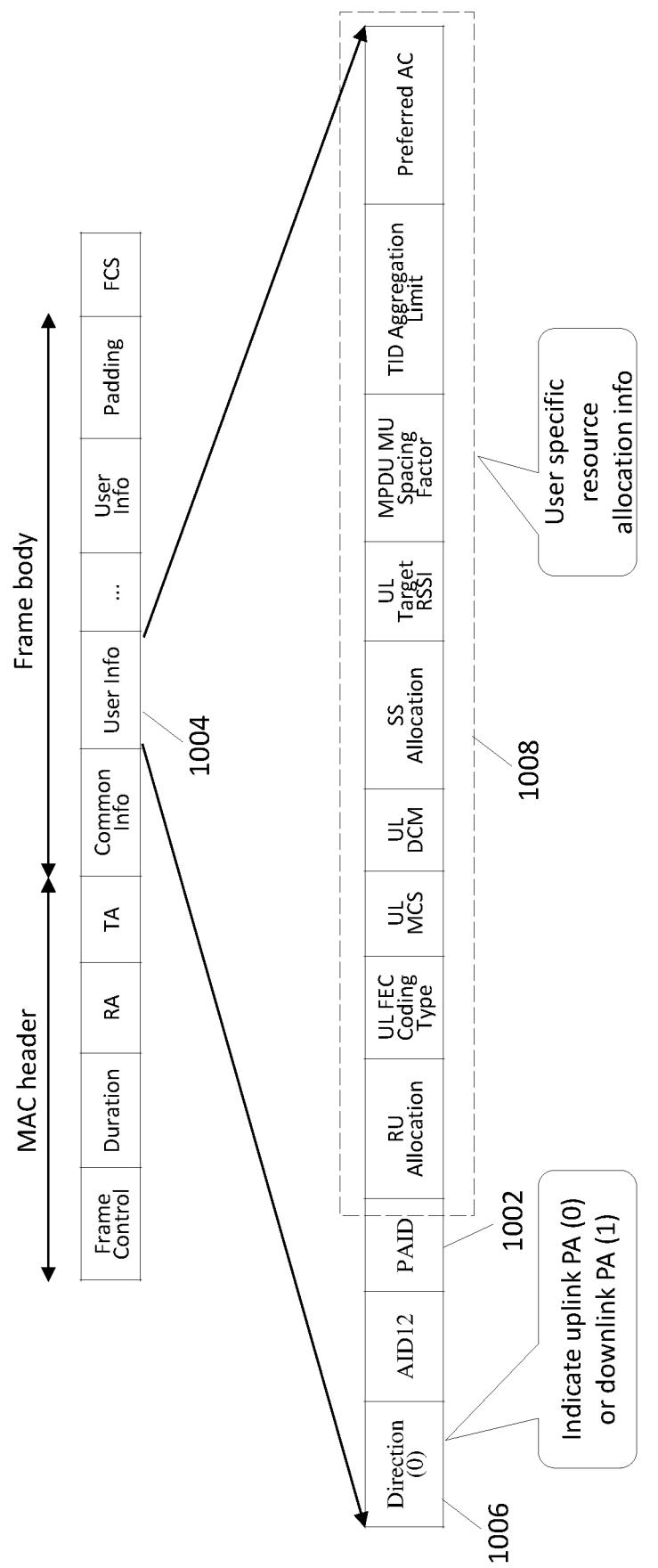
FIG. 10A shows a format of a PA Announcement frame used for uplink or downlink multiuser communications between an AP and multiple STAs in an EHT WLAN according to a third embodiment.

FIG. 10A shows a format of a PA Announcement frame 1000 used for uplink or downlink multiuser communications between an AP and multiple STAs in an EHT WLAN according to a third embodiment. The PA Announcement frame 1000 includes complete information on one or more PAs and may be used as the first frame 912 in FIGS. 9A and 9B. The PA Announcement frame 1000 uses the PAID of an uplink user-specific PA to identify the uplink user-specific PA. The PA Announcement frame 1000 may include a Frame Control field, a Duration field, a RA field, a TA field, a Common Info field, one or more User Info fields such as User Info field 1004, a Padding field and a FCS field. The Frame Control field, Duration field, RA field and TA field may be grouped in a MAC header of the PA Announcement frame 1000. The Common Info field, one or more User Info fields 1004 and Padding field may be grouped in a frame body of the PA Announcement frame 1000.

FIG. 10A also depicts the User Info field 1004 in more detail. The User Info field 1004 includes a Direction field 1006, an AID12 field, a PAID field 1002, a RU Allocation field, an UL FEC coding type field, an UL MCS field, an UL DCM field, an SS Allocation field, an UL Target RSSI field, an MPDU MU Spacing Factor subfield, a TID Aggregation Limit subfield and a Preferred AC subfield. The RU Allocation field, UL FEC Coding Type field, UL MCS field, UL DCM field, SS Allocation field, UL Target RSSI field, MPDU MU Spacing Factor subfield, TID Aggregation Limit subfield and Preferred AC subfield make up a user specific resource allocation information 1008 of the User Info field 1004.

As mentioned above, the User Info field 1004 may include a Direction field 1006. The Direction field 1006 indicates whether the User Info field 1004 corresponds to an uplink user-specific PA or a downlink user-specific PA. For example, a Direction field value of 1 indicates a downlink user-specific PA and a Direction field value of 0 indicates an uplink user-specific PA. In the present embodiment, the Direction field 1006 is set to 0 to indicate that the User Info field 1004 corresponds to an uplink user-specific PA. The User Info field 1004 may also include a PAID field 1002 which indicates the PAID of the uplink user-specific PA corresponding to the User Info field 1004.

The first frame 912 may be in a format of the PA Announcement frame 1000. For example, at 914, the STA 906 may receive the first frame 912 in a form of the PA Announcement frame 1000. The STA 906 may store identification information and user specific resource allocation information of an uplink user-specific PA intended for STA 906. The identification information (e.g. PAID) may be retrieved from the PAID subfield 1002 of a User Info field whose AID12 subfield value matches the AID of the STA 906. The user specific resource allocation information may also be retrieved from said User Info field.

Likewise, the STA 904 may also receive the first frame 912 in a form of the PA Announcement frame 1000. The STA 904 may store identification information and user specific resource allocation information of an uplink user-specific PA intended for STA 904. The identification information (e.g. PAID) may be retrieved from the PAID subfield 1002 of a User Info field whose AID12 subfield value matches the AID of the STA 904. The user specific resource allocation information may also be retrieved from said User Info field.

Figure 10B:
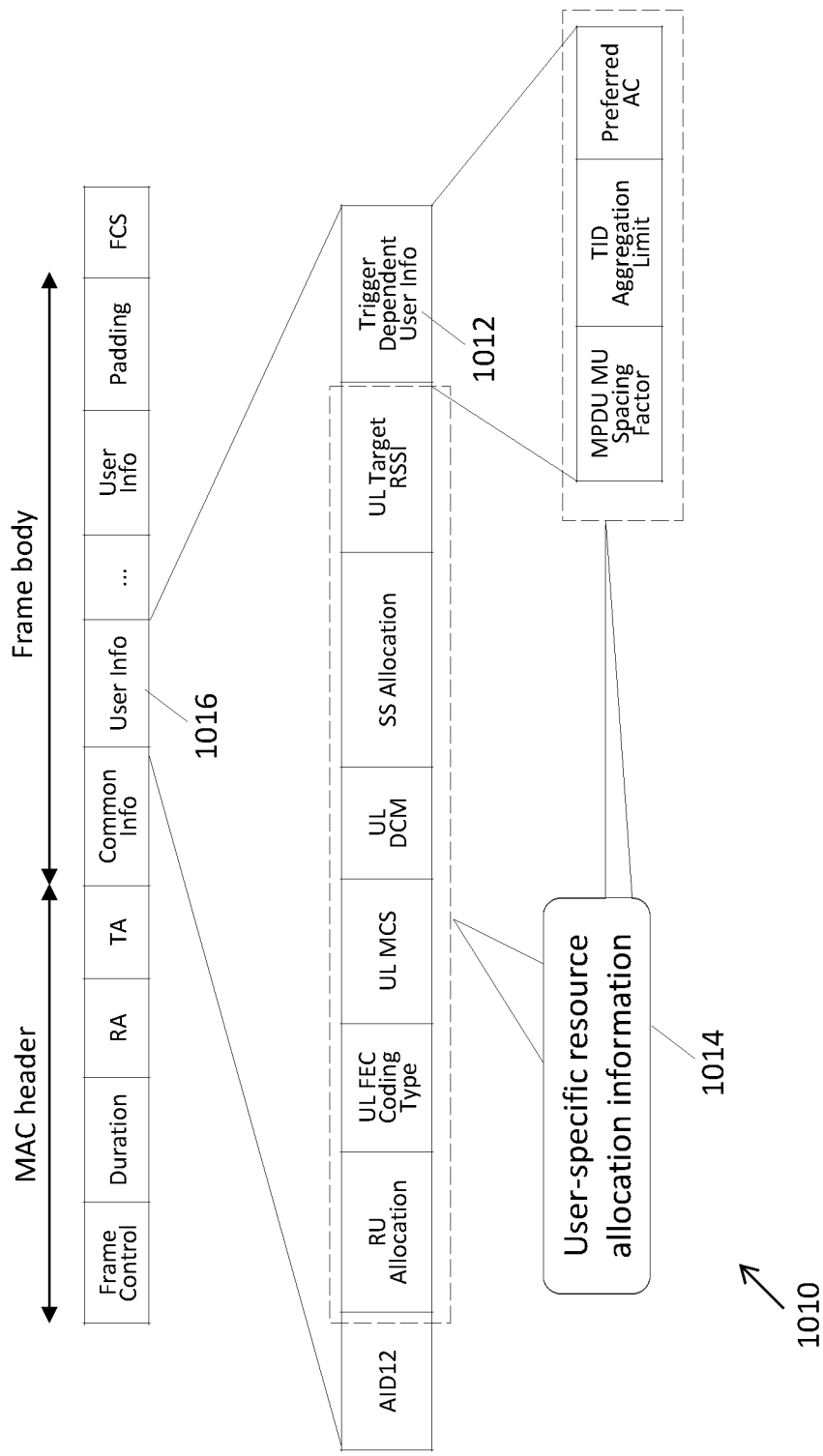
FIG. 10B shows a format of an EHT Basic Trigger frame used for uplink multiuser communications between an AP and multiple STAs in an EHT WLAN according to the third embodiment.

FIG. 10B shows a format of an EHT Basic Trigger frame 1010 used for uplink multiuser communications between an AP and multiple STAs in an EHT WLAN according to the third embodiment. The EHT Basic Trigger frame 1010 is a variant of the existing Trigger frame and may be used as the second frame 922 in FIGS. 9A and 9B. The EHT Basic Trigger frame 1010 uses the PAID of an uplink user-specific PA to identify the uplink user-specific PA. The EHT Basic Trigger frame 1010 may include a Frame Control field, a Duration field, a RA field, a TA field, a Common Info field, one or more User Info fields such as User Info field 1016, a Padding field and a FCS field. The Frame Control field, Duration field, RA field and TA field may be grouped in a MAC header of the EHT Basic Trigger frame 1010. The Common Info field, one or more User Info fields 1016 and Padding field may be grouped in a frame body of the EHT Basic Trigger frame 1010. The Common Info field (including all subfields of the Common Info field) of the EHT Basic Trigger frame 1010 is the same as the Common Info field 502 (including all subfields of the Common Info field 502) of the EHT Basic Trigger frame 500 as shown in FIG. 5A. The User Info field 1016 may include (or consist of) an AID12 field, a RU Allocation field, an UL FEC Coding Type field, an UL MCS field, an UL DCM field, an SS Allocation field, an UL Target RSSI field and a Trigger Dependent User Info field 1012. The Trigger Dependent User Info field 1012 may include (or consist of) an MPDU MU Spacing Factor subfield, a TID Aggregation Limit subfield and a Preferred AC subfield. The RU Allocation field, UL FEC Coding Type field, UL MCS field, UL DCM field, SS Allocation field, UL Target RSSI field, MPDU MU Spacing Factor subfield, TID Aggregation Limit subfield and Preferred AC subfield make up a user specific resource allocation information 1014 of the User Info field 1016.

In an EHT Basic Trigger frame, no more than one User Info fields that are not for random access shall be addressed to a single STA. User Info field(s) that are for random access shall be located after User Info field(s) that are not for random access. A STA having an uplink user-specific PA indicated in the Common Info field shall not be addressed by a User Info field that is not for random access. Further, no more than one uplink user-specific PA assigned to a single STA shall be indicated in the Common Info field. Advantageously, this reduces the complexity in processing of a received EHT Basic Trigger frame at a STA.

The second frame 922 may also be in a format of the EHT Basic Trigger frame 1010. For example, the STA 906 may receive the second frame 922 in a format of the EHT Basic Trigger frame 1010. The STA 906 may obtain common parameters from the Common Info field of the EHT Basic Trigger frame 1010 and determine whether the PAID(s) stored by the STA 906 at 914 matches any PAID subfield value in the Trigger Dependent Common Info field. If so, the STA 906 may, at 924, prepare the EHT TB PPDU 918 based on the user specific resource allocation information stored by the STA 906 at 914, and transmit the prepared EHT TB PPDU 918 to the AP 902.

Likewise, the STA 904 may receive the second frame 922 in a format of the EHT basic Trigger frame 1010. The STA 904 may obtain common parameters from the Common Info field of the EHT Basic Trigger frame 1010 and determine whether the PAID(s) stored by the STA 904 matches any PAID subfield value in the Trigger Dependent Common Info field. If so, the STA 904 may prepare the EHT TB PPDU 916 based on the user specific resource allocation information stored by the STA 904 and transmit the prepared EHT TB PPDU 916 to the AP 902.

The second frame 922 may also be in a form of a PA Trigger frame 520 according to the third embodiment as shown in FIG. 5C. The PA Trigger frame 520 is only used to solicit a transmission of one or more PA, such as the EHT TB PPDU 916 and 918. Only some common parameters are present in the Common Info field of a PA Trigger frame 520, and other common parameters may be unchanged before the one or more PA expires and can be obtained from the first frame 912. Further, no user specific resource allocation information required for the one or more PA is included in a PA Trigger frame, because it may be obtained from the first frame 912. Advantageously, this reduces channel overhead for a transmission of uplink user-specific PA.

The second frame 922 may also be in a form of a data or management frame 530 carrying a PA Control subfield according to the third embodiment as shown in FIG. 5D. The data or management frame 530 solicits a transmission of an uplink user-specific PA using its PAID indicated in the Control Information field 532. Similar to the PA Trigger frame 520, no user specific resource allocation information required for the uplink user-specific PA is included in the data or management frame 530, because it may be obtained from the first frame 912. Advantageously, this reduces channel overhead for a transmission of the uplink user-specific PA.

It is possible to further reduce channel overhead for the third embodiment as described above. In a first frame, two or more user-specific PAs of an uplink MU-MIMO allocation may include a same PAID, which can be indicated in a second frame to solicit a transmission from the two or more STAs engaged in the uplink MU-MIMO allocation. In an example, a first frame may be used to assign a same PAID, a same RU and respective spatial streams to the two or more user-specific PAs of the uplink MU-MIMO allocation. In another example, more than one first frames may be used to assign a same PAID, a same RU and respective spatial streams to the two or more user-specific allocations of the uplink MU-MIMO allocation. Alternatively, in a first frame, a group of user-specific PAs may be assigned a same PAID, which can be indicated in a second frame to solicit a transmission of each user-specific PA in the group of user-specific PAs.

In the third embodiment as described above, an uplink user-specific PA may exist for a time period after a first frame announcing the uplink user-specific PA is transmitted. In an example, an uplink user-specific PA may exist till the end of a current TXOP. In another example, an uplink user-specific PA may exist for a determined number of service periods or Beacon intervals. In yet another example, the Common Info field in the first frame may comprise a signalling to indicate a time period for which the uplink user-specific PAs announced by the first frame exist after the first frame is transmitted. For such examples, the uplink user-specific PAs announced by the first frame have the same expiry time. Alternatively, the User Info field corresponding to an uplink user-specific PA in a first frame may comprise a signalling to indicate a time period for which the uplink user-specific PA exists after the first frame is transmitted. In the alternate examples, the uplink user-specific PAs announced by the first frame may have different expiry time.

Figure 11:
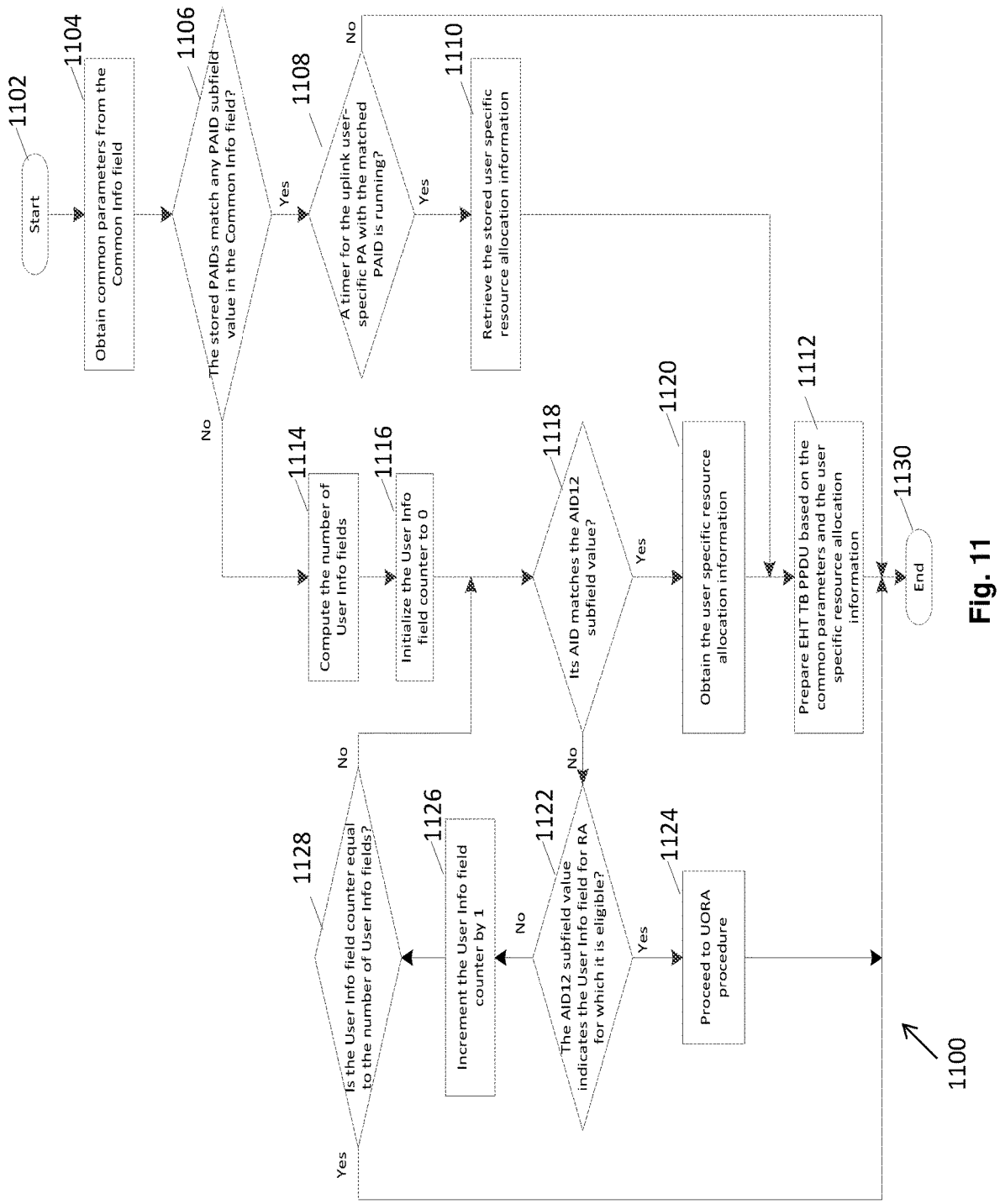
FIG. 11 shows a flow chart illustrating processing of a received EHT Basic Trigger frame at an STA according to the third embodiment.

FIG. 11 shows a flow chart 1100 illustrating processing of a received EHT Basic Trigger frame 1010 at an STA according to the third embodiment. Processing may start at 1102. At 1104, common parameters from the Common Info field of the EHT Basic Trigger frame 1010 are obtained. At 1106, it is determined whether the stored PAID(s) matches any PAID subfield value in the Common Info field. If the stored PAID(s) matches a PAID subfield value in the Common Info field, processing may proceed with step 1108. If the stored PAID(s) does not match any PAID subfield value in the Common Info field, processing may proceed to step 1114. At 1108, it is determined if a timer for the uplink user-specific PA with the matched PAID is running. If a timer for the uplink user-specific PA is running, processing may proceed to step 1110. Otherwise, processing may end at step 1130. At 1110, the user specific resource allocation information stored by the STA is retrieved. At 1114, the number of User Info fields present in the EHT Basic Trigger frame 1010 are computed. At 1116, the User Info field counter is initialised to zero. At 1118, it is determined whether the AID of the STA matches the AID12 subfield value of a User Info field in the EHT Basic Trigger frame 1010. If the AID of the STA matches the AID12 subfield value, processing may proceed to step 1120. If the AID of the STA does not match the AID12 subfield value, processing may proceed to step 1122. At 1120, the user specific resource allocation information is obtained from the User Info field for preparing the EHT TB PPDU. At 1122, it is determined whether the AID12 subfield value of the User Info field indicates the User Info field for RA for which it is eligible. If this is so, processing may proceed to step 1124. Otherwise, processing may proceed to 1126. At 1124, UORA procedure is executed. At 1126, the User Info field counter is incremented by 1. At 1128, it is determined whether the User Info field counter is equal to the number of User Info fields in the EHT Basic Trigger frame 1010. If the User Info field counter is not equal to the number of User Info fields in the EHT Basic Trigger frame 1010, processing may proceed back to step 1118 again. If the User Info field counter is equal to the number of User Info fields in the EHT Basic Trigger frame 1010, processing may end at 1130. It can be appreciated that steps 1118, 1122, 1126 and 1128 form a loop for the STA to cycle through and read all the user info fields that are present in the EHT Basic Trigger frame 1010. At 1112, an EHT TB PPDU is prepared based on the common parameters (e.g. common parameters from the Common Info field of the EHT Basic Trigger frame 1010) and the user specific resource allocation information (e.g. the user specific resource allocation information stored by the STA if processing is from step 1110, or the user specific resource allocation information 1014 obtained from the User Info field if processing is from step 1120). At 1130, processing ends.

Processing of a received PA Trigger frame 520 at a STA according to the third embodiment is also shown in flow chart 640 in FIG. 6B.

Processing of a received data or management frame 530 carrying a PA Control subfield at a STA which is an intended recipient of the frame 530 according to the third embodiment is also shown in flow chart 660 in FIG. 6C.

In the third embodiment as described above, AP may send a first frame to update user-specific resource allocation information for an uplink user-specific PA before it expires. If the user-specific resource allocation information for an uplink user-specific PA are updated before it expires and the intended STA fails to receive the update information, there will be a mismatch on the information of the uplink user-specific PA between the AP and the intended STA. The AP may be able to identify such a mismatch if no EHT TB PPDU is received as a response to a transmitted second frame. When a STA receives a first frame with information on an uplink user-specific PA for which it is one of the intended recipients, it shall start or reset a timer for the uplink user-specific PA and store or update information on the uplink user-specific PA. Similarly, the STA may also store or update the common parameters in the Common Info field with this process. Advantageously, this enables the AP to perform error recovery from information mismatch.

Figure 12:
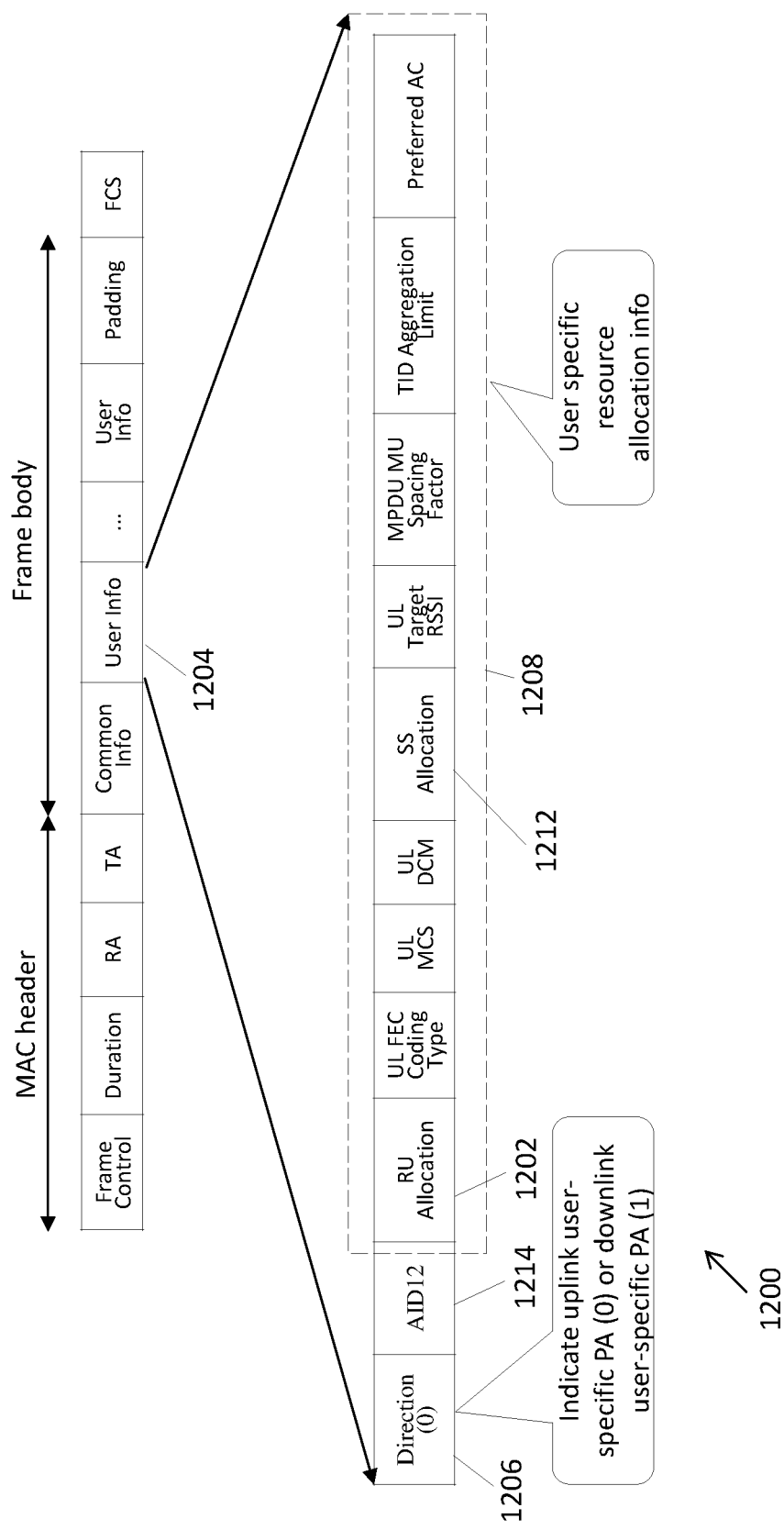
FIG. 12 shows a format of a PA Announcement frame used for uplink or downlink multiuser communications between an AP and multiple STAs in an EHT WLAN according to a fourth embodiment.

FIG. 12 shows a format of a PA Announcement frame 1200 used for uplink or downlink multiuser communications between an AP and multiple STAs in an EHT WLAN according to a fourth embodiment. The PA Announcement frame 1200 includes complete information on one or more PAs and may be used as the first frame 912 in FIGS. 9A and 9B. The PA Announcement frame 1200 may use RU allocation information of an uplink user-specific PA and user identification information of an STA addressed by the uplink user-specific PA to identify the uplink user-specific PA. Alternatively, the PA Announcement frame 1200 may use RU allocation information and SS allocation information (e.g. starting spatial stream) of an uplink user-specific PA to identify the uplink user-specific PA. The PA Announcement frame 1200 may include a Frame Control field, a Duration field, a RA field, a TA field, a Common Info field, one or more User Info fields such as User Info field 1204, a Padding field and a FCS field. The Frame Control field, Duration field, RA field and TA field may be grouped in a MAC header of the PA Announcement frame 1200. The Common Info field, one or more User Info fields 1204 and Padding field may be grouped in a frame body of the PA Announcement frame 1200.

FIG. 12 also depicts the User Info field 1204 in more detail. The User Info field 1204 includes a Direction field 1026, an AID12 field, a RU Allocation field 1202, an UL FEC Coding Type field, an UL MCS field, an UL DCM field, an SS Allocation field, an UL Target RSSI field, a MPDU MU Spacing Factor subfield, a TID Aggregation Limit subfield and a Preferred AC subfield. The RU Allocation field, UL FEC Coding Type field, UL MCS field, UL DCM field, SS Allocation field, UL Target RSSI field, MPDU MU Spacing Factor subfield, TID Aggregation Limit subfield and Preferred AC subfield make up a user specific resource allocation information 1208 of the User Info field 1204.

As mentioned above, the User Info field 1204 may include a Direction field 1206. The Direction field 1206 indicates whether the User Info field 1204 corresponds to an uplink user-specific PA or downlink user-specific PA. For example, a Direction field value of 1 indicates a downlink user-specific PA and a Direction field value of 0 indicates an uplink user-specific PA. In the present embodiment, the Direction field 1206 is set to 0 to indicate that the User Info field corresponds to an uplink user-specific PA. The User Info field 1204 may also include a RU Allocation field 1202 indicating RU allocation information, an SS Allocation field 1212 indicating SS allocation information and an AID12 field 1214 indicating user identification information. Unlike the PA Announcement frame 1000 which uses the PAID indicated in the PAID field 1002 to identify an uplink user-specific PA corresponding to the User Info field 1004, the PA Announcement frame 1200 may use RU allocation information indicated in the RU Allocation field 1202 and user identification information indicated in the AID12 field 1214 to identify the uplink user-specific PA corresponding to the User Info field 1204. Alternatively, the PA Announcement frame 1200 may use RU allocation information indicated in the RU Allocation field 1202 and SS allocation information indicated in the SS Allocation field 1212 to identify the uplink user-specific PA corresponding to the User Info field 1204.

The first frame 912 may be in a format of the PA Announcement frame 1200. For example, at 914, the STA 906 may receive the first frame 912 in the form of the PA Announcement frame 1200. The STA 906 may store user specific resource allocation information of an uplink user-specific PA intended for STA 906. Notice that the identification information of an uplink user-specific PA such as RU allocation information and SS allocation information is a part of the user specific resource allocation information of the uplink user-specific PA. The user specific resource allocation information may be retrieved from a User Info field whose AID12 subfield value matches the AID of the STA 906.

Likewise, the STA 904 may also receive the first frame 912 in the form of the PA Announcement frame 1200. The STA 904 may store user specific resource allocation information of an uplink user-specific PA intended for STA 904. Notice that the identification information of an uplink user-specific PA such as RU allocation information and SS allocation information is a part of the user specific resource allocation information of the uplink user-specific PA. The user specific resource allocation information may be retrieved from a User Info field whose AID12 subfield value matches the AID of the STA 904.

The second frame 922 may be in a format of an EHT Basic Trigger frame used for uplink multiuser communications between an AP and multiple STAs in an EHT WLAN according to the fourth embodiment. The EHT Basic Trigger frame according to the fourth embodiment is a variant of the existing Trigger frame and may be used as the second frame 922 in FIGS. 9A and 9B. The EHT Basic Trigger frame according to the fourth embodiment may use RU allocation information and user identification information to identify an uplink user-specific PA. Alternatively, the EHT Basic Trigger frame according to the fourth embodiment may use RU allocation information and SS allocation information to identify an uplink user-specific PA. The EHT Basic Trigger frame according to the fourth embodiment may include a Frame Control field, a Duration field, a RA field, a TA field, a Common Info field, one or more User Info fields, a Padding field and a FCS field. The Frame Control field, Duration field, RA field and TA field may be grouped in a MAC header of the EHT Basic Trigger frame. The Common Info field, one or more User Info fields and Padding field may be grouped in a frame body of the EHT Basic Trigger frame according to the fourth embodiment. The Common Info field (including all subfields of the Common Info field) of the EHT Basic Trigger frame according to the fourth embodiment is the same as the Common Info field 702 (including all subfields of the Common Info field 702) of the EHT Basic Trigger frame 700 as shown in FIG. 7A. The User Info field (including all subfields of the User Info field) of the EHT Basic Trigger frame according to the fourth embodiment is the same as the User Info field 1016 (including all subfields of the User Info field 1016) of the EHT Basic Trigger frame 1010 as shown in FIG. 10B.

For example, the STA 906 may receive the second frame 922 in a format of the EHT Basic Trigger frame according to the fourth embodiment. The STA 906 may obtain common parameters from the Common Info field of the EHT Basic Trigger frame and determine whether the RU allocation information stored by the STA 906 at 914 and the user identification information match any RU Allocation/AID12 subfield value in the Trigger Dependent Common Info field of the Common Info field or whether the RU allocation information and SS allocation information stored by the STA 906 at 914 match any RU Allocation/SS Allocation subfield value in the Trigger Dependent Common Info field of the Common Info field. If so, the STA 906 may, at 924, prepare the EHT TB PPDU 918 based on the user specific resource allocation information stored by the STA 906 at 914 and transmit the prepared EHT TB PPDU 918 to the AP 902.

Likewise, the STA 904 may receive the second frame 922 in a format of the EHT Basic Trigger frame according to the fourth embodiment. The STA 904 may obtain common parameters from the Common Info field of the EHT Basic Trigger frame and determine whether the RU allocation information stored by the STA 904 at 914 and the user identification information match any RU Allocation/AID12 subfield value in the Trigger Dependent Common Info field of the Common Info field or whether the RU allocation information and SS allocation information stored by the STA 904 at 914 match any RU Allocation/SS Allocation subfield value in the Trigger Dependent Common Info field of the Common Info field. If so, the STA 904 may prepare the EHT TB PPDU 916 based on the user specific resource allocation information stored by the STA 904 at 914 and transmit the prepared EHT TB PPDU 916 to the AP 902.

In an EHT Basic Trigger frame, no more than one User Info field that are not for random access shall be addressed to a single STA. User Info field(s) that are for random access shall be located after User Info field(s) that are not for random access. A STA having an uplink user-specific PA indicated in the Common Info field shall not be addressed by a User Info field that is not for random access. Further, no more than one uplink user-specific PA assigned to a single STA shall be indicated in the Common Info field. Advantageously, this reduces the complexity in processing of a received EHT Basic Trigger frame at a STA.

The second frame 922 may also be in a form of the PA Trigger frame 720 according to the second embodiment as shown in FIG. 7C.

The PA Trigger frame 720 is only used to solicit a transmission of one or more uplink user-specific PA, such as the EHT TB PPDU 916 and 918. Only some common parameters are present in the Common Info field of a PA Trigger frame 720, and other common parameters may be unchanged before the one or more PA expires and can be obtained from the first frame 912. Further, no user specific resource allocation information required for the one or more PA is included in a PA Trigger frame, except the identification information for the one or more PA, because it may be obtained from the first frame 912. Advantageously, this reduces channel overhead for a transmission of the one or more uplink user-specific PA.

The second frame 922 may also be in a form of the data or management frame 730 carrying a PA Control subfield according to the fourth embodiment as shown in FIG. 7D. The data or management frame 730 solicits a transmission of an uplink user-specific PA using its RU allocation information contained in the Control Information field 732 and the user identification information (e.g. MAC address) contained in one of four Address fields. No other user specific resource allocation information required for the uplink user-specific PA is included in the data or management frame 730, because it may be obtained from the first frame 912. Advantageously, this reduces channel overhead for a transmission of the uplink user-specific PA.

In the fourth embodiment as described above, an uplink user-specific PA may exist for a time period after a first frame announcing the uplink user-specific PA is transmitted. In an example, an uplink user-specific PA may exist till the end of a current TXOP. In another example, an uplink user-specific PA may exist for a determined number of service periods or Beacon intervals. In yet another example, the Common Info field in the first frame may comprise a signalling to indicate a time period for which the uplink user-specific PAs announced by the first frame exist after the first frame is transmitted. For such examples, the uplink user-specific PAs announced by the first frame have the same expiry time. Alternatively, the User Info field corresponding to an uplink user-specific PA in a first frame may comprise a signalling to indicate a time period for which the uplink user-specific PA exists after the first frame is transmitted. In the alternate examples, the uplink user-specific PAs announced by the first frame may have different expiry times.

Figure 13:
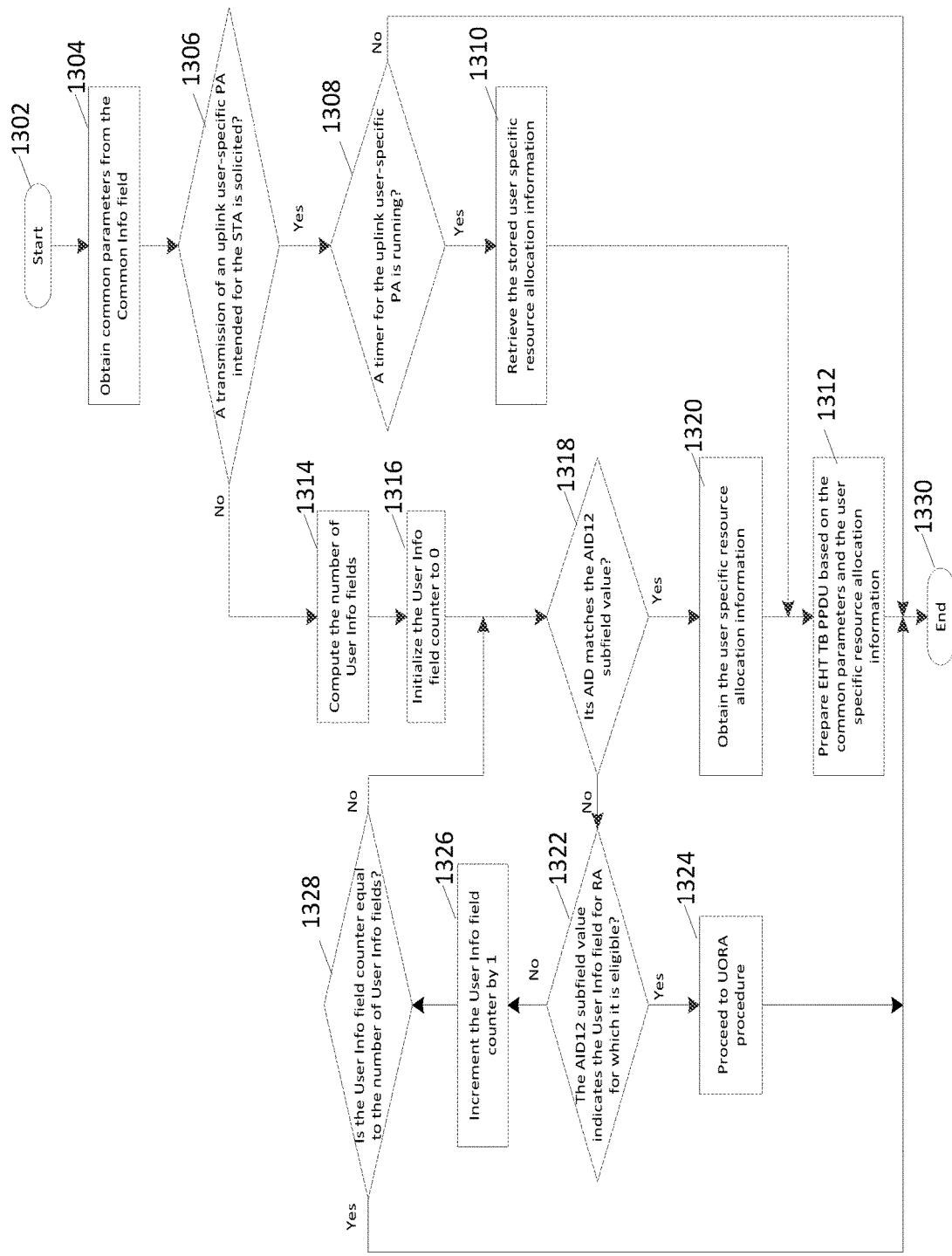
FIG. 13 shows a flow chart illustrating processing of a received EHT Basic Trigger frame at an STA according to the fourth embodiment.

FIG. 13 shows a flow chart 1300 illustrating processing of a received EHT Basic Trigger frame according to the fourth embodiment at a STA. Processing may start at 1302. At 1304, common parameters from the Common Info field of the EHT Basic Trigger frame are obtained. At 1306, it is determined whether a transmission of an uplink user-specific PA intended for the STA is solicited. This can be done by checking whether the stored RU allocation information and the user identification information match any RU Allocation/AID12 subfield value in the Common Info field or whether the stored RU allocation information and SS allocation information match any RU Allocation/SS Allocation subfield value in the Common Info field. If a transmission of an uplink user-specific PA intended for the STA is solicited, processing may proceed with step 1308. Otherwise processing may proceed to step 1314. At 1308, it is determined if a timer for the uplink user-specific PA is running. If a timer for the uplink user-specific PA is running, processing may proceed to step 1310. Otherwise, processing may end at step 1330. At 1310, the user specific resource allocation information stored by the STA is retrieved. At 1314, the number of User Info fields present in the received EHT Basic Trigger frame are computed. At 1316, the User Info field counter is initialised to zero. At 1318, it is determined whether the AID of the STA matches the AID12 subfield value of a User Info field in the received EHT Basic Trigger frame. If the AID of the STA matches the AID12 subfield value, processing may proceed to step 1320. If the AID of the STA does not match the AID12 subfield value, processing may proceed to step 1322. At 1320, the user specific resource allocation information is obtained from the User Info field for preparing the EHT TB PPDU. At 1322, it is determined whether the AID12 subfield value of the User Info field indicates the User Info field for RA for which it is eligible. If this is so, processing may proceed to step 1324. Otherwise, processing may proceed to 1326. At 1324, UORA procedure is executed. At 1326, the User Info field counter is incremented by 1. At 1328, it is determined whether the User Info field counter is equal to the number of User Info fields in the received EHT Basic Trigger frame. If the User Info field counter is not equal to the number of User Info fields in the received EHT Basic Trigger frame, processing may proceed back to step 1318 again. If the User Info field counter is equal to the number of User Info fields in the received EHT Basic Trigger frame, processing may end at 1330. It can be appreciated that steps 1318, 1322, 1326 and 1328 form a loop for the STA to cycle through and read all the User Info fields that are present in the received EHT Basic Trigger frame. At 1312, an EHT TB PPDU is prepared based on the common parameters (e.g. common parameters from the Common Info field of the received EHT Basic Trigger frame) and the user specific resource allocation information (e.g. the user specific resource allocation information stored by the STA if processing is from step 1310, or the user specific resource allocation information obtained from the User Info field if processing is from step 1320). At 1330, processing ends.

Processing of a received PA Trigger frame 720 at a STA according to the fourth embodiment is also shown in flow chart 840 in FIG. 8B.

Processing of a received data or management frame 730 carrying a PA Control subfield at a STA which is an intended recipient of the data or management frame 730 according to the fourth embodiment is also shown in flow chart 860 in FIG. 8C.

In the fourth embodiment as described above, AP may send a first frame to update user-specific resource allocation information excluding identification information (e.g. RU allocation information and SS allocation information) for an uplink user-specific PA before it expires. If the user-specific resource allocation information for an uplink user-specific PA are updated before it expires and the intended STA fails to receive the update information, there will be a mismatch on the information of the uplink user-specific PA between the AP and the intended STA. The AP may be able to identify such a mismatch if no EHT TB PPDU is received as a response to a transmitted second frame. When a STA receives a first frame with complete information for an uplink user-specific PA for which it is one of the intended recipients, it shall start or reset a timer for the uplink user-specific PA and store or update information on the uplink user-specific PA. Similarly, the STA may also store or update the common parameters in the Common Info field with this process. Advantageously, this enables the AP to perform error recovery from information mismatch.

According to the third or fourth embodiment, the AP may transmit a PA Announcement frame to announce downlink user-specific PA information for one or more STAs. The user-specific allocation information for a downlink user-specific PA is not included in the EHT-SIG-B field of an EHT MU PPDU; but the RU information for a downlink user-specific PA is included in the EHT-SIG-B field of an EHT MU PPDU, which can be used to aid an intended STA in identifying the presence of the downlink user-specific PA in the EHT MU PPDU. In other words, either an initial or recurring transmission of the downlink user-specific PA is accompanied by a partial control signaling (i.e. the RU information for the PA). Advantageously, EHT-SIG-B overhead may be reduced.

Figure 14A:
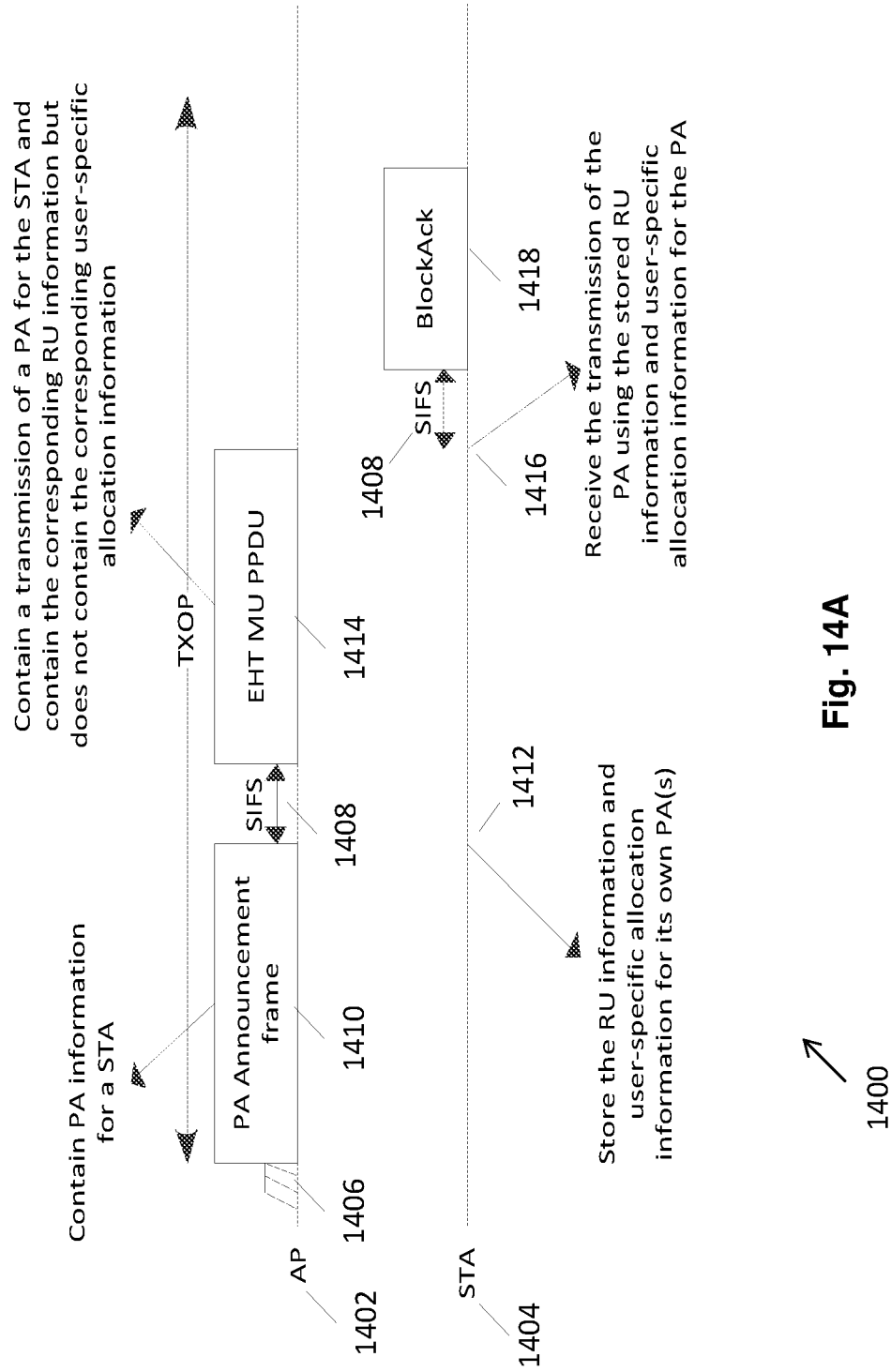
FIG. 14A and FIG. 14B show a flow diagram illustrating a communication between an AP and an STA with downlink user-specific PA according to the third or fourth embodiment.
Figure 14B:
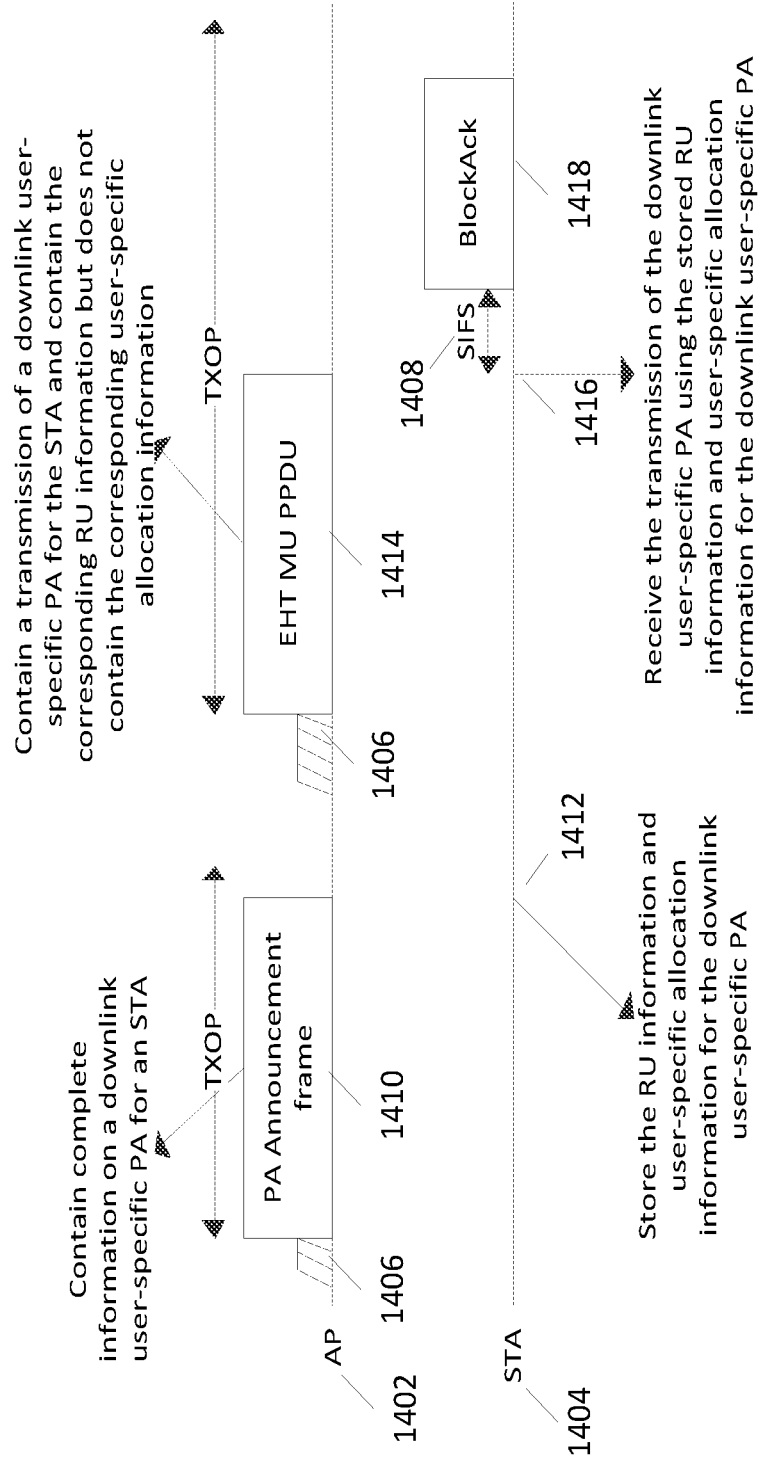

FIG. 14A and FIG. 14B show a flow diagram 1400 illustrating a communication between an AP 1402 and a STA 1404 with downlink user-specific PA according to the third or fourth embodiment. Contention based channel access procedures are illustrated by blocks 1406, and SIFS 1408 are illustrated. The AP 1402 may transmit a PA Announcement frame 1410, which may include downlink user-specific PA information for one or more STA. At 1412, the STA 1402 may store or update the RU information and user-specific allocation information for its own downlink user-specific PA(s). The AP 1402 may then transmit an EHT MU PPDU 1414, which may include a transmission of a downlink user-specific PA for the STA and may include the corresponding RU information but does not include the corresponding user-specific allocation information. At 1416, the STA 1404 may receive the transmission of the downlink user-specific PA using the stored RU information and user-specific allocation information for the downlink user-specific PA. The STA 1404 may then transmit a BlockAck frame 1418. The PA Announcement frame and the EHT MU PPDU may be transmitted in different TXOPs.

Figure 15A:
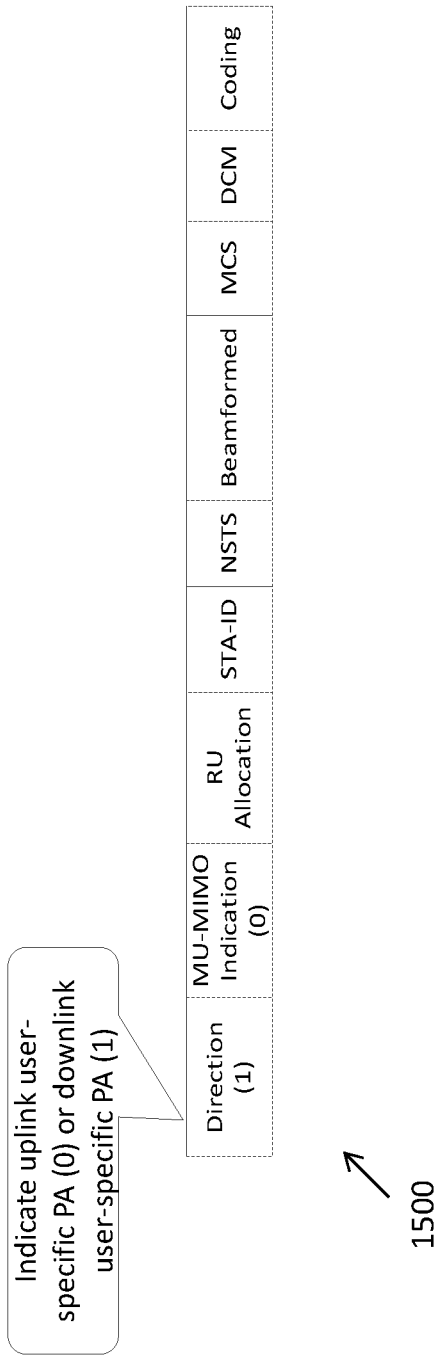
FIG. 15A depicts a structure of the User Info field for a downlink user-specific PA of a non-MU-MIMO allocation according to the third or fourth embodiment.
Figure 15B:
FIG. 15B depicts a structure of the User Info field for a downlink user-specific PA of an MU-MIMO allocation according to the third or fourth embodiment.

The PA Announcement frame 1410 may be in a format of the PA Announcement frame 1200 as shown in FIG. 12. FIG. 15A depicts a structure of the User Info field for a user-specific PA of a downlink non-MU-MIMO allocation according to the third or fourth embodiment. FIG. 15B depicts a structure of the User Info field for a user-specific PA of a downlink MU-MIMO allocation according to the third or fourth embodiment. As can be seen in both figures, the Direction field is set to 1 to indicate downlink user-specific PA.

According to the third or fourth embodiment, a downlink user-specific PA may exist for a time period after a PA Announcement frame announcing the downlink user-specific PA is transmitted. In an example, a downlink user-specific PA may exist till the end of a current TXOP. In another example, a downlink user-specific PA may exist for a determined number of service periods or Beacon intervals. In yet another example, the Common Info field in the PA Announcement frame may comprise a signalling to indicate a time period for which the downlink user-specific PAs announced by the PA Announcement frame exist after the PA Announcement frame is transmitted. For such examples, the downlink user-specific PAs announced by the PA Announcement frame have the same expiry time. Alternatively, the User Info field corresponding to a downlink user-specific PA in a PA Announcement frame may comprise a signalling to indicate a time period for which the downlink user-specific PA exists after the PA Announcement frame is transmitted. In the alternate examples, the downlink user-specific PAs announced by the PA Announcement frame may have different expiry time.

When a STA receives a PA Announcement frame announcing one or more downlink user-specific PA for which the STA is an intended recipient (it will be understood that EHT MU PPDUs are used for downlink multiuser transmission, and each allocation in an EHT MU PPDU has one or more intended STAs), the STA may start or reset a timer for each of the one or more downlink user-specific PA and store or update the RU information and user-specific allocation information for the one or more downlink user-specific PA.

If the RU information and/or the user-specific allocation information for a downlink user-specific PA is not in place, a STA may not be able to receive a transmission of the downlink user-specific PA properly. As such, for error recovery purpose, according to an embodiment, advantageously, an example rule may be that at least one MPDU (MAC protocol data unit) which requires an acknowledgement may be included in a transmission of a downlink user-specific PA immediately following the most recently transmitted PA Announcement frame announcing the downlink user-specific PA. If the AP does not receive a positive acknowledgement from an intended STA for the transmission of the downlink user-specific PA, it knows the RU information and/or the user-specific allocation information for the downlink user-specific PA may not be in place at the intended STA and then the AP may not schedule another transmission of the downlink user-specific PA and may re-transmit a PA Announcement frame to announce the downlink user-specific PA.

According to the third to fourth embodiment, the EHT-SIG-B field of the EHT MU PPDU 1414 is separately encoded on each L×20 MHz subchannel, where L=1 or 2. In instances where the CBW is more than 20 MHz, compared with the EHT-SIG-B field with L=2, the EHT-SIG-B field with L=1 may have better EHT-SIG-B decoding performance. This is because channel estimation used for decoding the EHT-SIG-B field is based on the L-LTF, which is transmitted with 20 MHz bandwidth. Channel estimation with interpolation is necessary for decoding the EHT-SIG-B field with L=2, which may degrade performance of decoding the EHT-SIG-B field with L=2. On the other hand, compared with the EHT-SIG-B field with L=1, the EHT-SIG-B field with L=2 may have less EHT-SIG-B overhead, especially for larger CBW. In addition, if the intended STAs of the EHT MU PPDU 1414 include at least one 20 MHz operating STA, the EHT-SIG-B field with L=2 shall not be used, since the EHT-SIG-B field with L=2 cannot be decoded by 20 MHz operating STAs. As a result, it is advantageous that the AP may determine the value of L at its discretion and a signalling may be included in the EHT-SIG-A field of the EHT MU PPDU 1414 to indicate if L takes on the value of 1 or 2.

FIG. 16A shows a table of how the number of EHT-SIG-B content channels depends on the CBW and the value of L according to various embodiments. As shown in FIG. 16A, in the event that the CBW is 20 MHz, L can only be 1 because the EHT-SIG-B field is encoded on a per-20 MHz basis and there will be only one EHT-SIG-B content channel. In the embodiment where the CBW is 40 MHz, L may be assigned by the AP the value of 1 or 2. If L is set to 1, there will be two EHT-SIG-B content channels. If L is set to 2, there will be only one EHT-SIG-B content channel. In the embodiment where the CBW is 80 MHz, 80+80 MHz, 160 MHz, 160+160 MHz or 320 MHz, there will be two EHT-SIG-B content channels regardless of the value of L. More details will be provided below.

FIG. 16B shows a diagram of mapping of the one or two EHT-SIG-B content channels in a 40 MHz EHT MU PPDU. The number of EHT-SIG-B content channels depends on the CBW and the value of L as shown in FIG. 16A. A 40 MHz channel comprises two 20 MHz subchannels. When L=1, there will be two EHT-SIG-B content channels (namely, EHT-SIG-B content channel 1 and EHT-SIG-B content channel 2) which are transmitted in the $1^{st}$ and $2^{nd}$ 20 MHz subchannels, respectively. When L=2, there will be only one EHT-SIG-B content channel.

FIG. 16C shows a diagram of mapping of the two EHT-SIG-B content channels (namely EHT-SIG-B content channel 1 and EHT-SIG-B content channel 2) in an 80 MHz EHT MU PPDU. When L=1, in an 80 MHz channel comprising four 20 MHz subchannels, EHT-SIG-B content channel 1 is duplicated and transmitted in the $1^{st}$ and $3^{rd}$ 20 MHz subchannels while EHT-SIG-B content channel 2 is duplicated and transmitted in the $2^{nd}$ and $4^{th}$ 20 MHz subchannels. When L=2, in an 80 MHz channel comprising two 40 MHz subchannels, EHT-SIG-B content channel 1 is transmitted in the $1^{st}$ 40 MHz subchannel while EHT-SIG-B content channel 2 is transmitted in the $2^{nd}$ 40 MHz subchannel.

FIG. 16D shows a diagram of mapping of the two EHT-SIG-B content channels in an 80+80 MHz or 160 MHz EHT MU PPDU. When L=1, in an 80+80 MHz or 160 MHz channel comprising eight 20 MHz subchannels, EHT-SIG-B content channel 1 is duplicated and transmitted in the $1^{st}$, $3^{rd}$, $5^{th}$ and $7^{th}$ 20 MHz subchannels while EHT-SIG-B content channel 2 is duplicated and transmitted in the $2^{nd}$ $4^{th}$, $6^{th}$ and $8^{th}$ 20 MHz subchannels. When L=2, in an 80+80 MHz or 160 MHz channel comprising four 40 MHz subchannels, EHT-SIG-B content channel 1 is duplicated and transmitted in the $1^{st}$ and $3^{rd}$ 40 MHz subchannels while EHT-SIG-B content channel 2 is duplicated and transmitted in the $2^{nd}$ and $4^{th}$ 40 MHz subchannels.

FIG. 16E shows a diagram of mapping of the two EHT-SIG-B content channels in a 160+160 MHz or 320 MHz EHT MU PPDU. When L=1, in a 160+160 MHz or 320 MHz channel comprising sixteen 20 MHz subchannels, EHT-SIG-B content channel 1 is duplicated and transmitted in the $1^{st}$, $3^{rd}$, $5^{th}$, $7^{th}$, $9^{th}$, $11^{th}$, $13^{th}$ and $15^{th}$ 20 MHz subchannels while EHT-SIG-B content channel 2 is duplicated and transmitted in the $2^{nd}$, $4^{th}$, $6^{th}$, $8^{th}$, $10^{th}$, $12^{th}$, $14^{th}$ and $16^{th}$ 20 MHz subchannels. When L=2, in a 160+160 MHz or 320 MHz channel comprising eight 40 MHz subchannels, EHT-SIG-B content channel 1 is duplicated and transmitted in the $1^{st}$, $3^{rd}$, $5^{th}$ and $7^{th}$ 40 MHz subchannels while EHT-SIG-B content channel 2 is duplicated and transmitted in the $2^{nd}$, $4^{th}$, $6^{th}$ and $8^{th}$ 40 MHz subchannels.

Figure 17A:
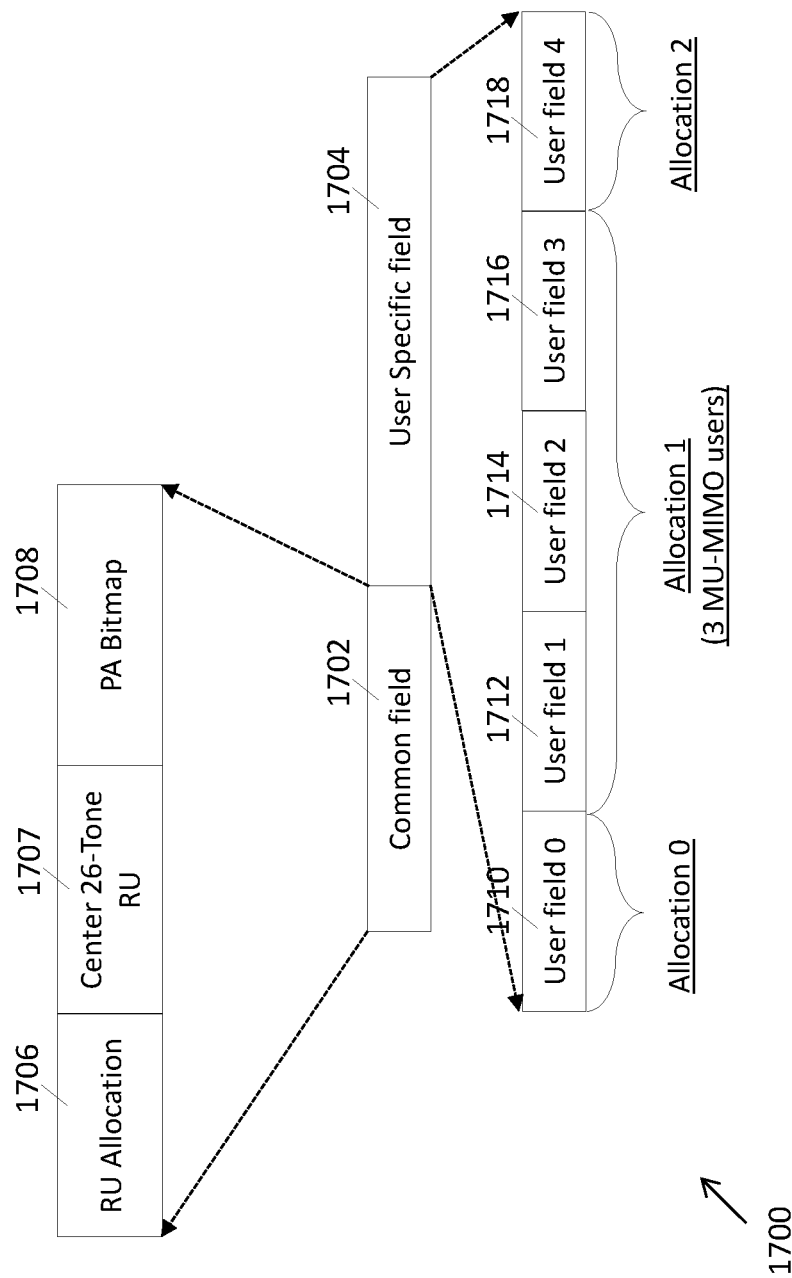
FIG. 17A depicts an EHT-SIG-B field according to the third or fourth embodiment.
Figure 17B:
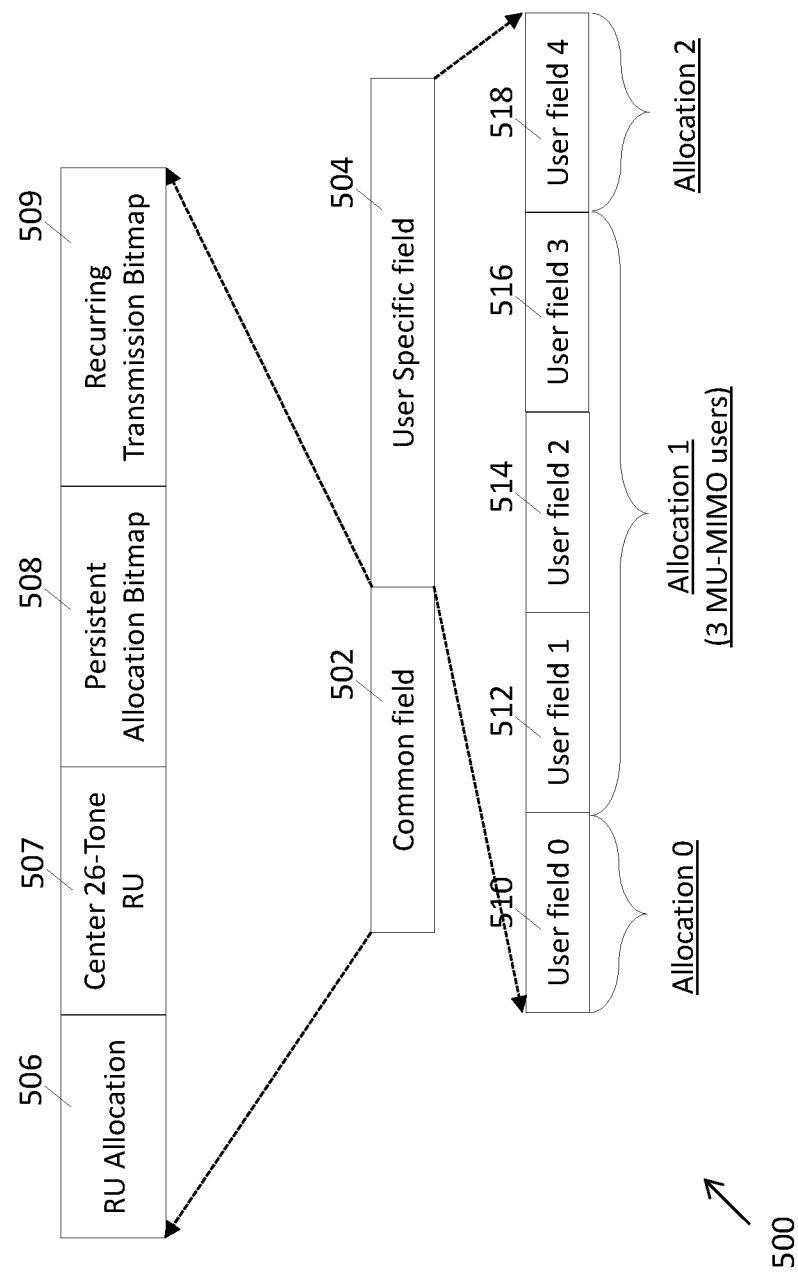
FIG. 17B depicts an EHT-SIG-B field according to an embodiment shown in FIG. 3B.

FIG. 17 depicts an EHT-SIG-B field 1700 according to the third or fourth embodiment. The EHT-SIG-B field 1700 includes (or consists of) a Common field 1702, if present, followed by a User Specific field 1704 which together are referred to as the EHT-SIG-B content channel.

The Common field 1702 contains a RU Allocation subfield 1706, a Center 26-Tone RU subfield 1707, and a PA Bitmap subfield 1708. The RU Allocation subfield 1706 indicates the RU information for each of allocations including downlink user-specific PAs. The RU information includes a RU position in frequency domain, an indication of the RU allocated for a non-MU-MIMO or MU-MIMO allocation, and the number of users in the MU-MIMO allocation.

The RU Allocation subfield 1706 comprises N field(s), and the value of N depends on the CBW and the value of L. For various embodiments, N can only be 1 for CBW=20 MHz. For CBW=40 MHz, N=1 when L=1 and N=2 when L=2. N=2 for CBW=80 MHz, and N=4 for CBW=160 MHz or 80+80 MHz, and N=8 for CBW=320 MHz or 160+160 MHz regardless of the value of L. Each of the N fields of the RU Allocation subfield 1706 comprises an 8-bit signalling to indicate RU assignment within a corresponding tone range. For example, when L=1 and CBW=80 MHz, for EHT-SIG-B content channel 1, the corresponding tone range is [−500: −259] and [17: 258], respectively, for the first field and the second field of the RU Allocation subfield 1706. For EHT-SIG-B content channel 2, the corresponding tone range is [−258: 17] and [259: 500], respectively, for the first field and the second field of the RU Allocation subfield 1706.

In another example, when L=2 and CBW=80 MHz, for EHT-SIG-B content channel 1, the corresponding tone range is [−500: −259] and [−258:17], respectively, for the first field and the second field of the RU Allocation subfield 1706. For EHT-SIG-B content channel 2, the corresponding tone range is [17:258] and [259:500], respectively, for the first field and the second field of the RU Allocation subfield 1706. If a single RU in an 80 MHz PPDU overlaps with more than one of the tone ranges [−500: −259], [−258: −17], [17:258] and [259:500], the allocation may be indicated by only one of the N fields of the RU Allocation subfield in a single EHT-SIG-B content channel corresponding to one of the tone ranges with which the RU overlaps for minimizing EHT-SIG-B overhead.

The Center 26-Tone RU subfield 1707 comprises M bit(s), and the value of M depends on CBW. Since the Center 26-Tone RU subfield 1707 is present when the CBW is 80 MHz and above, M=0 when the CBW is 20 MHz or 40 MHz. When the CBW is 80 MHz, 80+80 MHz or 160 MHz, M=1. When the CBW is 80 MHz, the Center 26-Tone RU subfield 1707 in both EHT-SIG-B content channel 1 and EHT-SIG-B content channel 2 indicates whether a user is allocated to the center 26-tone RU. When the CBW is 80+80 or 160 MHz, the Center 26-Tone RU subfield 1707 in EHT-SIG-B content channel 1 indicates whether a user is allocated to the center 26-tone RU of the lower frequency 80 MHz; while the Center 26-Tone RU subfield 1707 in EHT-SIG-B content channel 2 indicates whether a user is allocated to the center 26-tone RU of the higher frequency 80 MHz.

When the CBW is 160+160 MHz or 320 MHz, M=2. The first bit of the Center 26-Tone RU subfield 1707 in EHT-SIG-B content channel 1 indicates whether a user is allocated to the center 26-tone RU of the lower frequency 80 MHz within the lower frequency of 160 MHz; while the first bit of the Center 26-Tone RU subfield 1707 in EHT-SIG-B content channel 2 indicates whether a user is allocated to the center 26-tone RU of the higher frequency 80 MHz within the lower frequency 160 MHz. The second bit of the Center 26-Tone RU subfield 1707 in EHT-SIG-B content channel 1 indicates whether a user is allocated to the center 26-tone RU of the lower frequency 80 MHz within the higher frequency of 160 MHz; while the second bit of the Center 26-Tone RU subfield 1707 in EHT-SIG-B content channel 2 indicates whether a user is allocated to the center 26-tone RU of the higher frequency 80 MHz within the higher frequency 160 MHz.

The PA Bitmap subfield 1708 indicates whether each of the user-specific allocations specified by the RU Allocation subfield 1706 and the Center 26-Tone RU subfield 1707 (if applicable) is persistent. A bit of the PA Bitmap subfield 1708 is set to 1 to indicate the user-specific allocation corresponding to the bit is persistent. A bit of the PA Bitmap subfield 1708 is set to 0 to indicate the user-specific allocation corresponding to the bit is not persistent.

The PA Bitmap subfield 1708 comprises N bitmap(s), which correspond to the N field(s) of the RU Allocation subfield 1706, respectively, in the same EHT-SIG-B content channel. As mentioned above, when CBW=80, 80+80 or 160 MHz, a 1-bit Center 26-Tone RU subfield 1707 is present in the Common field 1702. As shown in FIG. 16A, for CBW=80 MHz, the last bitmap (i.e. the $2^{nd}$ bitmap) in the PA Bitmap subfield 1708 indicates whether the user-specific allocation indicated by the Center 26-Tone RU subfield 1707 is persistent.

The EHT-SIG-A field may include a PA Presence subfield per EHT-SIG-B content channel. The PA Presence subfield for an EHT-SIG-B content channel comprises a N-bit bitmap, wherein the n-th (n=1, 2, . . . , N) bit indicates the presence of the n-th bitmap of the PA Bitmap subfield in the EHT-SIG-B content channel. The n-th bit of the PA Presence subfield in the EHT-SIG-A field is set to 0 to indicate the n-th bitmap of the PA Bitmap subfield 1708 is not present in the EHT-SIG-B content channel; and set to 1 to indicate the n-th bitmap of the PA Bitmap subfield 1708 is present in the EHT-SIG-B content channel. As shown in diagram 1820 of FIG. 18A, for CBW=80 MHz, the first and second bits of the PA Presence subfield of the EHT-SIG-A field are set to 1 to indicate that $1^{st}$ and $2^{nd}$ bitmaps of the PA Bitmap subfield 1708 are present in the EHT-SIG-B content channel. For minimizing Common field overhead, a bitmap of the PA Bitmap subfield 1708 may not be present if all user-specific allocations indicated by a corresponding field of the RU Allocation subfield 1706 and the Center 26-Tone RU subfield 1707 (if applicable) are not persistent.

Figure 18B:
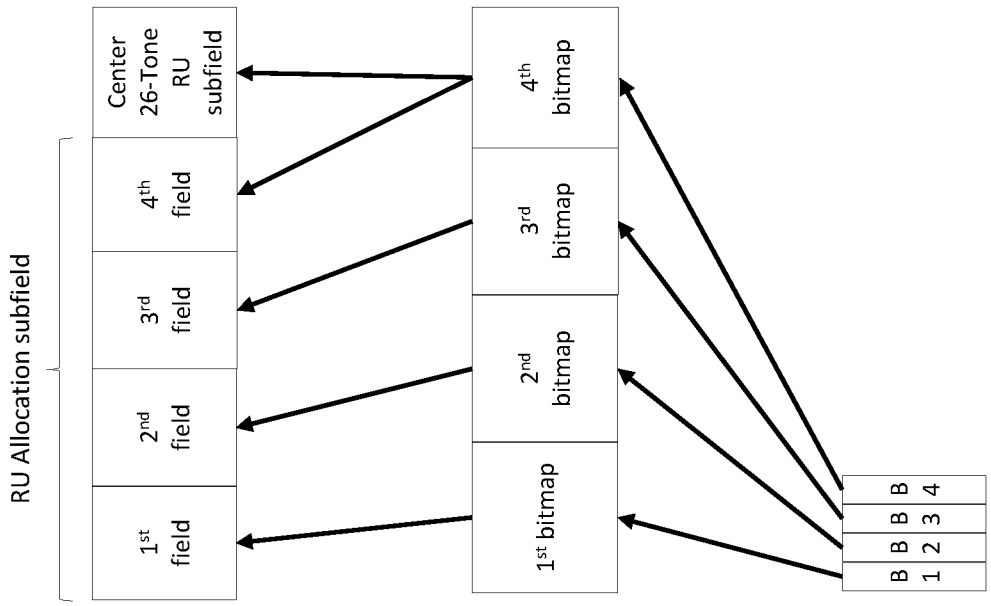
FIGS. 18A and 18B depict the mapping among the PA Present subfield in an EHT SIGNAL A (EHT-SIG-A) field, the RU Allocation subfield, the Center 26-Tone RU subfield and the PA Bitmap subfield in an EHT-SIG-B field.

When CBW=80+80 or 160 MHz, the last bitmap (i.e. the 4th bitmap) of the PA Bitmap subfield 1708 in the EHT-SIG-B content channel also indicates whether the user-specific allocation indicated by the 1-bit Center 26-Tone RU subfield 1707 is persistent as shown in diagram 1840 of FIG. 18B. The $1^{st}$, $2^{nd}$, $3^{rd}$ and $4^{th}$ bits of the PA Presence subfield of the EHT-SIG-A field are set to 1 to indicate that $1^{st}$, $2^{nd}$, $3^{rd}$ and $4^{th}$ bitmaps of the PA Bitmap subfield 1708 are present in the EHT-SIG-B content channel. A bitmap of the PA Bitmap subfield 1708 is not present if all user-specific allocations indicated by a corresponding field of the RU Allocation subfield 1706 and the Center 26-Tone RU subfield 1707 (if applicable) are not persistent.

As mentioned above, when CBW=160+160 or 320 MHz, a 2-bit Center 26-Tone RU subfield 1707 is present in the Common field 1702. In this case, the 4th bitmap of the PA Bitmap subfield 1708 also indicates whether the user-specific allocation indicated by the first bit of the Center 26-Tone RU subfield 1707 is persistent and the last bitmap of the PA Bitmap subfield 1708 also indicates whether the user-specific allocation indicated by the second bit of the Center 26-Tone RU subfield 1707 is persistent. For minimizing Common field overhead, a bitmap of the PA Bitmap subfield 1708 may not be present if all user-specific allocations indicated by a corresponding field of the RU Allocation subfield 1706 and a corresponding bit of the Center 26-Tone RU subfield 1707 (if applicable) are not persistent.

The Common field 1702 may not be present in the case of a full-bandwidth MU-MIMO transmission. In this case, the RU information for the MU-MIMO allocation (e.g. the number of users in the MU-MIMO allocation) may be signalled in the EHT-SIG-A field. Whether or not each of user-specific allocations of the MU-MIMO allocation is persistent may also be signalled in the EHT-SIG-A field.

Figure 19A:
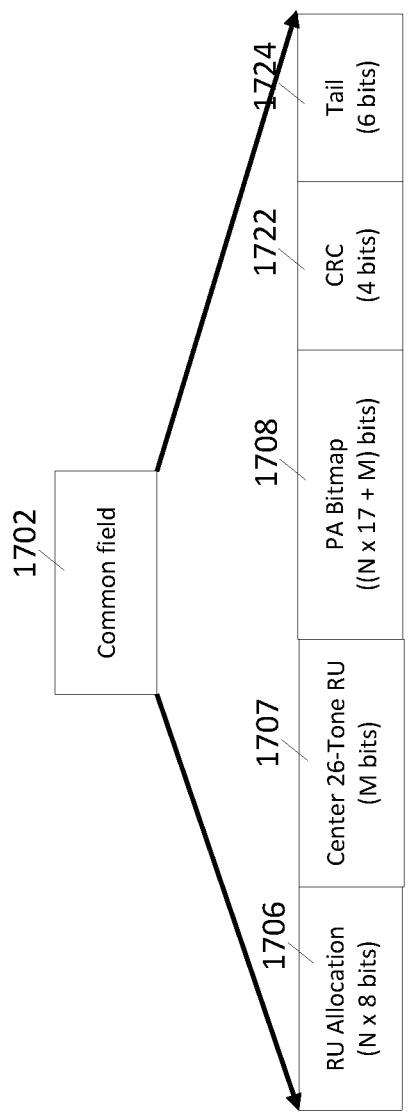
FIG. 19A depicts a first example of encoding structure of the Common field according to the third or fourth embodiment.

FIG. 19A depicts a first example of encoding structure of the Common field 1702 according to the third or fourth embodiment. As mentioned above, the Common field 1702 includes the RU Allocation subfield 1706, the Center 26-Tone RU subfield 1707, and the PA Bitmap subfield 1708. In the first example, all the subfields of the Common field 1702 are jointly encoded. As mentioned in the above, each of the N field(s) of the RU Allocation subfield 1706 is a 8-bit signalling and thus the RU Allocation subfield 1706 has N×17 bits, where N=1, 2, 4 or 8. The Center 26-Tone RU subfield 1707 has M bits, where M=0, 1 or 2. Each of the N field(s) of the RU Allocation subfield 1706 can indicate at most seventeen user-specific allocations. Hence, in the first example, each of the PA Bitmap subfield 1708 has a size of (N×17+M) bits.

The Common field 1702 has a CRC (cyclic redundancy check) subfield 1722 and a Tail subfield 1724 appended for BCC encoding/decoding purpose. The CRC subfield 1722 has a size of 4 bits and the Tail subfield 1724 has a size of 6 bits. That is, the size of the Common field 1702 is the sum of the size of the RU Allocation subfield 1706, the Center 26-Tone RU subfield 1707, the PA Bitmap subfield 1708, the CRC subfield 1722 and the Tail subfield 1724. Hence, in the first example, the size of the Common field 1702 can be determined after decoding the EHT-SIG-A field since the values of N and M can be derived from the CBW and the value of L which are indicated in the EHT-SIG-A field.

Figure 19B:
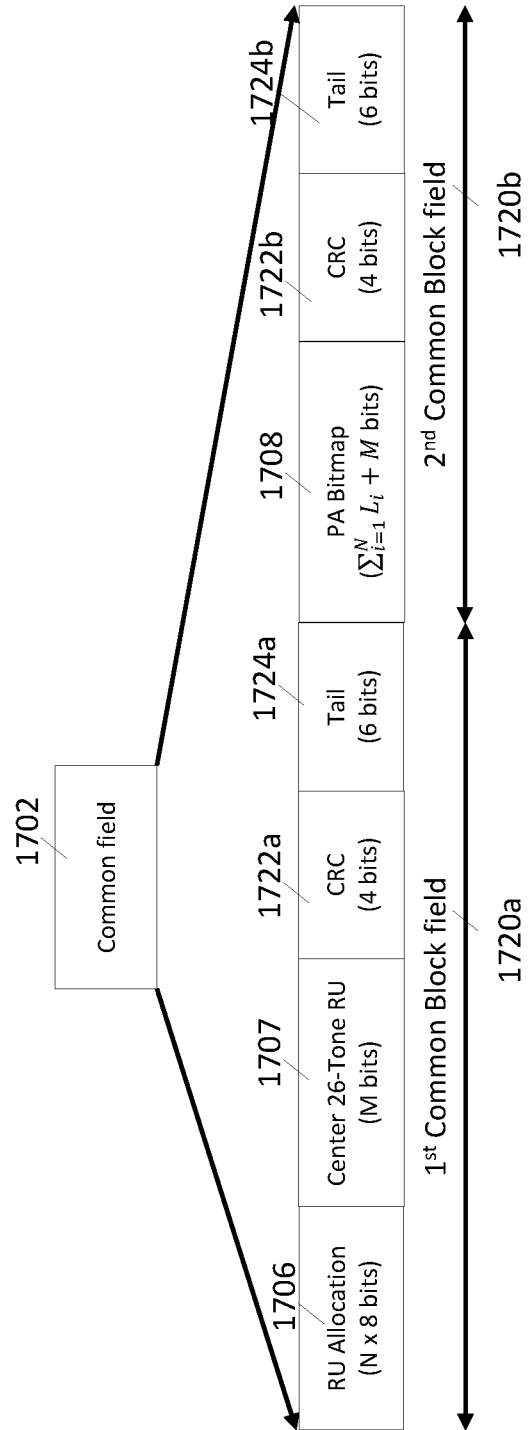
FIG. 19B depicts a second example of encoding structure of the Common field according to the third or fourth embodiment.

FIG. 19B depicts a second example of encoding structure of the Common field 1702 according to the third or fourth embodiment. The Common field 1702 is divided into two Common Block fields, namely the first Common Block field 1710a and the second Common Block field 1710b, which are separately encoded. The first Common Block field 1710a includes the RU Allocation subfield 1706 and the Center 26-Tone RU subfield 1707. The size of the first Common Block field 1710a can be derived after decoding the EHT-SIG-A field since the values of N and M can be derived from the values of CBW and L which are indicated in the EHT-SIG-A field. The first Common Block field 1702a also include a 4-bit CRC field 1722a and a 6-bit Tail field 1724a for BCC encoding/decoding purpose. The second Common Block field 1702b includes a PA Bitmap subfield 1708. The second Common Block field 1710b also include a 4-bit CRC field 1722b and a 6-bit Tail field 1724b for BCC encoding/decoding purpose.

In the second example, the PA Bitmap subfield 1708 has a size of $(\Sigma_{n=1}^{N}L_n+M$ bits), where $L_n$ is equal to the number of user-specific allocations indicated by the n-th field of the RU Allocation subfield 1706. The size of the second Common Block field 1710b can be determined after the first Common Block field 1710a is decoded.

Compared with the first example as shown in FIG. 19A, the second example as shown in FIG. 19B has a higher implementation complexity in terms of decoding of the Common field 1702. As such, if the first example and the second example have the same Common field overhead, the first example is preferred.

As shown in FIG. 19A and FIG. 19B, in comparison, if $\Sigma_{i=n}^{N}L_n<N\times17-10$, the second example has less Common field overhead than the first example. It can be observed that
 when N=1, the second example may be better if $L_1<7$. Otherwise the first example is better;
 when N=2, the second example may be better if $\Sigma_{n=1}^{2}L_n<24$. Otherwise the first example is better;
 when N=4, the second example may be better if $\Sigma_{n=1}^{4}L_n<58$. Otherwise the first example is better; and
 when N=8, the second example may be better if $\Sigma_{n=1}^{8}L_n<126$. Otherwise the first example is better.

Apparently, whether the first example or the second example is used in the Common field of an EHT MU PPDU should be at AP's discretion depending on the CBW and RU assignment of the EHT MU PPDU. As a result, it is advantageous to add a 1-bit signalling per EHT-SIG-B content channel in the EHT-SIG-A field of the EHT MU PPDU to indicate whether the first example or the second example is used in the corresponding EHT-SIG-B content channel.

In FIG. 17, the User Specific field 1704 includes (or consists of) one or more User field(s) for non-MU-MIMO allocation(s) and/or MU-MIMO allocation(s), for example a User field 0 (1710), a User field 1 (1712), a User field 2 (1714), a User field 3 (1716), and a User field 4 (1718).

A User field contains user information indicating a user-specific allocation (i.e. user-specific allocation information). For non-MU-MIMO allocation, the number of spatial streams (NSTS), transmit beamforming (Tx BF) information, MCS, DCM information, and error control coding information may be included. For MU-MIMO allocation, NSTS, starting spatial stream, MCS, and error control coding information may be included. One User field may be addressed to a STA (similar to an HE MU PPDU, in an EHT MU PPDU, a STA can only be addressed by a single User field. As a result, when a STA receives an EHT MU PPDU, it will stop parsing the User Specific field once it identifies its own User field). For example, User field 0 (1710) may provide user-specific allocation information for an Allocation 0. For example, User field 1 (1712), User field 2 (1714), and User field 3 (1716) may provide user-specific allocation information for an Allocation 1 with 3 MU-MIMO users. For example, User field 4 (1718) may provide user-specific allocation information for an Allocation 2.

Figure 19C:
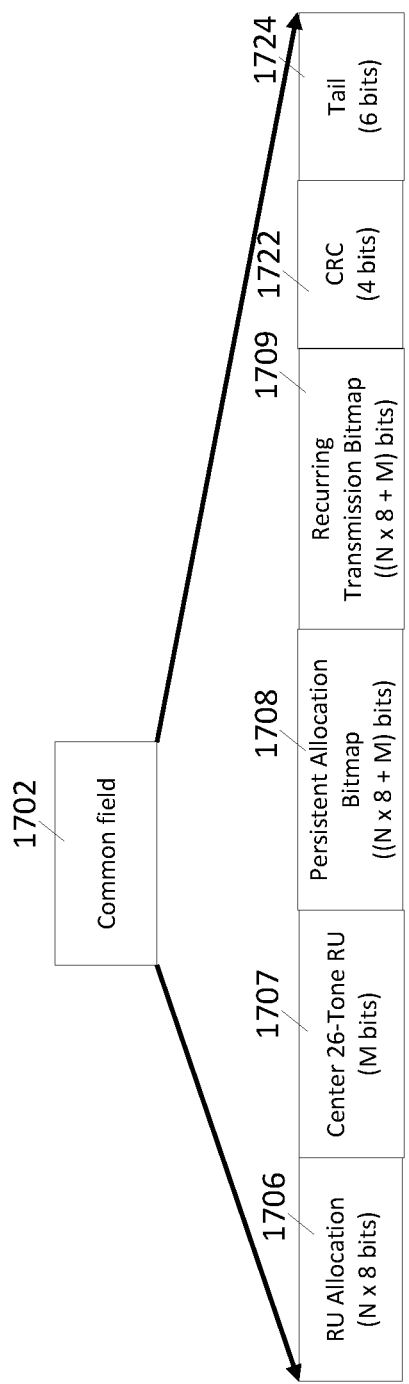
FIG. 19C depicts a first example of encoding structure of the Common field according to the embodiment shown in FIG. 3B.

FIG. 19C depicts a first example of encoding structure of the Common field 502 according to the embodiment shown in FIG. 3B. As mentioned above, the Common field 1702 includes the RU Allocation subfield 1706, the Center 26-Tone RU subfield 1707, and the PA Bitmap subfield 1708. In the first example, all the subfields of the Common field 1702 are jointly encoded. As mentioned in the above, each of the N field(s) of the RU Allocation subfield 1706 is a 8-bit signalling and thus the RU Allocation subfield 1706 has N×17 bits, where N=1, 2, 4 or 8. The Center 26-Tone RU subfield 1707 has M bits, where M=0, 1 or 2. Each of the N field(s) of the RU Allocation subfield 1706 can indicate at most seventeen user-specific allocations. Hence, in the first example, each of the PA Bitmap subfield 1708 has a size of (N×9+M) bits.

The Common field 1702 has a CRC (cyclic redundancy check) subfield 1722 and a Tail subfield 1724 appended for BCC encoding/decoding purpose. The CRC subfield 1722 has a size of 4 bits and the Tail subfield 1724 has a size of 6 bits. That is, the size of the Common field 1702 is the sum of the size of the RU Allocation subfield 1706, the Center 26-Tone RU subfield 1707, the PA Bitmap subfield 1708, the CRC subfield 1722 and the Tail subfield 1724. Hence, in the first example, the size of the Common field 1702 can be determined after decoding the EHT-SIG-A field since the values of N and M can be derived from the CBW and the value of L which are indicated in the EHT-SIG-A field.

Figure 19D:
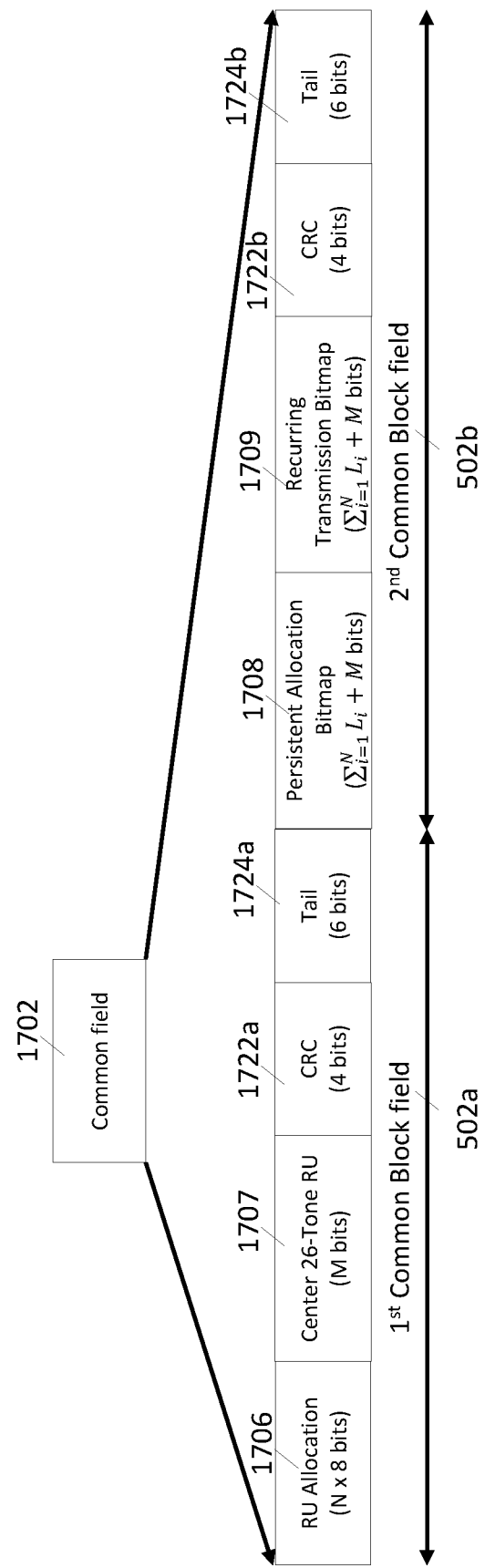
FIG. 19D depicts a second example of encoding structure of the Common field according to the embodiment shown in FIG. 3B.

FIG. 19D depicts a second example of encoding structure of the Common field 502 according to the embodiment shown in FIG. 3B. The Common field 1702 is divided into two Common Block fields, namely the first Common Block field 1710a and the second Common Block field 1710b, which are separately encoded. The first Common Block field 1710a includes the RU Allocation subfield 1706 and the Center 26-Tone RU subfield 1707. The size of the first Common Block field 1710a can be derived after decoding the EHT-SIG-A field since the values of N and M can be derived from the values of CBW and L which are indicated in the EHT-SIG-A field. The first Common Block field 1702a also include a 4-bit CRC field 1722a and a 6-bit Tail field 1724a for BCC encoding/decoding purpose. The second Common Block field 1702b includes a PA Bitmap subfield 1708. The second Common Block field 1710b also include a 4-bit CRC field 1722b and a 6-bit Tail field 1724b for BCC encoding/decoding purpose.

In the second example, each of the Persistent Allocation Bitmap subfield 508 and the Recurring Transmission Bitmap subfield 509 has a size of $(\Sigma_{n=1}^{N}L_n+M$ bits), where $L_n$ is equal to the number of allocations indicated by the n-th field of the RU Allocation subfield 506. The size of the second Common Block field 502b can be determined after the first Common Block field 502a is decoded.

Compared with the first example as shown in FIG. 19C, the second example as shown in FIG. 19D has a higher implementation complexity in terms of decoding of the Common field 1702. As such, if the first example and the second example have the same Common field overhead, the first example is preferred.

As shown in FIG. 19C and FIG. 19D, in comparison, if $\Sigma_{i=n}^{N} L_n < N \times 9 - 5$, the second example has less Common field overhead than the first example. It can be observed that when N=1, the second example may be better if $L_1 < 4$. Otherwise the first example is better;

when N=2, the second example may be better if $\Sigma_{n=1}^{2} L_n < 13$. Otherwise the first example is better;

when N=4, the second example may be better if $\Sigma_{n=1}^{4} L_n < 31$. Otherwise the first example is better; and when N=8, the second example may be better if $\Sigma_{n=1}^{8} L_n < 67$. Otherwise the first example is better.

Advantageously, User field(s) for a downlink persistent allocation containing a recurring transmission is not present, which may reduce the overhead.

Figure 19E:
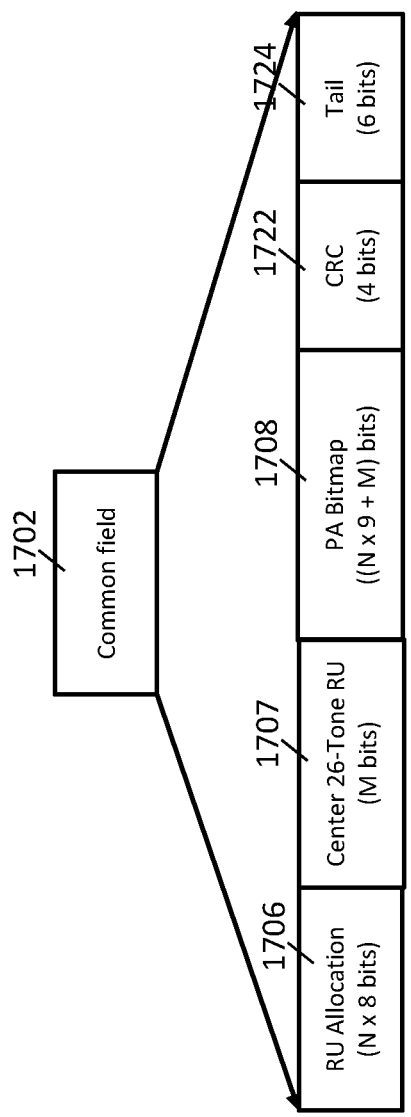
FIG. 19E depicts a first example of encoding structure of the Common field according to embodiment shown in FIG. 3C.

FIG. 19E depicts a first example of encoding structure of the Common field 1702 according to the embodiment shown in FIG. 3C. As mentioned above, the Common field 1702 includes the RU Allocation subfield 1706, the Center 26-Tone RU subfield 1707, and the PA Bitmap subfield 1708. In the first example, all the subfields of the Common field 1702 are jointly encoded. As mentioned in the above, each of the N field(s) of the RU Allocation subfield 1706 is a 8-bit signalling and thus the RU Allocation subfield 1706 has N×8 bits, where N=1, 2, 4 or 8. The Center 26-Tone RU subfield 1707 has M bits, where M=0, 1 or 2. Each of the N field(s) of the RU Allocation.

The Common field 1702 has a CRC (cyclic redundancy check) subfield 1722 and a Tail subfield 1724 appended for BCC encoding/decoding purpose. The CRC subfield 1722 has a size of 4 bits and the Tail subfield 1724 has a size of 6 bits. That is, the size of the Common field 1702 is the sum of the size of the RU Allocation subfield 1706, the Center 26-Tone RU subfield 1707, the PA Bitmap subfield 1708, the CRC subfield 1722 and the Tail subfield 1724. Hence, in the first example, the size of the Common field 1702 can be determined after decoding the EHT-SIG-A field since the values of N and M can be derived from the CBW and the value of L which are indicated in the EHT-SIG-A field.

FIG. 19E depicts a second example of encoding structure of the Common field 1702 according to the embodiment shown in FIG. 3C. The Common field 1702 is divided into two Common Block fields, namely the first Common Block field 1710a and the second Common Block field 1710b, which are separately encoded. The first Common Block field 1710a includes the RU Allocation subfield 1706 and the Center 26-Tone RU subfield 1707. The size of the first Common Block field 1710a can be derived after decoding the EHT-SIG-A field since the values of N and M can be derived from the values of CBW and L which are indicated in the EHT-SIG-A field. The first Common Block field 1702a also include a 4-bit CRC field 1722a and a 6-bit Tail field 1724a for BCC encoding/decoding purpose. The second Common Block field 1702b includes a PA Bitmap subfield 1708. The second Common Block field 1710b also include a 4-bit CRC field 1722b and a 6-bit Tail field 1724b for BCC encoding/decoding purpose.

In the second example, the PA Bitmap subfield 1708 has a size of $(\Sigma_{n=1}^{N} L_n + M$ bits), where $L_n$ is equal to the number of allocations indicated by the n-th field of the RU Allocation subfield 1706. The size of the second Common Block field 1710b can be determined after the first Common Block field 1710a is decoded.

Figure 19F:
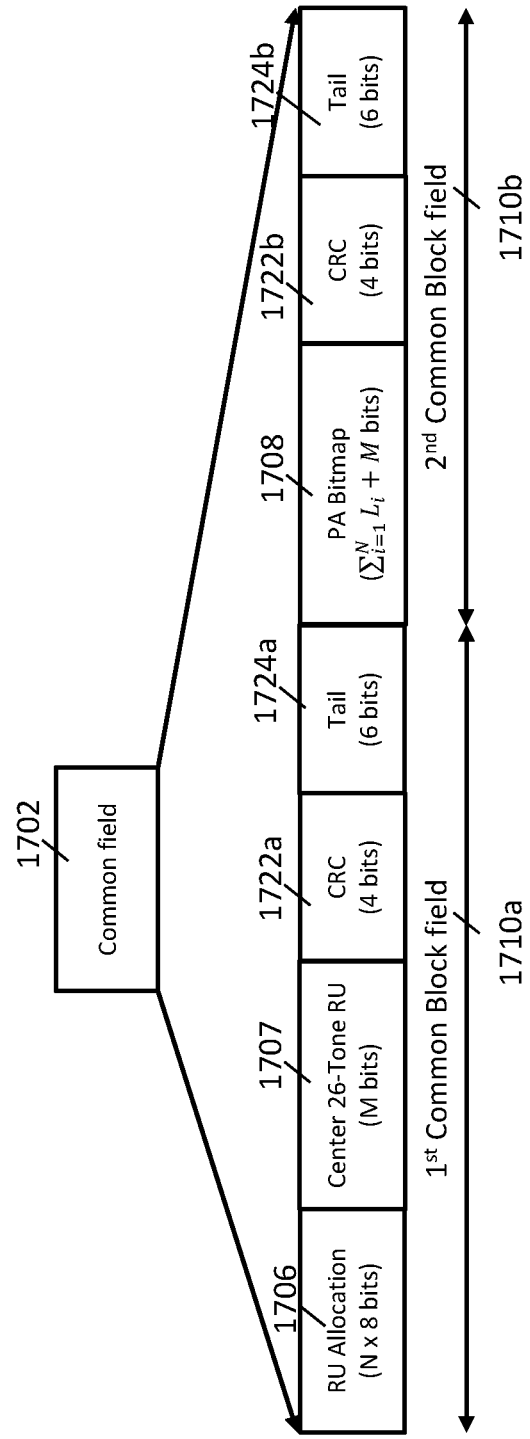
FIG. 19F depicts a second example of encoding structure of the Common field according to the embodiment shown in FIG. 3C.

Compared with the first example as shown in FIG. 19E, the second example as shown in FIG. 19F has a higher implementation complexity in terms of decoding of the Common field 1702. As such, if the first example and the second example have the same Common field overhead, the first example is preferred.

As shown in FIG. 19E and FIG. 19F, in comparison, if $\Sigma_{i=n}^{N} L_n < N \times 9 - 10$, the second example has less Common field overhead than the first example. It can be observed that when N=1, the first example is better;

when N=2, the second example may be better if $\Sigma_{n=1}^{2} L_n < 8$. Otherwise the first example is better;

when N=4, the second example may be better if $\Sigma_{n=1}^{4} L_n < 26$. Otherwise the first example is better; and when N=8, the second example may be better if $\Sigma_{n=1}^{8} L_n < 62$. Otherwise the first example is better.

Apparently, whether the first example or the second example is used in the Common field of an EHT MU PPDU should be at AP's discretion depending on the CBW and RU assignment of the EHT MU PPDU. As a result, it is advantageous to add a 1-bit signalling per EHT-SIG-B content channel in the EHT-SIG-A field of the EHT MU PPDU to indicate whether the first example or the second example is used in the corresponding EHT-SIG-B content channel.

In FIG. 17, the User Specific field 1704 includes (or consists of) one or more User field(s) for non-MU-MIMO allocation(s) and/or MU-MIMO allocation(s), for example a User field 0 (1710), a User field 1 (1712), a User field 2 (1714), a User field 3 (1716), and a User field 4 (1718).

A User field contains user information indicating a user-specific allocation (i.e. user-specific allocation information). For non-MU-MIMO allocation, the number of spatial streams (NSTS), transmit beamforming (Tx BF) information, modulation and coding scheme (MCS), dual carrier modulation (DCM) information, and error control coding information may be included. For MU-MIMO allocation, NSTS, starting spatial stream, MCS, and error control coding information may be included. One User field may be addressed to a STA (similar to an HE MU PPDU, in an EHT MU PPDU, a STA can only be addressed by a single User field. As a result, when a STA receives an EHT MU PPDU, it will stop parsing the User Specific field once it identifies its own User field). For example, User field 0 (1710) may provide user-specific allocation information for an Allocation 0. For example, User field 1 (1712), User field 2 (1714), and User field 3 (1716) may provide user-specific allocation information for an Allocation 1 with 3 MU-MIMO users. For example, User field 4 (1718) may provide user-specific allocation information for an Allocation 2.

Table 1 indicates the User field format for a non-MU-MIMO allocation, wherein BCC is Binary Convolutional Code, and LDPC is Low Density Parity Code. Table 2 indicates the User field format for an MU-MIMO allocation.

TABLE 1

| Subfield | Description |
| --- | --- |
| STA-ID | Indicates the identifier of an intended STA. |
| NSTS | Indicates number of spatial streams. |
| Tx BF | Indicates whether transmit beamforming is used. |
| DCM | Indicates whether DCM is used. |
| MCS | Indicates modulation and coding scheme. Set to n for MCSn, where n = 0, 1,2 ...., 11 Values 12 to 15 are reserved |
| Coding | Indicates whether BCC or LDPC is used. |

TABLE 2

| Subfield | Description |
| --- | --- |
| STA-ID | Indicates the identifier of an intended STA. |
| Spatial configuration | Indicates the number of spatial streams and starting stream index. |
| MCS | Indicates modulation and coding scheme. Set to n for MCSn, where n = 0, 1,2 ...., 11 Values 12 to 15 are reserved |
| Coding | Indicates whether BCC or LDPC is used. |

If the RU information and/or the user-specific allocation information for its own persistent allocation is not in place, a STA may not be able to receive a recurring transmission of the persistent allocation properly. As such, for error recovery purpose, according to an embodiment, advantageously, an example rule may be that at least one MPDU (MAC (medium access control) protocol data unit) which requires an acknowledgement may be included in an initial transmission of a persistent allocation. If the AP does not receive a positive acknowledgement from a STA for an initial transmission of a persistent allocation, it knows the RU information and/or the user-specific allocation information for the persistent allocation may not be in place at the STA and then the AP may not schedule recurring transmissions of the persistent allocation.

According to the third or fourth embodiment, User field for a downlink user-specific PA is not present in the User Specific field, which may reduce the overhead.

Figure 20A:
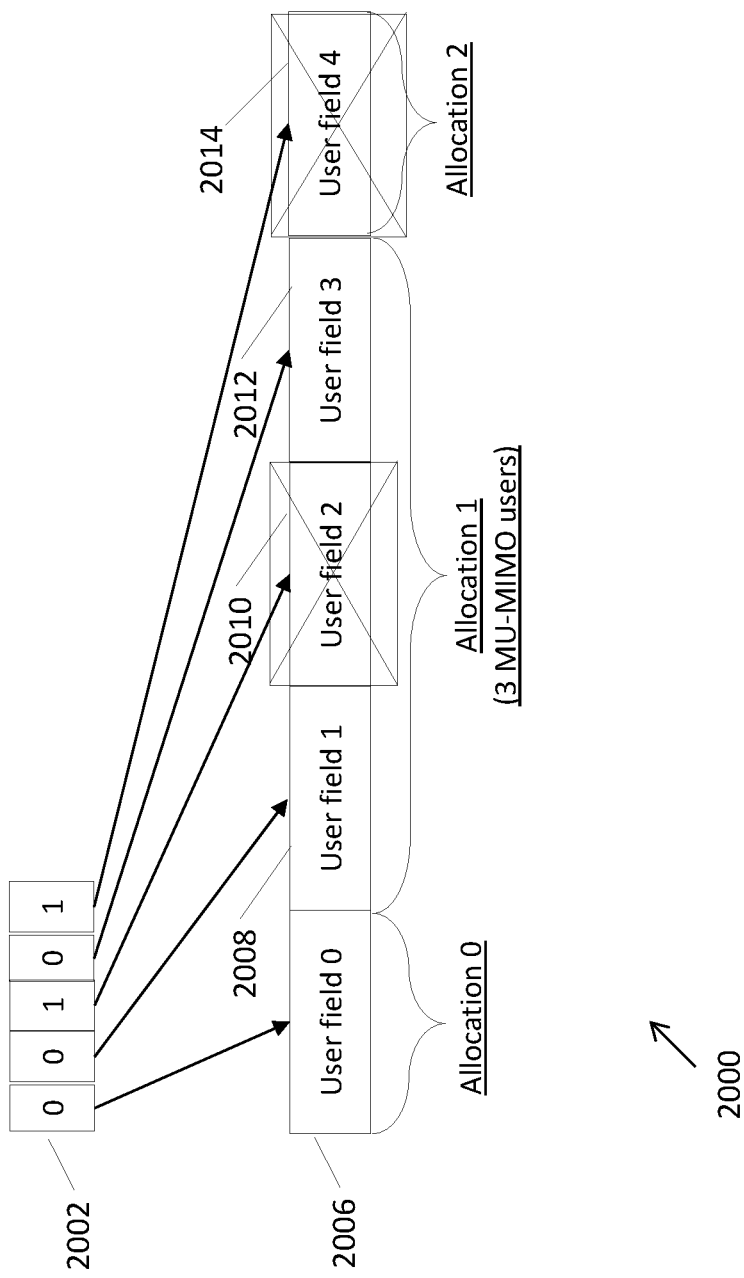
FIG. 20A shows an illustration of User Specific field overhead reduction according to the embodiment shown in FIG. 3C.

FIG. 20A shows an illustration 2000 of the User Specific field overhead reduction for the third to fourth embodiment. The PA Bitmap subfield 2002 is provided as 00101. User field 0 (2006) of the User Specific field provides a non-MU-MIMO allocation 0, which is not persistent (according to the first bit being 0 in the PA Bitmap subfield 2002), and as such, the User field 0 (2006) is provided in the User Specific field. User field 1 (2008), User field 2 (2010), and User field 3 (2012) provide three user-specific allocations of an MU-MIMO allocation 1. The first user-specific allocation of the MU-MIMO allocation 1 is not persistent (according to the second bit being 0 in the PA Bitmap subfield 2002), and as such, the User field 1 (2008) is provided in the User Specific field. The second user-specific allocation of the MU-MIMO allocation 1 is persistent (according to the third bit being 1 in the PA Bitmap subfield 2002), and as such, the User field 2 (2010) is not provided in the User Specific field. The third user-specific allocation of the MU-MIMO allocation 1 is not persistent (according to the fourth bit being 0 in the PA Bitmap subfield 2002), and as such, the User field 3 (2012) is provided in the User Specific field. User field 4 (2014) of the User Specific field provides a non-MU-MIMO allocation 2, which is persistent (according to the fifth bit being 1 in the PA Bitmap subfield 2002), and as such, the User field 4 (2014) is not provided in the User Specific field, which advantageously reduces overhead.

Figure 20B:
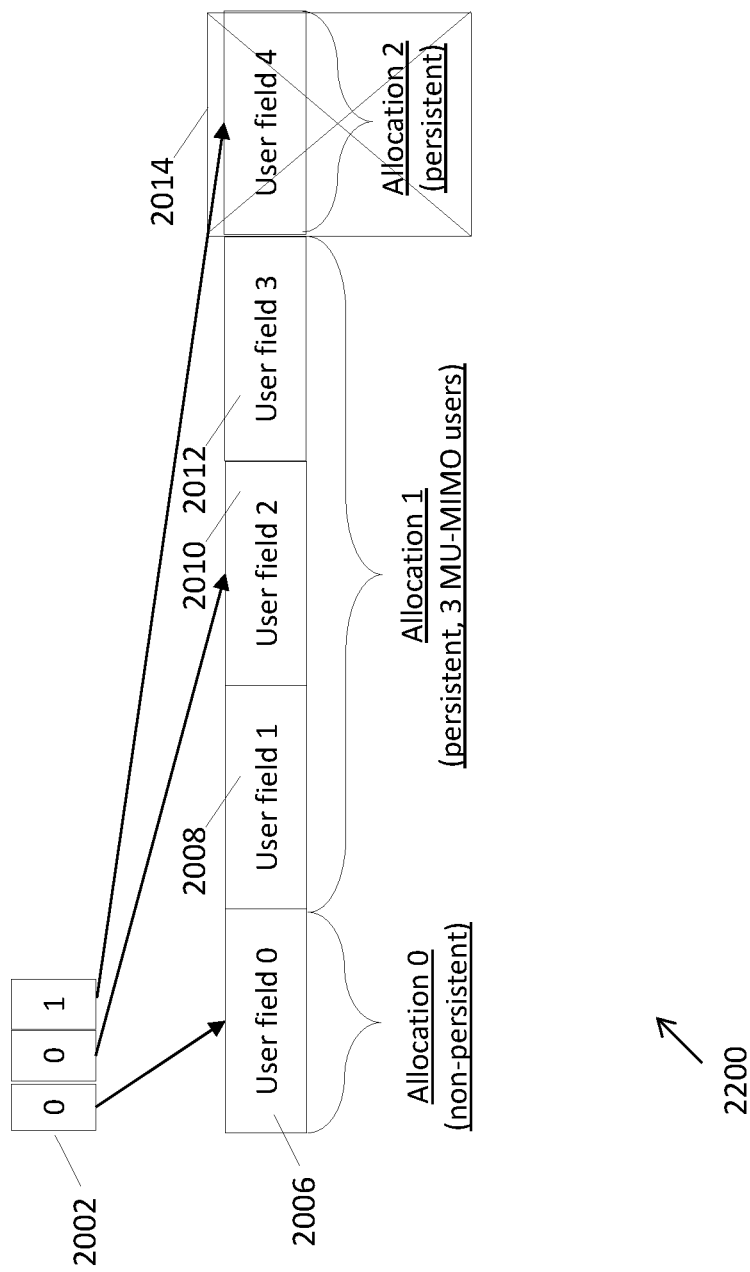
FIG. 20B shows an illustration of User Specific field overhead reduction in another example according to the embodiment shown in FIG. 3C.

FIG. 20B shows an illustration 2200 of the User Specific field overhead reduction for the third to fourth embodiment. The PA Bitmap subfield 2002 is provided as 001. User field 0 (2006) of the User Specific field provides an Allocation 0, which is not persistent (according to the first bit being 0 in the PA Bitmap subfield 2002), and as such, the User field 0 (2006) is provided in the User Specific field. User field 1 (2008), User field 2 (2010), and User field 3 (2012) provide an Allocation 1 with 3 MU-MIMO users, which is not persistent (according to the second bit being 0 in the PA Bitmap subfield 2002), and as such, the User field 1 (2008), User field 2 (2010), and User field 3 (2012) are provided in the User Specific field. The third bit in the PA Bitmap subfield 2002 is 1, so that Allocation 2 is a PA, and as such, User field 4 (2014) is not provided in the User Specific field, which advantageously reduces overhead.

Figure 20C:
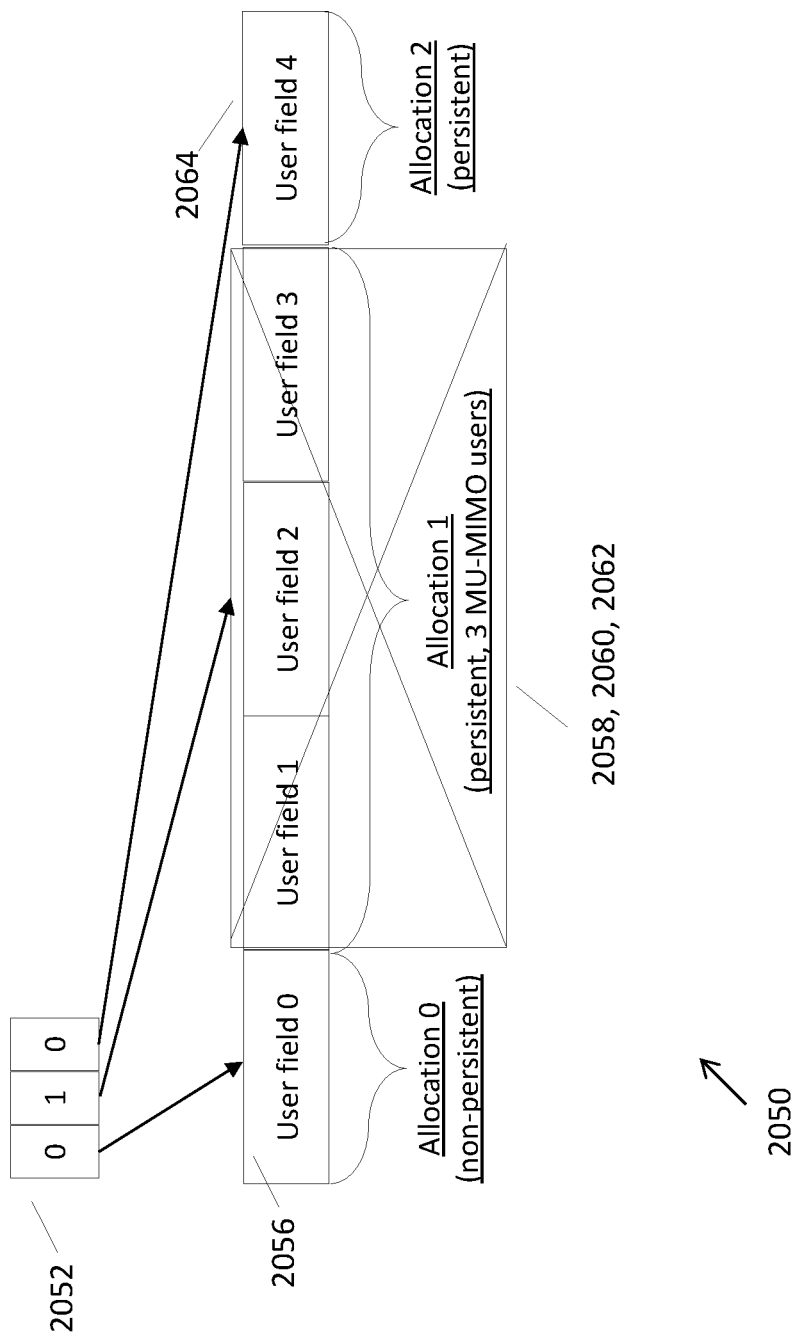
FIG. 20C shows an illustration of User Specific field overhead reduction in another example according to the embodiment shown in FIG. 3C.

FIG. 20C shows an illustration 2050 of the User Specific field overhead reduction in another example for the first to fourth embodiment. The PA Bitmap subfield 2052 is provided as 010. User field 0 (2056) of the User Specific field provides an Allocation 0, which is not persistent (according to the first bit being 0 in the PA Bitmap field 2052), and as such, the User field 0 (2056) is provided in the User Specific field. User field 1 (2058), User field 2 (2060), and User field 3 (2062) provide an Allocation 1 with 3 MU-MIMO users, which is persistent (according to the second bit being 1 in the PA Bitmap subfield 2052), so that the User field 1 (2058), User field 2 (2060), and User field 3 (2062) are not provided in the User Specific field, which advantageously reduces overhead. The third bit in the PA Bitmap subfield 2052 is 0, so that Allocation 2 is a PA, and as such User field 4 (2064) is provided in the User specific field.

Figure 21:
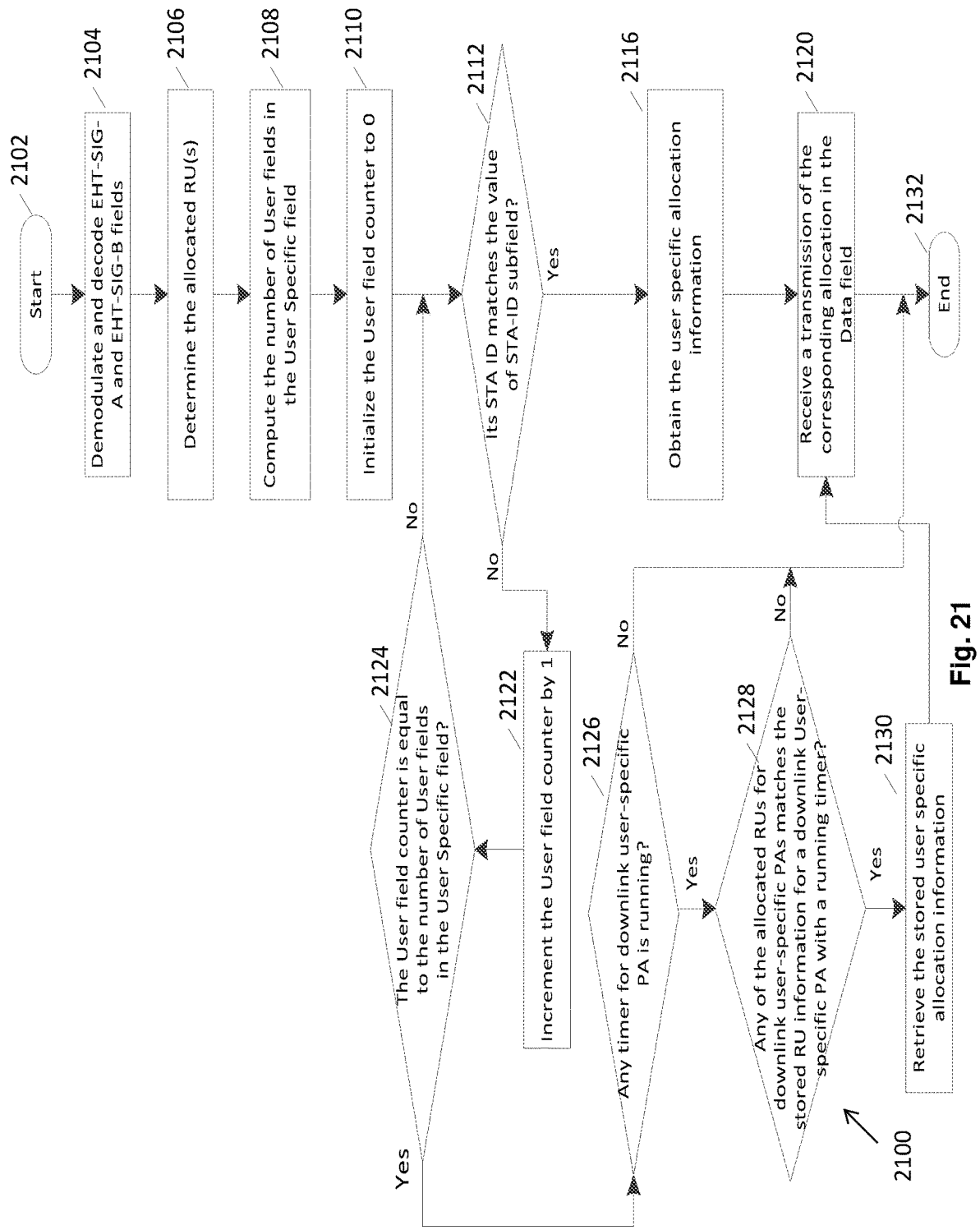
FIG. 21 shows a flow chart illustrating processing of a received EHT MU PPDU at an STA according to the third or fourth embodiment.

FIG. 21 shows a flow chart 2100 illustrating processing of a received EHT MU PPDU at an STA according to the third or fourth embodiment. Processing may start at 2102. At 2104, the EHT-SIG-A field and the EHT-SIG-B field of the received EHT MU PPDU may be demodulated and decoded. At 2106, the allocated RU(s) may be determined; this can be done by checking the RU Allocation subfield and the Center 26-Tone subfield (if present) of the EHT-SIG-B field. This step can be skipped in the case of a full-bandwidth MU-MIMO transmission. At 2108, the number of User fields in the User Specific field may be computed; the PA Presence subfield of the EHT-SIG-A field and the PA Bitmap subfield of the EHT-SIG-B field may be taken into account to exclude the User fields corresponding to downlink user-specific PAs. At 2110, the User field counter may be initialized to 0 (zero). At 2112, it may be determined whether the STA's STA ID matches the value of the STA-ID subfield. If the STA's STA ID matches the value of the STA-ID subfield, processing may proceed to step 2116. If the STA's STA ID does not match the value of the STA-ID subfield, processing may proceed to step 2122. At 2116, the user specific allocation information may be obtained. At 2120, a transmission of the corresponding allocation may be received in the Data field. At 2122, the User field counter may be incremented by 1. At 2124, it may be determined whether the User field counter is equal to the number of User fields in the User Specific field. If it is determined that the User field counter is equal to the number of User fields in the User Specific field, processing may proceed at step 2126. If it is determined that the User field counter is not equal to the number of User fields in the User Specific field, processing may return to step 2112. At 2126, it may be determined whether any timer for downlink user-specific PA is running. If it is determined that at least one timer for downlink user-specific PA is running, processing may proceed at step 2128. If it is determined that no timer for downlink user-specific PA is running, processing may end at step 2132. At 2128, it may be determined whether any of the allocated RUs for downlink user-specific PAs matches the stored RU information for a downlink user-specific PA with a running timer; the allocated RUs for downlink user-specific PAs can be determined by checking the PA Presence subfield of the EHT-SIG-A field and the PA Bitmap subfield of the EHT-SIG-B field. If it is determined that one of the allocated RUs for downlink user-specific PAs matches the stored RU information for a downlink user-specific PA with a running timer, processing may proceed at step 2130. If it is determined that none of the allocated RUs for downlink user-specific PAs matches the stored RU information for any downlink user-specific PA with a running timer, processing may end at 2132. At step 2130, the latest stored user specific allocation information for the matched RU is retrieved and processing proceeds at step 2120. At 2132, processing ends.

Figure 22:
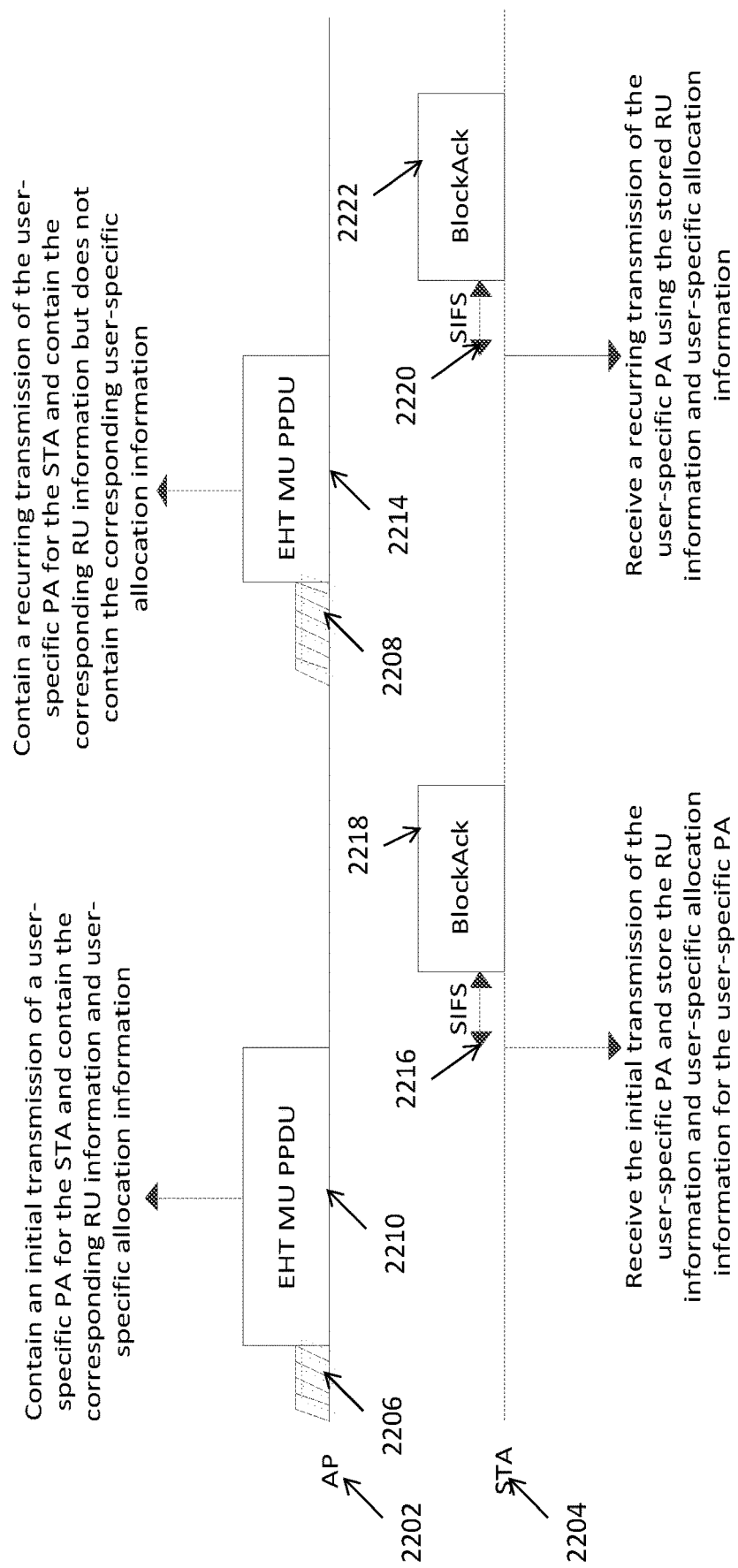
FIG. 22 depicts a flow chart illustrating a communication between an AP and an STA with downlink user-specific PA according to a fifth embodiment.

FIG. 22 depicts a flow chart illustrating a communication between an AP 2202 and an STA 2204 with downlink user-specific PA according to a fifth embodiment. Contention based channel access procedures are illustrated by blocks 2206, and SIFS 2208 are illustrated. The AP 2202 may transmit an EHT MU PPDU 2210, which may include an initial transmission of a downlink user-specific PA for the STA and contain the corresponding RU information and user-specific allocation information. The AP 2202 may then transmit an EHT MU PPDU 2214, which may include a recurring transmission of the downlink user-specific PA for the STA and may also contain the corresponding RU information but does not contain the corresponding user-specific allocation information. At 2216, the STA 2204 may receive the initial transmission of the downlink user-specific PA and store the RU information and user-specific allocation information for the downlink user-specific PA. The STA 2204 may then transmit a BlockAck frame 2218. At 2220, the STA 2204 may receive the recurring transmission of the downlink user-specific PA using the stored RU information and user-specific allocation information for the downlink user-specific PA. The STA 2204 may then transmit a BlockAck frame 2222.

Figure 23:
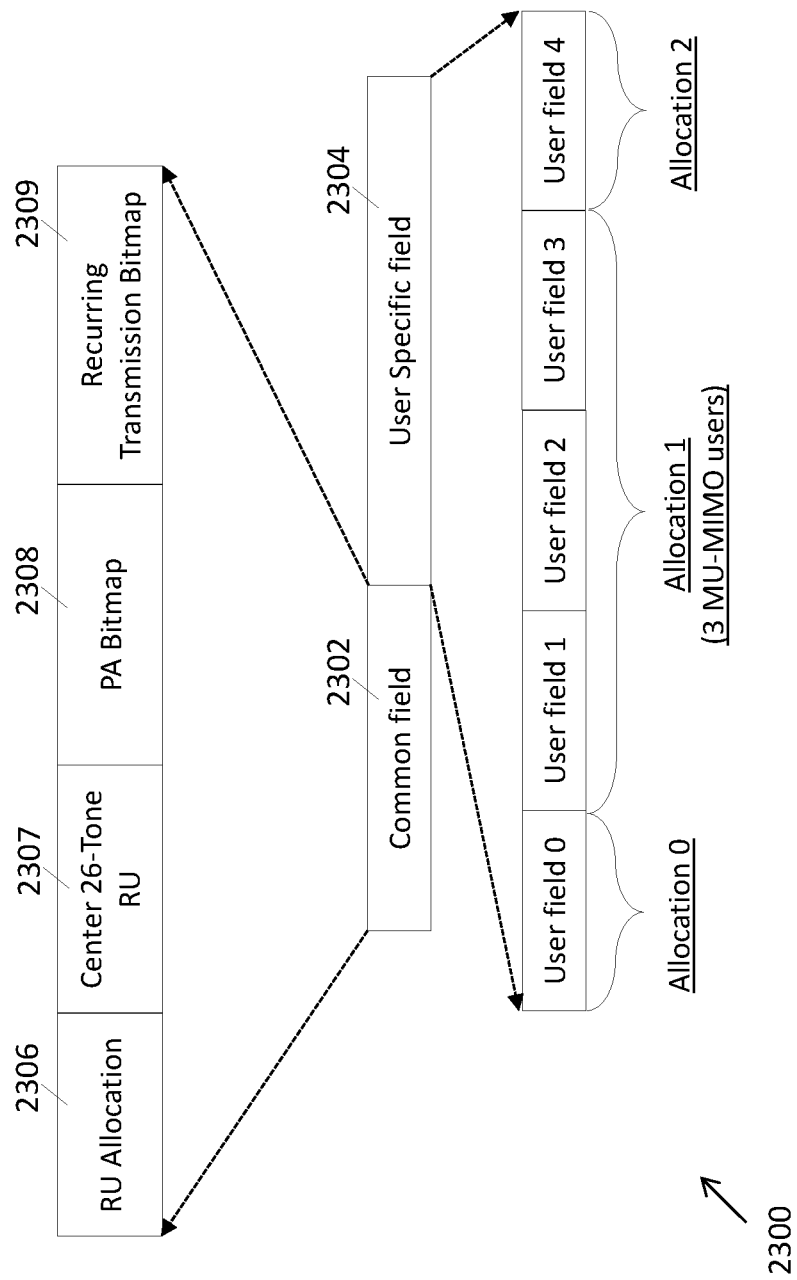
FIG. 23 depicts an EHT-SIG-B field according to the fifth embodiment.

FIG. 23 depicts an EHT-SIG-B field 2300 according to the fifth embodiment. The EHT-SIG-B field 2300 includes (or consists of) a Common field 2302, if present, followed by a User Specific field 2304 which together are referred to as the EHT-SIG-B content channel.

The Common field 2302 contains a RU Allocation subfield 2306, a Center 26-Tone RU subfield 2307, a PA Bitmap subfield 2308 and a Recurring Transmission Bitmap subfield 2309. The RU Allocation subfield 2306 indicates the RU information for each of user-specific allocations including downlink user-specific PAs.

The PA Bitmap subfield 2308 of the Common field 2302 is the same as the PA Bitmap subfield 1708 of the Common field 1702 as shown in FIG. 17. The EHT-SIG-A field may include a PA Bitmap Presence subfield per EHT-SIG-B content channel.

The Recurring Transmission Bitmap subfield 2309 indicates whether each of the user-specific allocations specified by the RU Allocation subfield 2306 contains an initial or recurring transmission. A bit of the Recurring Transmission Bitmap subfield 2309 is set to 0 to indicate the user-specific allocation corresponding to the bit contains an initial transmission. An initial transmission refers to a transmission of a non-user-specific PA or an initial transmission of a user-specific PA. A bit of the Recurring Transmission Bitmap subfield 2309 is set to 0 if the user-specific allocation corresponding to the bit is not persistent. A bit of the Recurring Transmission Bitmap subfield 2309 is set to 1 to indicate the user-specific allocation corresponding to the bit contains a recurring transmission. When a bit of the Recurring Transmission Bitmap subfield 2309 is set to 1, the User field for the user-specific allocation corresponding to the bit is not present in the User Specific field 2304.

The Recurring Transmission Bitmap subfield 2309 comprises N bitmap(s), which correspond to the N field(s) of the RU Allocation subfield, respectively, in the same EHT-SIG-B content channel. When CBW=80, 80+80 or 160 MHz, the last bitmap of the Recurring Transmission Bitmap subfield 2309 also indicates whether the user-specific allocation indicated by the 1-bit Center 26-Tone RU subfield 2307 contains a recurring transmission. When CBW=160+160 or 320 MHz, the 4th bitmap of the Recurring Transmission Bitmap subfield 2309 also indicates whether the user-specific allocation indicated by the first bit of the 2-bit Center 26-Tone RU subfield 2307 contains a recurring transmission; and the last bitmap of the Recurring Transmission Bitmap subfield 2309 also indicates whether the user-specific allocation indicated by the second bit of the 2-bit Center 26-Tone RU subfield 2307 contains a recurring transmission. A bitmap of the Recurring Transmission Bitmap subfield 2309 is not present if all user-specific allocations specified by a corresponding field of the RU Allocation subfield 2306 and a corresponding bit of the Center 26-Tone RU subfield 2307 (if applicable) contain no recurring transmission.

Figure 18A:
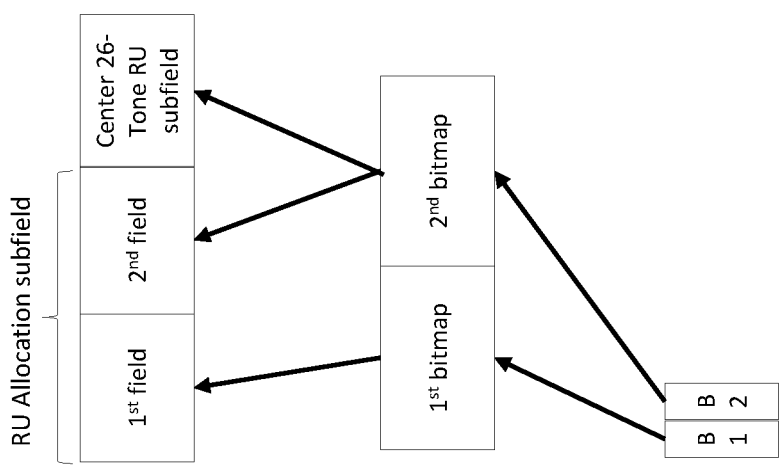

The Recurring Transmission Bitmap subfield 2309 is mapped to the RU Allocation subfield 2306 and the Center 26-Tone RU subfield 2307 in the same manner as the PA Bitmap subfield 2308, as shown in FIGS. 18A and 18B.

Alternatively, an Initial Transmission Bitmap subfield may be provided, for example in the Common field 2302, which indicates whether each of the user-specific allocations specified by the RU Allocation subfield 2306 contains an initial or recurring transmission. A bit is set to 1 to indicate the user-specific allocation corresponding to the bit contains an initial transmission. A bit is set to 0 to indicate the user-specific allocation corresponding to the bit contains a recurring transmission.

The EHT-SIG-A field may include a Recurring Transmission Presence subfield per EHT-SIG-B content channel. The Recurring Transmission Presence subfield for an EHT-SIG-B content channel comprises a N-bit bitmap, wherein the n-th (n=1, 2, . . . , N) bit indicates the presence of the n-th bitmap of the Recurring Transmission Bitmap subfield 2309 in the EHT-SIG-B content channel. The n-th bit of the Recurring Transmission Presence subfield in the EHT-SIG-A field is set to 0 to indicate the n-th bitmap of the Recurring Transmission Bitmap subfield 2309 is not present in the EHT-SIG-B content channel; and set to 1 to indicate the n-th bitmap of the Recurring Transmission Bitmap subfield 2309 is present in the EHT-SIG-B content channel. When the n-th bit of the Persistent Allocation Presence subfield of the EHT-SIG-A field is set to 0, the n-th bit of the Recurring Transmission Presence subfield in the same EHT-SIG-B content channel shall also be set to 0 (i.e. the n-th bitmap of the Recurring Transmission Bitmap subfield 2309 is also not present in the same EHT-SIG-B content channel).

The Common field 2302 may not be present in the case of a full-bandwidth MU-MIMO transmission. In this case, the RU information for the MU-MIMO allocation (e.g. the number of users in the MU-MIMO allocation) may be signalled in the EHT-SIG-A field. In addition, whether or not each of user-specific allocations of the MU-MIMO allocation is persistent may be signalled in the EHT-SIG-A field; and whether or not each of user-specific allocations of the MU-MIMO allocation contains a recurring transmission may also be signalled in the EHT-SIG-A field.

Figure 24A:
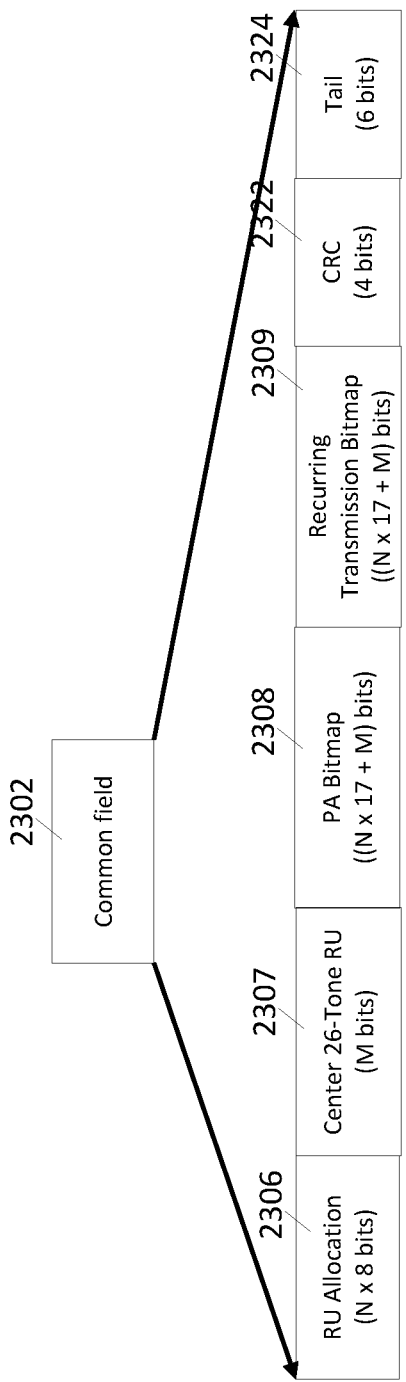
FIG. 24A depicts a first example of encoding structure of the Common field according to the fifth embodiment.

FIG. 24A depicts a first example of encoding structure of the Common field 2302 according to the fifth embodiment. As mentioned in FIG. 23, the Common field 2302 includes the RU Allocation subfield 2306, the Center 26-Tone RU subfield 2307, the PA Bitmap subfield 2308 and the Recurring Transmission Bitmap subfield 2309. In the first example, all the subfields of the Common field 2302 are jointly encoded. As mentioned in the above, each of the N field(s) of the RU Allocation subfield 2306 is a 8-bit signalling and thus the RU Allocation subfield 2306 has N×8 bits, where N=1, 2, 4 or 8. The Center 26-Tone RU subfield 2307 has M bits, where M=0, 1 or 2. Each of the N field(s) of the RU Allocation subfield 2306 can indicate at most seventeen allocations. Hence, in the first example, each of the PA Bitmap subfield 2308 or the Recurring Transmission Bitmap subfield 2309 has a size of (N×17+M) bits.

The Common field 2302 has a CRC subfield 2322 and a Tail subfield 2324 appended for BCC encoding/decoding purpose. The CRC subfield 2322 has a size of 4 bits and the Tail subfield 2324 has a size of 6 bits. That is, the size of the Common field 2302 is the sum of the size of the RU Allocation subfield 2306, the Center 26-Tone RU subfield 2307, the PA Bitmap subfield 2308, the Recurring Transmission Bitmap subfield 2309, the CRC subfield 2322 and the Tail subfield 2324. Hence, in the first example, the size of the Common field 2302 can be determined after decoding the EHT-SIG-A field since the values of N and M can be derived from the CBW and the value of L which are indicated in the EHT-SIG-A field.

Figure 24B:
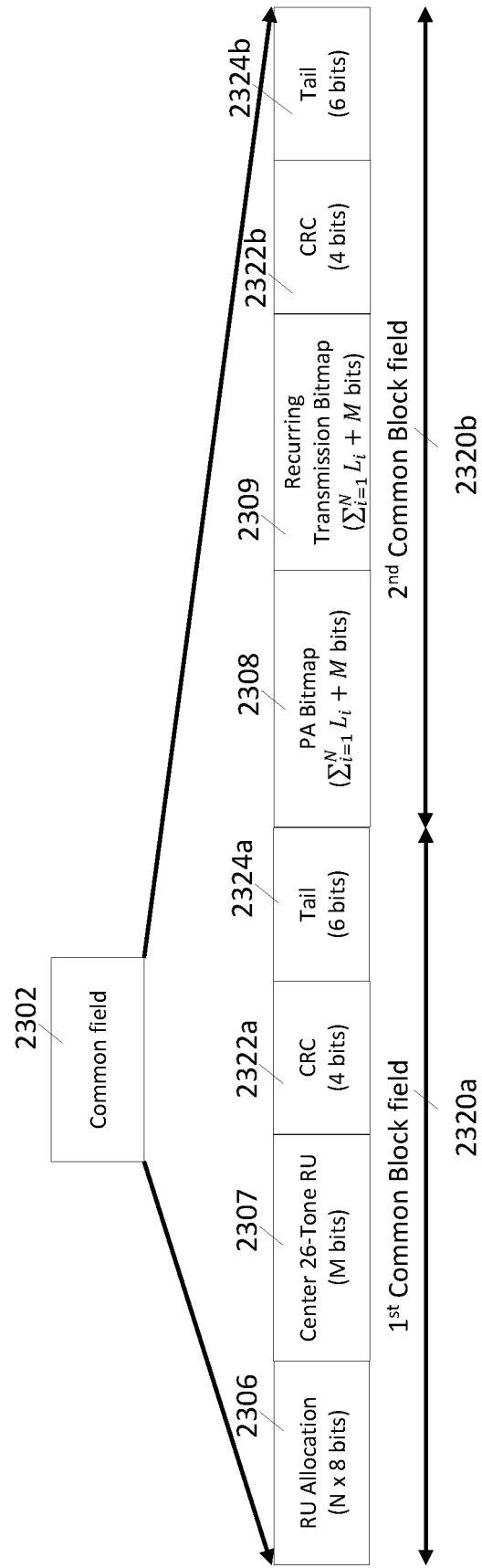
FIG. 24B depicts a second example of encoding structure of the Common field according to the fifth embodiment.

FIG. 24B depicts a second example of encoding structure of the Common field 2302 according to the fifth embodiment. The Common field 2302 is divided into two Common Block fields, namely the first Common Block field 2320*a* and the second Common Block field 2320*b*, which are separately encoded. The first Common Block field 2320*a* includes the RU Allocation subfield 2306 and the Center 26-Tone RU subfield 2307. The size of the first Common Block field 2320*a* can be derived after decoding the EHT-SIG-A field since the values of N and M can be derived from the values of CBW and L which are indicated in the EHT-SIG-A field. The first Common Block field 2320*a* also include a 4-bit CRC field 2322*a* and a 6-bit Tail field 2324*a* for BCC encoding/decoding purpose. The second Common Block field 2320*b* includes a PA Bitmap subfield 2308 and a Recurring Transmission Bitmap subfield 2309. The second Common Block field 2320*b* also include a 4-bit CRC field 2322*b* and a 6-bit Tail field 2324*b* for BCC encoding/decoding purpose.

In the second example, each of the PA Bitmap subfield 2308 and the Recurring Transmission Bitmap subfield 2309 has a size of ($\Sigma_{n=1}^{N} L_n$+M bits), where $L_n$ is equal to the number of user-specific allocations indicated by the n-th field of the RU Allocation subfield 2306. The size of the second Common Block field 2320*b* can be determined after the first Common Block field 2320*a* is decoded.

Compared with the first example as shown in FIG. 24A, the second example as shown in FIG. 24B has a higher implementation complexity in terms of decoding of the Common field 2302. As such, if the first example and the second example have the same Common field overhead, the first example is preferred.

As shown in FIG. 24A and FIG. 24B, in comparison, if $\Sigma_{i=n}^{N} L_n$<N×17−5, the second example has less Common field overhead than the first example. It can be observed that when N=1, the second example may be better if $L_1$<12. Otherwise the first example is better;

when N=2, the second example may be better if $\Sigma_{n=1}^{2} L_n$<29. Otherwise the first example is better;

when N=4, the second example may be better if $\Sigma_{n=1}^{4} L_n$<63. Otherwise the first example is better; and when N=8, the second example may be better if $\Sigma_{n=1}^{8} L_n$<131. Otherwise the first example is better.

Apparently, whether the first example or the second example is used in the Common field of an EHT MU PPDU should be at AP's discretion depending on the CBW and RU assignment of the EHT MU PPDU. As a result, it is advantageous to add a 1-bit signalling per EHT-SIG-B content channel in the EHT-SIG-A field of the EHT MU PPDU to indicate whether the first example or the second example is used in the corresponding EHT-SIG-B content channel.

The User Specific field 2304 includes (or consists of) one or more User field(s) for non-MU-MIMO allocation(s) and/or MU-MIMO allocation(s). A User field of the User Specific field 2304 is the same as that of the User Specific field 1704 as shown in FIG. 17.

When receiving an EHT MU PPDU containing an initial transmission of a downlink user-specific PA for which the STA is an intended recipient, the STA may start or reset a timer for the downlink user-specific PA and store or update the RU information and the user-specific allocation information for the downlink user-specific PA.

If the RU information and/or the user-specific allocation information for a downlink user-specific PA is not in place, a STA may not be able to receive a recurring transmission of the downlink user-specific PA properly. As such, for error recovery purpose, according to an embodiment, advantageously, an example rule may be that at least one MPDU which requires an acknowledgement may be included in an initial transmission of a downlink user-specific PA. If the AP does not receive a positive acknowledgement from a STA for an initial transmission of a downlink user-specific PA, it knows the RU information and/or the user-specific allocation information for the downlink user-specific PA may not be in place at the STA and then the AP may not schedule recurring transmissions of the downlink user-specific PA.

Figure 25:
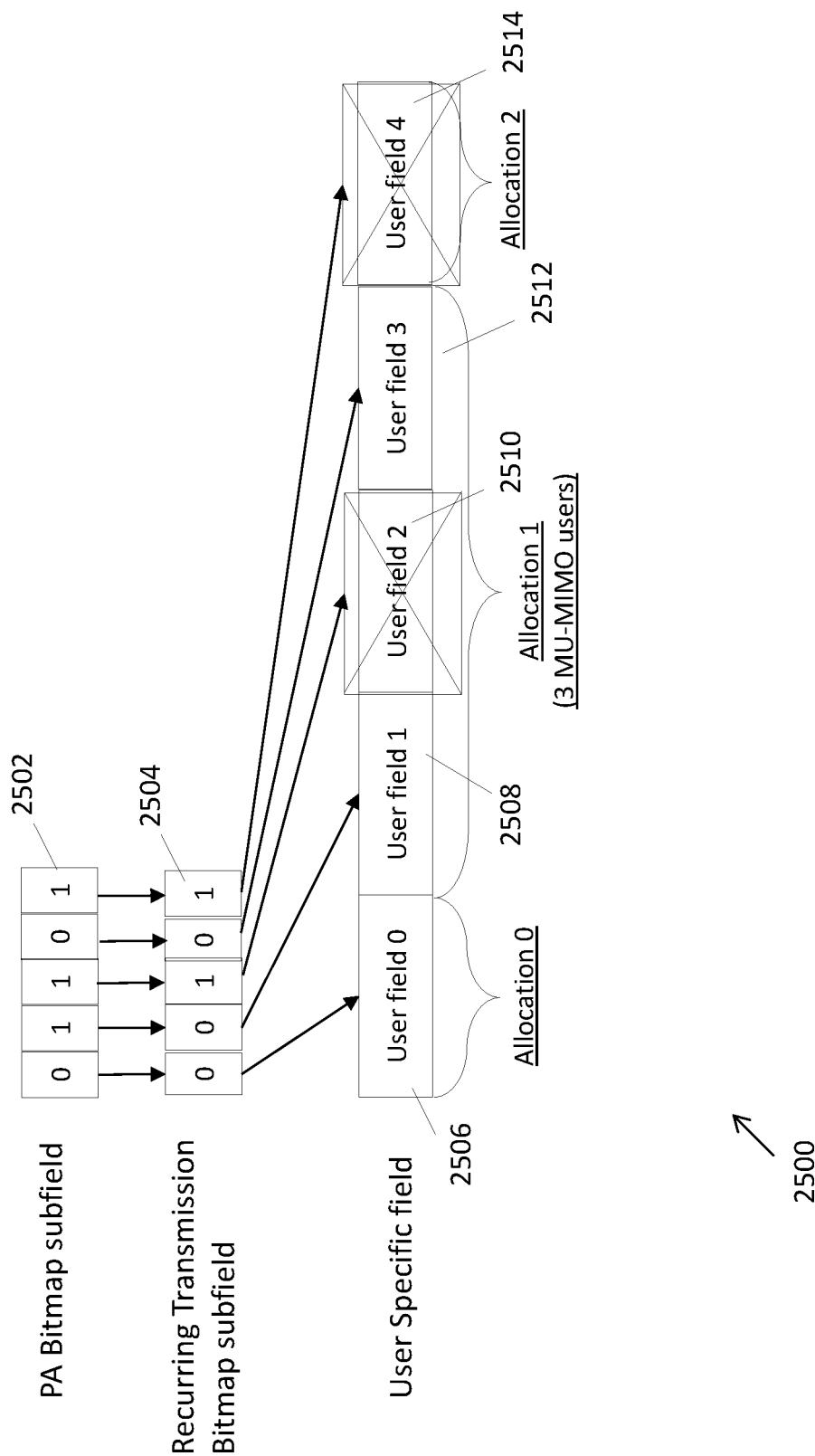
FIG. 25 shows an illustration of User Specific field overhead reduction according to the fifth embodiment.

FIG. 25 shows an illustration 2500 of the User Specific field overhead reduction for the fifth embodiment. The Recurring Transmission Bitmap subfield 2504 is provided as 00101. User field 0 (2506) of the User Specific field provides non-MU-MIMO allocation 0, which is non-persistent (according to the first bit being 0 in the PA Bitmap subfield 2502), and as such, the User field 0 (2506) is provided in the User Specific field. User field 1 (2508) provide a first user-specific allocation of MU-MIMO allocation 1, which is persistent (according to the second bit being 1 in the PA Bitmap subfield 2502). Since the second bit of the Recurring Transmission Bitmap subfield 2504 is 0, the transmission according to the first user-specific allocation of MU-MIMO allocation 1 is not a recurring transmission, so that the User field 1 (2508) is provided in the User Specific field. User field 2 (2510) provide a second user-specific allocation of MU-MIMO allocation 1, which is persistent (according to the third bit being 1 in the PA Bitmap subfield 2502). Since the third bit of the Recurring Transmission Bitmap subfield 2504 is 1, the transmission according to the second user-specific allocation of MU-MIMO allocation 1 is a recurring transmission, so that the User field 2 (2510) is not provided in the User Specific field. User field 3 (2512) provide a third user-specific allocation of MU-MIMO allocation 1, which is non-persistent (according to the fourth bit being 0 in the PA Bitmap subfield 2502), so that the User field 3 (2512) is provided in the User Specific field. User field 4 (2514) of the User Specific field provides non-MU-MIMO allocation 2, which is persistent (according to the fifth bit being 1 in the PA Bitmap subfield 2502). Since the fifth bit in the Recurring Transmission Bitmap subfield 2504 is 1, which indicates that the transmission according to non-MU-MIMO allocation 2 is a recurring transmission, so that User field 4 (2514) is not provided in the User Specific field, which advantageously reduces overhead.

Figure 26:
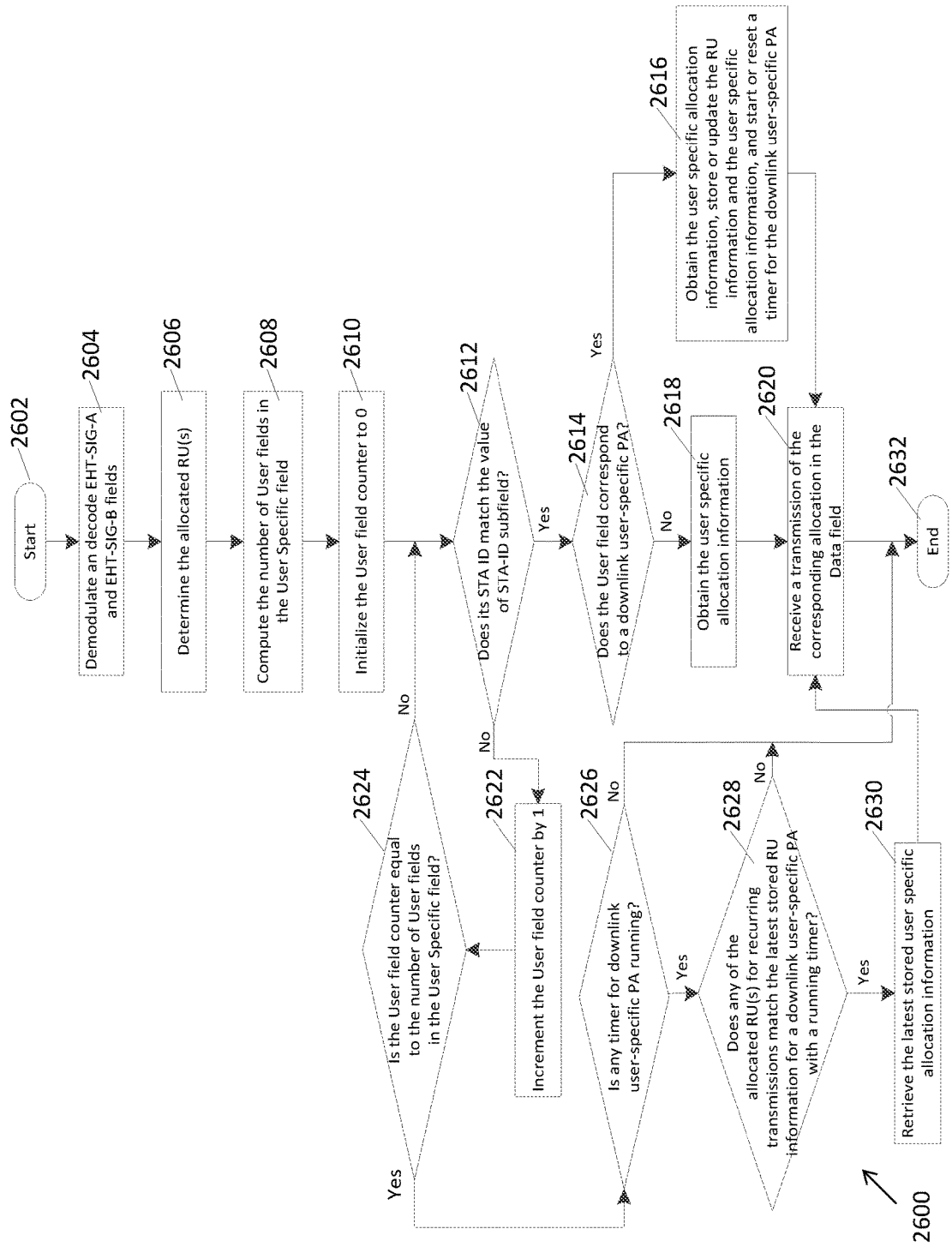
FIG. 26 shows a flow chart illustrating processing of a received EHT MU PPDU at an STA according to the fifth embodiment.

FIG. 26 shows a flow chart 2600 illustrating processing of a received EHT MU PPDU at an STA according to the fifth embodiment. Processing may start at 2602. At 2604, the EHT-SIG-A field and the EHT-SIG-B field of the received EHT MU PPDU may be demodulated and decoded. At 2606, the allocated RU(s) may be determined; this can be done by checking the RU Allocation subfield of the EHT-SIG-B field; this step can be skipped in the case of a full-bandwidth MU-MIMO transmission. At 2608, the number of User fields in the User Specific field may be computed; the Recurring Transmission Presence subfield of the EHT-SIG-A field and the Recurring Transmission Bitmap subfield of the EHT-SIG-B field may be taken into account to exclude the User fields corresponding to recurring transmissions. At 2610, the User field counter may be initialized to 0 (zero). At 2612, it may be determined whether the STA's STA ID matches the value of the STA-ID subfield. STA ID is the identifier of a STA, which uniquely identifies the STA in the BSS (basic service set) with which it is associated. If the STA's STA ID matches the value of the STA-ID subfield, processing may proceed to step 2614. If the STA's STA ID does not match the value of the STA-ID subfield, processing may proceed to step 2622. At 2614, it may be determined whether the User field corresponds to a downlink user-specific PA; this can be done by checking the PA Presence subfield of the EHT-SIG-A field and the PA Bitmap subfield of the EHT-SIG-B field. If it is determined that the User field corresponds to a downlink user-specific PA, processing may proceed at step 2616. If it is determined that the User field does not correspond to a downlink user-specific PA, processing may proceed at step 2618. At 2616, the user specific allocation information may be obtained, and the RU information and the user specific allocation information may be stored or updated, and a timer for the downlink user-specific PA may be started or reset. At step 2618, the user specific allocation information may be obtained. At 2620, a transmission of the corresponding allocation may be received in the Data field. At 2622, the User field counter may be incremented by 1. At 2624, it may be determined whether the User field counter is equal to the number of User fields in the User Specific field. If it is determined that the User field counter is equal to the number of User fields in the User Specific field, processing may proceed at step 2626. If it is determined that the User field counter is not equal to the number of User fields in the User Specific field, processing may return to step 2612. At 2626, it may be determined whether any timer for downlink user-specific PA is running. If it is determined that at least one timer for downlink user-specific PA is running, processing may proceed at step 2628. If it is determined that no timer for downlink user-specific PA is running, processing may end at step 2632. At 2628, it may be determined whether any of the allocated RU(s) for recurring transmission matches the latest stored RU information for any downlink user-specific PA with a running timer; the allocated RUs for recurring transmissions may be determined by checking the Recurring Transmission Presence subfields of the EHT-SIG-A field and the Recurring Transmission Bitmap subfield of the EHT-SIG-B field. If it is determined that one of the allocated RU(s) for recurring transmission matches the stored RU information for a downlink user-specific PA with a running timer, processing may proceed at step 2630. If it is determined that none of the allocated RU(s) for recurring transmission matches the stored RU information for any downlink user-specific PA with a running timer, processing may end at step 2632. At step 2630, the stored user specific allocation information for the matched RU is retrieved and processing may proceed at step 2620.

Figure 27:
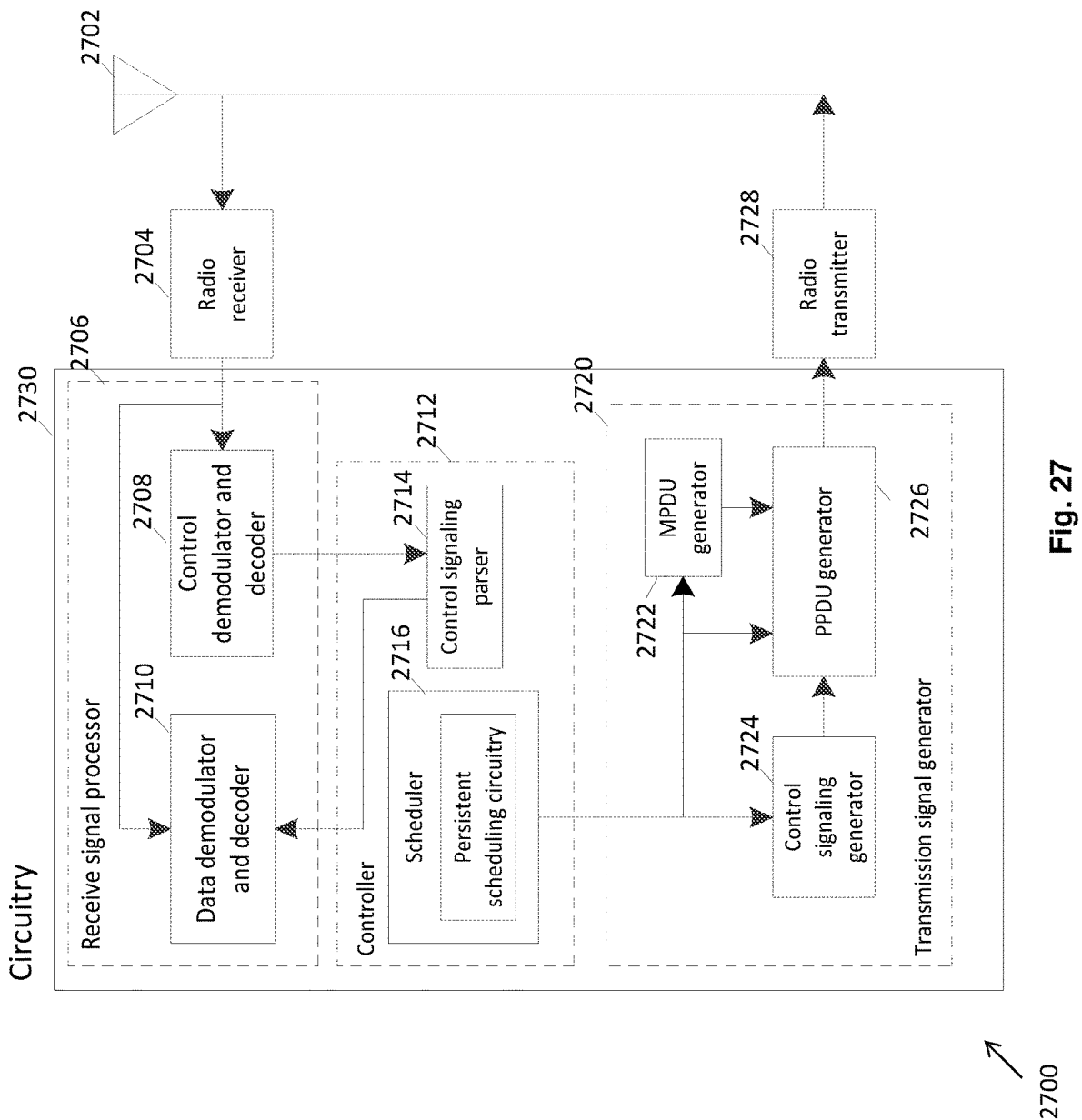
FIG. 27 shows a configuration of a communication device, for example an AP according to various embodiments.

FIG. 27 shows a configuration of a communication device 2700, for example an Access Point (AP) according to various embodiments. Similar to the schematic example of the communication apparatus as shown in FIG. 3A, the communication apparatus 2700 in the schematic example of FIG. 27 includes at least one radio transmitter 2728, at least one radio receiver 2704, multiple antennas 2702 (for the sake of simplicity, only one antenna is depicted in FIG. 27) and circuitry 2730. The circuitry 2730 may include at least one controller 2712 for use in software and hardware aided execution of tasks that the controller 2712 is designed to perform, including control of communication with downlink or uplink user-specific PA. The circuitry 2730 may further include a receive signal processor 2706 and a transmission signal generator 2720. The controller 2712 may control the receive signal processor 2706 and the transmission signal generator 2720.

The receive signal processor 2706 may include a data demodulator and decoder 2710, which may demodulate and decode data portions of the received signals. The receive signal processor 2706 may further include a control demodulator and decoder 2708, which may demodulate and decode control signaling portions of the received signals (e.g. EHT TB PPDUs or BlockAck frames).

The controller 2712 may include a control signal parser 2714, which may analyze the control signaling portions of the received signals. The controller 2712 may further include a scheduler 2716, which may determine RU information and user-specific allocation information for allocations. The scheduler 2716 may include persistent scheduling circuitry that determines RU information and user-specific allocation information related to downlink user-specific PAs as well as identification information and user-specific resource allocation information related to uplink user-specific PAs.

The transmission signal generator 2720 may include an MPDU generator 2722, a control signaling generator 2724, and a PPDU generator 2726. The MPDU generator 2722 may generate MPDUs or A-MPDUs (aggregated MPDUs), e.g. data frames and management frames carrying PA Control subfields, EHT Basic Trigger frames, PA Trigger frames or PA Announcement frames. The control signaling generator 2724 may generate control signaling fields (e.g. EHT-SIG-A and EHT-SIG-B fields). The PPDU generator 1826 may generate PPDUs (e.g. EHT MU PPDU).

Figure 28:
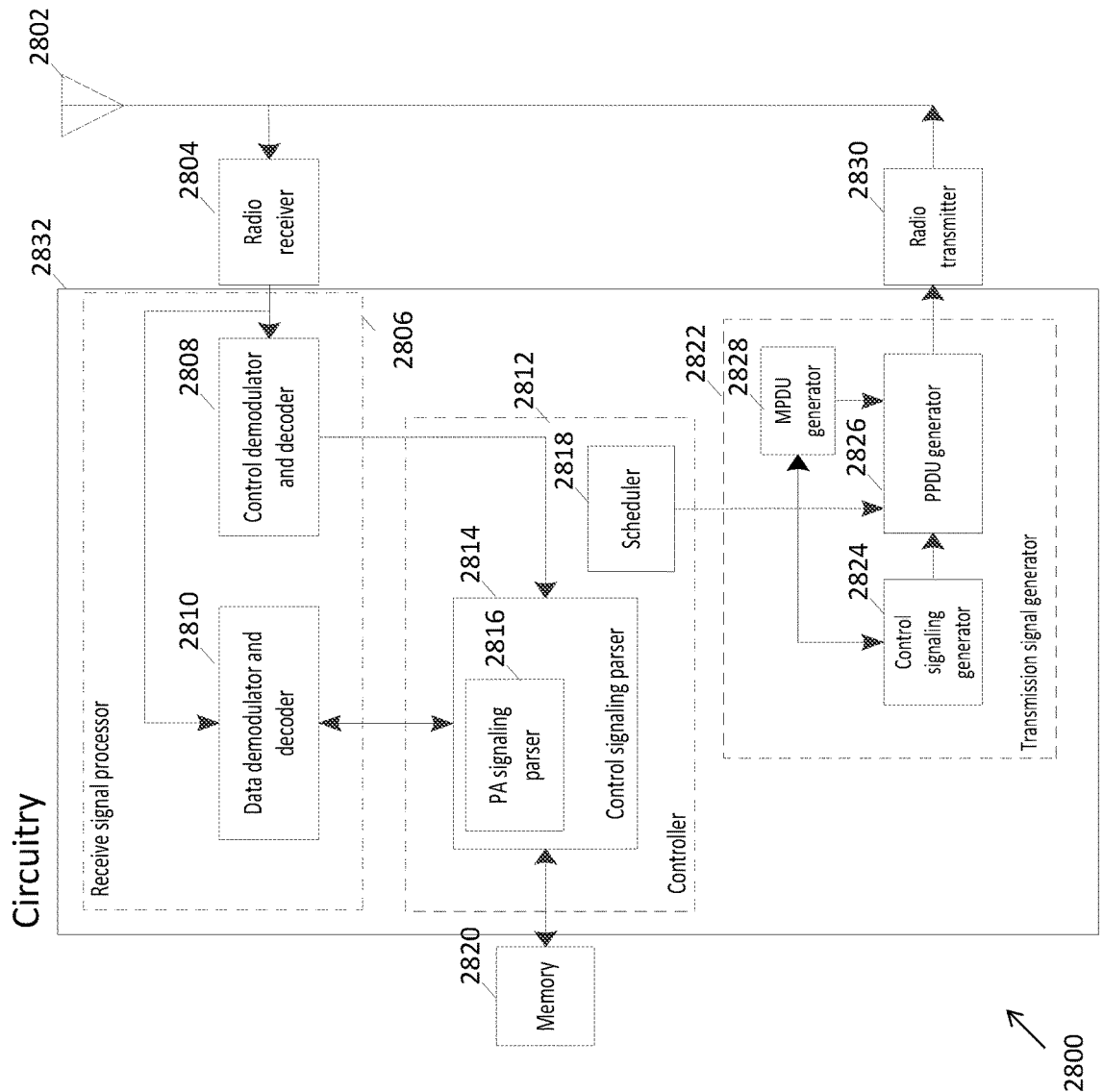
FIG. 28 shows a configuration of a communication device, for example an STA, according to various embodiments.

FIG. 28 shows a configuration of a communication device 2800, for example terminal, for example a station (STA), according to various embodiments. Similar to the schematic example of the communication apparatus as shown in FIG. 3A, the communication apparatus 2800 in the schematic example of FIG. 28 includes at least one radio transmitter 2830, at least one radio receiver 2804, one or more antennas 2802 (for the sake of simplicity, only one antenna is depicted in FIG. 28) and circuitry 2832. The circuitry 2832 may include at least one controller 2812 for use in software and hardware aided execution of tasks the controller 2812 is designed to perform, including control of communication with downlink or uplink user-specific PA. The circuitry 2832 may further include a receive signal processor 2806 and a transmission signal generator 2822. The controller 2812 may control the receive signal processor 2806 and the transmission signal generator 2822.

The receive signal processor 2806 may include a data demodulator and decoder 2810 and a control demodulator and decoder 2808. The data demodulator and decoder 2810 may demodulate and decode data portions of the received signals according to RU information and user-specific allocation information. The data portions of the received signals may comprise Multi-STA BlockAck frames, PA Announcement frames, EHT Basic Trigger frames, PA Trigger frames or frames carrying PA Control subfields. The control demodulator and decoder 2808 may demodulate and decode control signaling portions of the received signals (e.g. EHT-SIG-A and EHT-SIG-B fields of EHT MU PPDUs).

The controller 2812 may include a control signaling parser 2814 and a scheduler 2818. The control signaling parser 2814 may analyze the control signaling portions of the received signals and may determine RU information and user-specific allocation information for downlink user-specific PAs. The control signaling parser 2814 may include a PA signaling parser 2816. The PA signaling parser 2816 may determine and store (for example in a memory 2820) or update RU information and user-specific allocation information for downlink user-specific PAs or retrieve (for example from the memory 2820) user-specific allocation information for downlink user-specific PAs. The PA signaling parser 2816 may also determine and store (for example in a memory 2820) or update identification information and user-specific resource allocation information for uplink user-specific PAs or retrieve (for example from the memory 2820) user-specific resource allocation information for uplink user-specific PAs.

The transmission signal generator 2822 may include a control signaling generator 2824, a PPDU generator 2826, and an MPDU generator 2828. The control signaling generator 2824 may generate control signaling fields (e.g. EHT-SIG-A field). The PPDU generator 2826 may generate PPDUs (e.g. EHT TB PPDUs). The MPDU generator 2828 may generate (A)-MPDUs, e.g., BlockAck frames.

As described above, the embodiments of the present disclosure provide an advanced communication system, communication methods and communication apparatuses that enable user-specific PA in MIMO WLAN networks of an extremely high throughput and improve physical layer throughput in MIMO WLAN networks.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, tracking device), a game console, a digital book reader, a telehealth/telemedicine (remote health and medicine) device, and a vehicle providing communication functionality (e.g. automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

Aspect 1. A communication apparatus comprising:
    circuitry, which, in operation, generates a transmission signal comprising a common field, a user specific field and a data field, the common field including RU information for each of one or more allocations in the data field and the user specific field including one or more user information, each indicating a user-specific allocation among the one or more allocations in the data field; and
    a transmitter, which, in operation, transmits the generated transmission signal;
    wherein the user specific field is free from at least one user information for a persistent allocation containing a recurring transmission among the one or more allocations.

Aspect 2. The communication apparatus according to Aspect 1, wherein the transmission signal comprises a signaling for indicating the presence of at least one persistent allocation in the data field.

Aspect 3. The communication apparatus according to Aspect 1, wherein the common field comprises a signaling for indicating at least one persistent allocation in the data field.

Aspect 4. The communication apparatus according to Aspect 1, wherein the transmission signal comprises a signaling for indicating the presence of at least one persistent allocation in the data field which contains a recurring transmission.

Aspect 5. The communication apparatus according to Aspect 1, wherein the common field comprises a signaling for indicating at least one persistent allocation in the data field which contains a recurring transmission.

Aspect 6. The communication apparatus according to Aspect 1, wherein the persistent allocation exists for a time period following the transmission of the generated transmission signal.

Aspect 7. The communication apparatus according to Aspect 1, wherein the user specific field is free from at least one user information for a persistent allocation containing an initial transmission; and the user information for the persistent allocation is contained in a control frame previously transmitted by the communication apparatus.

Aspect 8. The communication apparatus according to Aspect 7, wherein the persistent allocation exists for a time period following the transmission of the control frame.

Aspect 9. The communication apparatus according to Aspect 8, wherein the time period is determined or is indicated by a signaling contained in the control frame.

Aspect 10. A communication apparatus comprising:
  a receiver, which, in operation, receives a transmission signal comprising a common field, a user specific field and a data field, the common field including RU information for each of one or more allocations in the data field and the user specific field including one or more user information, each indicating a user-specific allocation among the one or more allocations in the data field; and
  circuitry, which, in operation, process the received transmission signal,
  wherein the user specific field is free from at least one user information for a persistent allocation containing a recurring transmission among the one or more allocations.

Aspect 11. The communication apparatus according to Aspect 10, wherein the transmission signal comprises a signaling for indicating the presence of at least one persistent allocation in the data field.

Aspect 12. The communication apparatus according to Aspect 10, wherein the common field contain a signaling for indicating at least one persistent allocation in the data field.

Aspect 13. The communication apparatus according to Aspect 10, wherein the transmission signal comprises a signaling for indicating the presence of at least one persistent allocation in the data field which contains a recurring transmission.

Aspect 14. The communication apparatus according to Aspect 10, wherein the common field comprises a signaling for indicating at least one persistent allocation in the data field which contains a recurring transmission.

Aspect 15. The communication apparatus according to Aspect 10, wherein the persistent allocation exists for a time period following the transmission of the generated transmission signal.

Aspect 16. The communication apparatus according to Aspect 10, wherein the user specific field is free from at least one user information for a persistent allocation containing an initial transmission; and the user information for the persistent allocation is contained in a control frame previously received by the communication apparatus.

Aspect 17. The communication apparatus according to Aspect 16, wherein the persistent allocation exists for a time period following the reception of the control frame.

Aspect 18. The communication apparatus according to Aspect 17, wherein the time period is determined or is indicated by a signaling contained in the control frame.

Aspect 19. A communication method comprising:
  generating a transmission signal comprising a common field, a user specific field and a data field, the common field including RU information for each of one or more allocations in the data field and the user specific field including one or more user information, each indicating a user-specific allocation among the one or more allocations in the data field; and
  transmitting the generated transmission signal;
  wherein the user specific field is free from at least one user information for a persistent allocation containing a recurring transmission among the one or more allocations.

Aspect 20. A communication method comprising:
  receiving a transmission signal comprising a common field, a user specific field and a data field, the common field including RU information for each of one or more allocations in the data field and the user specific field including one or more user information, each indicating a user-specific allocation among the one or more allocations in the data field;
  wherein the user specific field is free from at least one user information for a persistent allocation containing a recurring transmission among the one or more allocations.

Aspect 21. A communication apparatus comprising:
  circuitry, which, in operation, generates a transmission signal comprising at least one signal field content channel and a data field, each of the at least one signal field content channel comprising a RU (resource unit) allocation subfield consisting of N field(s) and a recurring transmission bitmap subfield consisting of N bitmap(s) with N=1, 2, 4 or 8; and
  a transmitter, which, in operation, transmits the generated transmission signal;
  wherein each of the N field(s) of the RU allocation subfield indicates RU information for one or more allocation within a corresponding tone range in the data field, and the n-th (n=1, 2, . . . , N) bitmap of the recurring transmission bitmap subfield indicates whether or not each of the one or more allocation indicated by the n-th field of the RU allocation subfield contains a recurring transmission.

Aspect 22. The communication apparatus according to Aspect 21, wherein the n-th (n=1, 2, . . . , N) bitmap of the recurring transmission bitmap subfield is not present if the one or more allocation indicated by the n-th field of the RU allocation subfield does not comprise the recurring transmission.

Aspect 23. The communication apparatus according to Aspect 21, wherein the transmission signal comprises a N-bit recurring transmission presence subfield for each of the at least signal field content channel, the n-th (n=1, 2, . . . , N) bit of the recurring transmission presence subfield indicating the presence of the n-th bitmap of the recurring transmission bitmap subfield in the each of the at least signal field content channel.

Aspect 24. The communication apparatus according to Aspect 21, wherein each of the at least one signal field content channel comprises a persistent allocation bitmap subfield consisting of N bitmap(s); and the n-th (n=1, 2, . . . , N) bitmap of the persistent allocation bitmap subfield indicates whether each of the one or more allocation indicated by the n-th field of the RU allocation subfield is persistent.

Aspect 25. The communication apparatus according to Aspect 24, wherein the n-th (n=1, 2, . . . , N) bitmap of the persistent allocation bitmap subfield is not present if the one or more allocation indicated by the n-th field of the RU allocation subfield is not persistent.

Aspect 26. The communication apparatus according to Aspect 24, wherein the transmission signal comprises a N-bit persistent allocation presence subfield for each of the at least one signal field content channel, the n-th (n=1, 2, . . . , N) bit of the N-bit persistent allocation presence subfield indicating the presence of the n-th bitmap of the persistent allocation bitmap subfield in the each of the at least one signal field content channel.

Aspect 27. The communication apparatus according to Aspect 21, wherein the RU allocation subfield and the recurring transmission bitmap subfield are separately encoded; and the size of the n-th (n=1, 2, . . . , N) bitmap of the recurring transmission bitmap subfield depends on the number of the one or more allocation indicated by the n-th field of the RU allocation subfield.

Aspect 28. The communication apparatus according to Aspect 21, wherein the RU allocation subfield and the recurring transmission bitmap subfield are jointly encoded; and the size of each bitmap of the recurring transmission bitmap subfield depends on the maximum number of the one or more allocations that can be indicated by any field of the RU allocation subfield.

Aspect 29. The communication apparatus according to Aspect 21, wherein the transmission signal comprises a signalling to indicate whether the RU allocation subfield and the recurring transmission bitmap subfield for each of the at least one signal field content channels are separately encoded or jointly encoded.

Aspect 30. The communication apparatus according to Aspect 21, wherein each of the at least one signal field content channel comprises a M-bit center 26-tone RU subfield where M=1 for CBW=80, 80+80, or 160 MHz, and M=2 for CBW=160+160 or 320 MHz, each bit of the M-bit center 26-tone RU subfield indicating whether a corresponding center 26-tone RU is allocated.

Aspect 31. The communication apparatus according to Aspect 30, wherein when M=1, the last bitmap of the recurring transmission bitmap subfield indicates whether the allocation indicated by the M-bit center 26-tone RU subfield contains a recurring transmission.

Aspect 32. The communication apparatus according to Aspect 30, wherein when M=2, the fourth bitmap of the recurring transmission bitmap subfield indicates whether the allocation indicated by a first bit of the M-bit center 26-tone RU subfield contains a recurring transmission; and the last bitmap of the recurring transmission bitmap subfield indicates whether the allocation indicated by a second bit of the M-bit center 26-tone RU subfield contains a recurring transmission.

Aspect 33. The communication apparatus according to Aspect 21, wherein each of the at least one signal field content channel is encoded on each L*20 MHz band with L=1 or 2; and the number of the at least one signal field content channel depends on the channel bandwidth (CBW) and the value of L.

Aspect 34. The communication apparatus according to Aspect 33, wherein the transmission signal comprises a signalling to indicate the value of L.

Aspect 35. A communication method comprising:
generating a transmission signal comprising at least one signal field content channel and a data field, each of the at least one signal field content channel comprising a RU (resource unit) allocation subfield consisting of N field(s) and a recurring transmission bitmap subfield consisting of N bitmap(s) with N=1, 2, 4 or 8; and
transmitting the generated transmission signal;
wherein each of the N field(s) of the RU allocation subfield indicates RU information for one or more allocation within a corresponding tone range in the data field, and the n-th (n=1, 2, . . . , N) bitmap of the recurring transmission bitmap subfield indicates whether or not each of the one or more allocation indicated by the n-th field of the RU allocation subfield contains a recurring transmission.

Aspect 36. A communication apparatus, comprising:
circuitry, which, in operation, generates a frame comprising identification information identifying an uplink persistent allocation (PA); and
a transmitter, which, in operation, transmits the generated frame.

Aspect 37. The communication apparatus according to Aspect 36, wherein the identification information is a PA identifier (PAID) of the uplink PA.

Aspect 38. The communication apparatus according to Aspect 36, wherein the identification information is a resource unit (RU) allocation information for the uplink PA.

Aspect 39. The communication apparatus according to Aspect 36, wherein the identification information is included in a frame body of the frame to solicit a transmission of the uplink PA, and the frame is free from user-specific resource allocation information for the uplink PA.

Aspect 40. The communication apparatus according to Aspect 36, wherein the identification information is included in a MAC header of the frame to solicit a transmission of the uplink PA and the frame is free from user-specific resource allocation information for the uplink PA.

Aspect 41. The communication apparatus according to Aspect 36, wherein the identification information and user specific resource allocation information is included in a frame body of the frame to identify the uplink PA.

Aspect 42. The communication apparatus according to Aspect 36, wherein the identification information and user specific resource allocation information is included in a frame body of the frame to solicit an initial transmission of the uplink PA.

Aspect 43. A communication method comprising:
generating a frame comprising identification information identifying an uplink persistent allocation (PA); and
transmitting the generated frame.

Aspect 44. The communication method according to Aspect 43, wherein the identification information is a PA identifier (PAID) of the uplink PA.

Aspect 45. The communication method according to Aspect 43, wherein the identification information is a resource user (RU) allocation information for the uplink PA.

Aspect 46. The communication method according to Aspect 43, wherein the identification information is included in a frame body of the frame to solicit a transmission of the uplink PA, and the frame is free from user-specific resource allocation information for the uplink PA.

Aspect 47. The communication method according to Aspect 43, wherein the identification information is included in a MAC header of the frame to solicit a transmission of the uplink PA and the frame is free from user-specific resource allocation information for the uplink PA.

Aspect 48. The communication method according to Aspect 43, wherein the identification information and user specific resource allocation information is included in a frame body of the frame to identify the uplink PA.

Aspect 49. The communication method according to Aspect 43, wherein the identification information and user specific resource allocation information is included in a frame body of the frame to identify the uplink PA.

Aspect 50. A communication apparatus comprising:
  circuitry, which, in operation,
    generates a first transmission signal including user information of a plurality of users for a downlink MU-MIMO allocation, each indicating a user-specific allocation, and
    further generates a second transmission signal comprising a common field, a user-specific field and a data field, the data field containing a transmission of the downlink MU-MIMO allocation and
  a transmitter, which, in operation, transmits the first transmission signal and the second transmission signal,
    wherein the user-specific allocation of the downlink MU-MIMO allocation is determined to be persistent or not.

Aspect 51. The communication apparatus according to Aspect 50, wherein a user-specific persistent allocation of the downlink MU-MIMO allocation in the data field in the second transmission signal is indicated by the user information in the first transmission signal.

Aspect 52. The communication apparatus according to Aspect 50, wherein when the data field in the second transmission signal includes a recurring transmission of a user-specific persistent allocation of the MU-MIMO allocation, the user-specific field is free from user information for the user-specific persistent allocation.

Aspect 53. The communication apparatus according to Aspect 50, wherein the common field in the second transmission signal comprises a signaling for indicating at least one user-specific persistent allocation in the data field in the second transmission signal.

Aspect 54. The communication apparatus according to Aspect 50, wherein the common field in the second transmission signal comprises a signaling for indicating at least one user-specific persistent allocation in the data field in the second transmission signal which contains a recurring transmission.

Aspect 55. The communication apparatus according to Aspect 50, wherein the user-specific persistent allocation exists for a time period following the transmission of the first transmission signal.

Aspect 56. The communication apparatus according to Aspect 55, wherein the time period is determined or is indicated by a signaling contained in the first transmission signal.

Aspect 57. A communication method comprising:
  generating a first transmission signal including user information of a plurality of users for a downlink MU-MIMO allocation, each indicating a user-specific allocation;
  generating a second transmission signal comprising a common field, a user-specific field and a data field, the data field containing a transmission of the downlink MU-MIMO allocation; and
  transmitting the first transmission signal and the second transmission signal,
    wherein the user-specific allocation of the downlink MU-MIMO allocation is determined to be persistent or not.

Aspect 58. The communication method according to Aspect 57, wherein a user-specific persistent allocation of the downlink MU-MIMO allocation in the data field in the second transmission signal is indicated by the user information in the first transmission signal.

Aspect 59. The communication method according to Aspect 57, wherein when the data field in the second transmission signal includes a recurring transmission of a user-specific persistent allocation of the downlink MU-MIMO allocation, the user-specific field is free from user information for the user-specific persistent allocation.

Aspect 60. The communication method according to Aspect 57, wherein the common field in the second transmission signal comprises a signaling for indicating at least one user-specific persistent allocation in the data field in the second transmission signal.

Aspect 61. The communication method according to Aspect 57, wherein the common field in the second transmission signal comprises a signaling for indicating at least one user-specific persistent allocation in the data field in the second transmission signal which contains a recurring transmission.

Aspect 62. The communication method according to Aspect 57, wherein the user-specific persistent allocation exists for a time period following the transmission of the first transmission signal.

Aspect 63. The communication method according to Aspect 62, wherein the time period is determined or is indicated by a signaling contained in the first transmission signal.

The invention claimed is:

1. A communication apparatus comprising:
  a transmitter which, in operation, transmits, in a transmission opportunity (TXOP), a trigger frame to allocate a part of the TXOP to a first station; and
  a receiver which, in operation, receives more than one physical layer protocol data unit (PPDU) from the first station within the part of the TXOP, the more than one PPDU being non-overlapping in a time axis,
    wherein a first PPDU, which is transmitted first among the more than one PPDU, is a response to the trigger frame and at least one of the more than one PPDU other than the first PPDU is not a response to the trigger frame,
    wherein the trigger frame includes a user info field for the first station, the user info field including a resource unit allocation subfield indicating information of a frequency resource within which the more than one PPDU are transmitted, and
    wherein after the trigger frame is transmitted, no more user info fields for the first station are transmitted within the part of the TXOP.

2. The communication apparatus according to claim 1, wherein the trigger frame is transmitted to allocate the part of the TXOP to the first station and a second station, and
  another PPDU is transmitted from the second station within the part of the TXOP.

3. The communication apparatus according to claim 1, wherein the part of the TXOP is allocated only to the first station.

4. The communication apparatus according to claim 1, wherein the trigger frame contains no more than one user info field.

5. The communication apparatus according to claim 1, wherein the more than one PPDU are transmitted by scheduled access.

6. The communication apparatus according to claim 1, wherein the communication apparatus is responsible for an error recovery according to the part of the TXOP.

7. The communication apparatus according to claim 1, wherein the communication apparatus expects to receive the more than one PPDU after the part of the TXOP.

8. The communication apparatus according to claim 7, wherein in a case that the receiver receives PPDUs after the part of the TXOP, the communication apparatus is responsible for an error recovery according to the part of the TXOP.

9. The communication apparatus according to claim 1, wherein the trigger frame contains time duration information according to the part of the TXOP.

10. The communication apparatus according to claim 9, wherein the time duration information indicates a time duration from a reception of the time duration information at the first station to an end of the part of the TXOP.

11. The communication apparatus according to claim 1, wherein the transmitter transmits block acknowledgement information according to the more than one PPDU within the part of the TXOP.

12. A communication method comprising:
transmitting, in a transmission opportunity (TXOP), a trigger frame to allocate a part of the TXOP to a first station; and
receiving more than one physical layer protocol data unit (PPDU) from the first station within the part of the TXOP, the more than one PPDU being non-overlapping in a time axis,
wherein a first PPDU which is transmitted first among the more than one PPDU is a response to the trigger frame and at least one of the more than one PPDU other than the first PPDU is not a response to the trigger frame,
wherein the trigger frame includes a user info field for the first station, the user info field including a resource unit allocation subfield indicating information of a frequency resource within which the more than one PPDU are transmitted, and
after the trigger frame is transmitted, no more user info fields for the first station are transmitted within the part of the TXOP.

13. The communication apparatus according to claim 1, wherein when the first station receives the trigger frame, the first station starts or resets a timer for the part of the TXOP.

14. The communication apparatus according to claim 1, wherein the trigger frame is carried in an Extremely High Throughput (EHT) multi user (MU) PPDU.

15. The communication apparatus according to claim 1, wherein the trigger frame is used to set information in the more than one PPDU, the information being related to the part of the TXOP.

16. The communication apparatus according to claim 1, wherein the first station stores the information of the frequency resource indicated in the trigger frame, and prepares a second PPDU based on the stored information of the frequency resource, the second PPDU being transmitted in a second order among the more than one PPDU.

17. The communication apparatus according to claim 1, wherein the first station transmitting the more than one PPDU is indicated by an AID12 included in the trigger frame.

* * * * *